United States Patent [19]
Seto

[11] Patent Number: 5,953,488
[45] Date of Patent: Sep. 14, 1999

[54] METHOD OF AND SYSTEM FOR RECORDING IMAGE INFORMATION AND METHOD OF AND SYSTEM FOR ENCODING IMAGE INFORMATION

[75] Inventor: Hiroaki Seto, Kanagawa, Japan

[73] Assignee: Sony Corporation, Tokyo, Japan

[21] Appl. No.: 08/655,489

[22] Filed: May 30, 1996

[30] Foreign Application Priority Data

May 31, 1995 [JP] Japan ................................... 7-134524

[51] Int. Cl.[6] .............................. H04N 5/917; H04N 7/26
[52] U.S. Cl. ........................................... 386/109; 386/112
[58] Field of Search .................................... 386/109, 111, 386/112, 27, 33; 348/384, 407, 413, 414, 416, 417, 418, 419; H04N 5/97, 7/26

[56] References Cited

U.S. PATENT DOCUMENTS 5,381,275 1/1995 Nitta et al. ............................... 386/112
5,587,805 12/1996 Park ......................................... 386/112

*Primary Examiner*—Robert Chevalier
*Attorney, Agent, or Firm*—Frommer Lawrence & Haug, LLP; William S. Frommer

[57] ABSTRACT

A digital video data recording system has a signal source, a motion detector, an external memory for storing motion vector data, an encoder, a recorder, and a controller. The controller obtains motion vector data and quantization step size data in a preprocessing procedure, and encodes image data using the motion vector data read from the external memory and the quantization step size data and records the encoded image information on a recording medium in a recording process. The digital video data recording system can encode image information appropriately depending on the type of the image information, minimizes the consumption of electric energy by not effecting a motion detecting process in the recording process, and can record all the image information to be recorded on the recording medium.

18 Claims, 22 Drawing Sheets

FIG. 3A
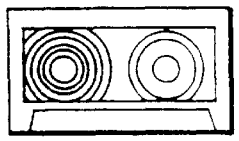
Source Image Recording Medium
Recording Time: T
Storage Medium
Capacity: S
FIG. 3B  FIG. 3C
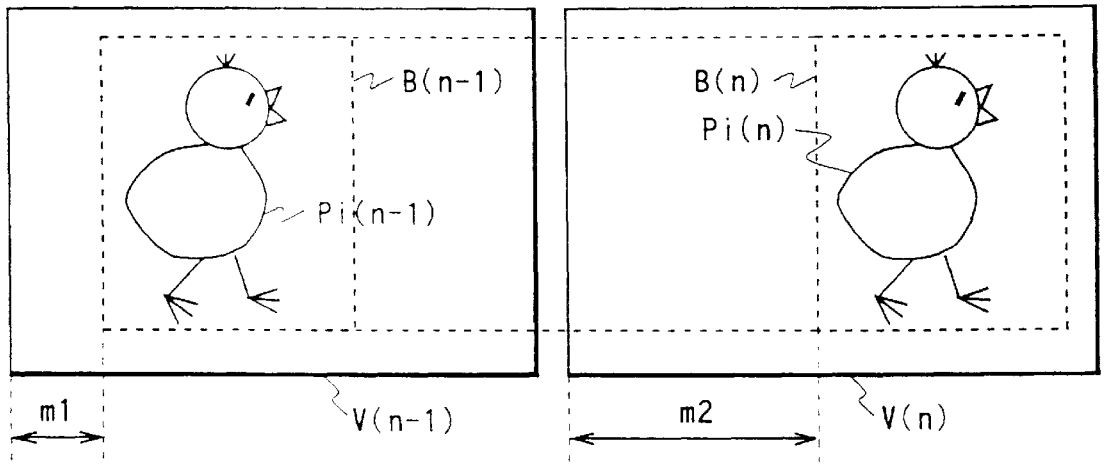
FIG. 3D  FIG. 3E
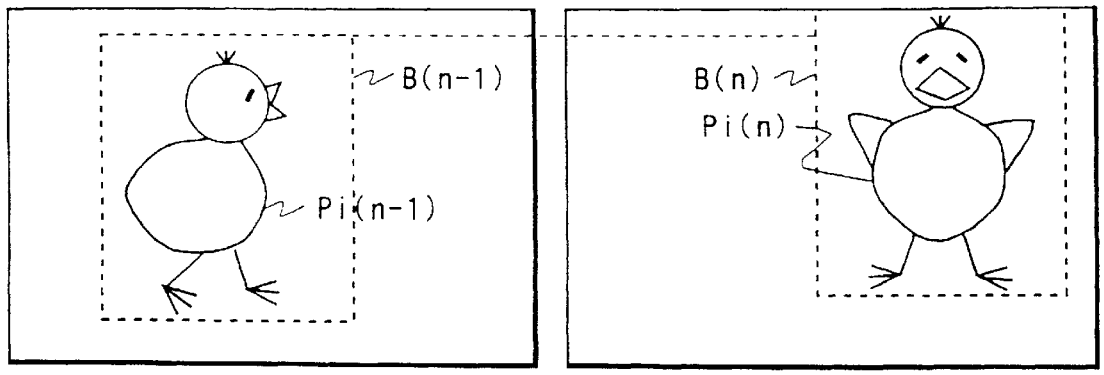

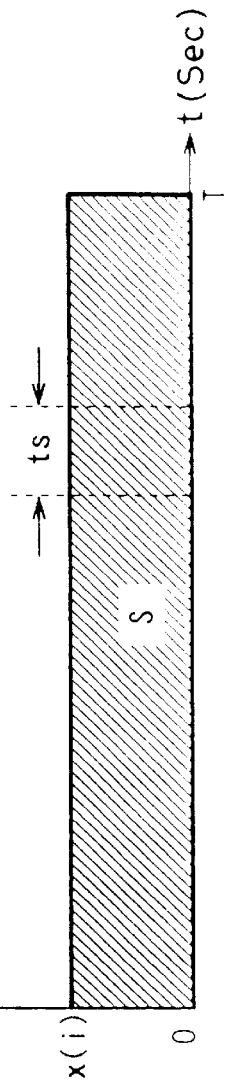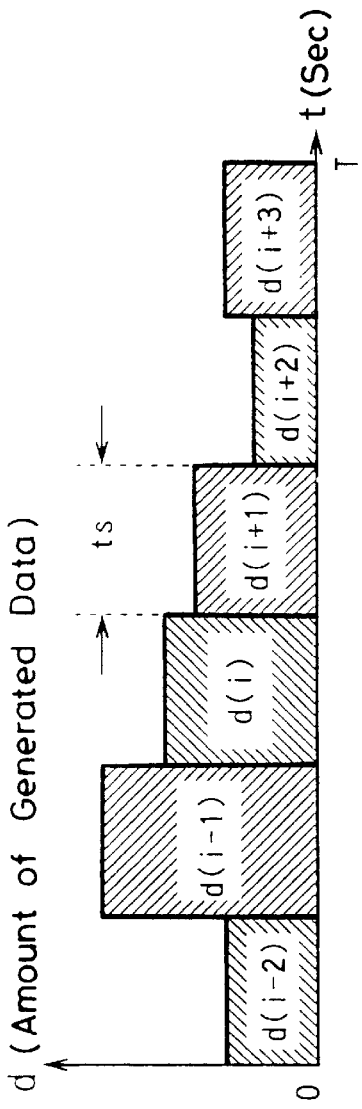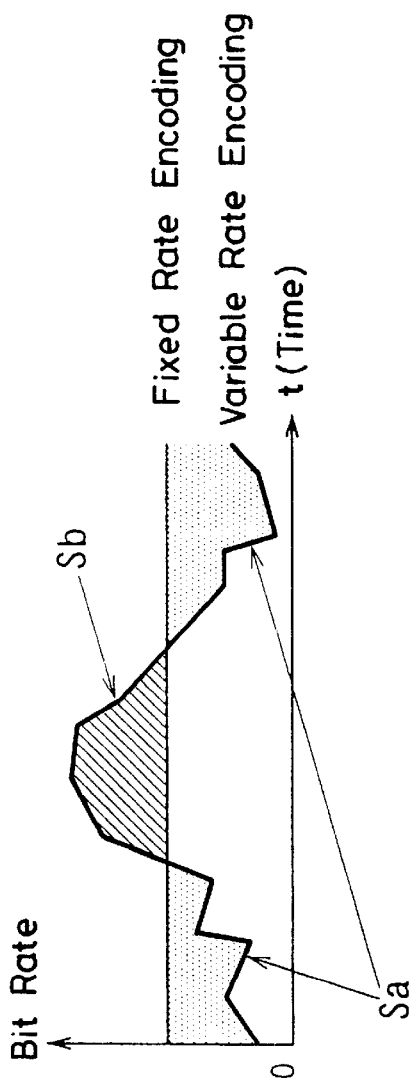
FIG. 4A
FIG. 4B
FIG. 4C

Time Code Table

| Material ID | Start Time Code | End Time Code |
|---|---|---|
| 01 | hh:mm:ss:ff | hh:mm:ss:ff |

FIG. 7A

GOP Table

| Material ID | GOP No | Bit No | GOP Ratio | Assigned Bit No | QST |
|---|---|---|---|---|---|
| 01 | 01 | xxxxx | xxxxx/ | xxxx | QST1 |
| 01 | 02 | yyyy | yyyy/ | yyy | QST2 |

FIG. 7B

Hard Disk Table

| Material ID | Track/Sector No | Data Length Data |
|---|---|---|
| 01 | 001/0001 | 1024 (Byte) |
| 02 | 001/0003 | 2048 (Byte) |

FIG. 7C

| Material ID | GOP No | Motion Vector Data | Motion Vector Data |
|---|---|---|---|

| Material ID | Material Info | Ext Memory ID | Ext Memory Info | Encoding Selection Info | Status |
|---|---|---|---|---|---|
| ---- | ---- | ---- | ---- | ---- | ---- |
| ---- | ---- | ---- | ---- | ---- | ---- |

METHOD OF AND SYSTEM FOR RECORDING IMAGE INFORMATION AND METHOD OF AND SYSTEM FOR ENCODING IMAGE INFORMATION

BACKGROUND OF THE INVENTION

1. Field of the Invention

The present invention relates to a method of and a system for recording image information in a transmitter of an information transmission apparatus, a recording apparatus having a disk or a magnetic tape as a storage medium, a disk manufacturing apparatus such as a stamper for an optical disk, or the like, and a method of and a system for encoding image information.

2. Description of the Related Art

Transmitters of information transmission apparatus, recorders of recording and reproducing apparatus having a disk or a magnetic tape as a storage medium, signal processors of disk manufacturing apparatus such as a stamper for an optical disk incorporate an encoder as shown in FIG. 1 of the accompanying drawings, for example. The encoder as shown in FIG. 1 is in accord with the moving picture image encoding standards for storage which have been established based on standardizing efforts made by the MPEG (Moving Picture Image Coding Experts Group).

FIG. 1 shows an internal structure of an image encoder.

As shown in FIG. 1, the image encoder has an input terminal 400 which is supplied with image data from a signal source (not shown). The input terminal 400 is connected to a first input terminal of a motion detector 421, an input terminal of a motion compensator 424, and an input terminal of a frame memory 422. The frame memory 422 has an output terminal connected to a second input terminal of the motion detector 421, an input terminal of a frame memory 423, an additive input terminal of an adder 427, an intraframe fixed contact "b" of a switch 428, and an input terminal of an inter-/intra-frame decision unit 429. The frame memory 423 has an output terminal connected to a third input terminal of the motion detector 421 and an input terminal of a motion compensator 425. The motion compensator 424 has an output terminal connected to an additive input terminal of an adder 426 which has a ½ multiplier therein. The motion compensator 425 has an output terminal connected to another additive input terminal of the adder 426. The adder 426 has an output terminal connected to a subtractive input terminal of the adder 427. The adder 427 has an output terminal connected to an inter-frame fixed contact "a" of the switch 428 and another input terminal of the inter-/intra-frame decision unit 429. The switch 428 has a movable contact "c" connected to an input terminal of a DCT (Discrete Cosine Transform) circuit 430 whose output terminal is connected to an input terminal of a quantizer 431. The quantizer 431 has an output terminal connected to an input terminal of a variable length coder 432 whose output terminal is connected to an input terminal of an output encoder 433. The output encoder 433 has an output terminal connected to an output terminal 434. The motion detector 421 has an output terminal connected to other input terminals of the motion compensators 424, 425 and another input terminal of the variable length coder 432. The frame memories 422, 423 and the inter-/intra-frame decision unit 429 are connected to a controller 435.

The frame memories 422, 423 read and write frame image data according to read/write control signals R/W which are supplied from the controller 435.

At the time frame image data have been stored in the frame memory 422, if the frame memory 422 outputs frame image data of a present frame, then the input terminal 400 is supplied with frame image data of a future frame, and the frame memory 422 stores frame image data of a past frame. The present frame will be referred to as a "present frame", the future frame as a "following frame", and the past frame as a "preceding frame".

The motion detector 421 effects a motion detecting process on each macroblock having a size of 16 lines×16 pixels, for example, with respect to frame image data supplied through the input terminal 400, frame image data read from the frame memory 422, and frame image data read from the frame memory 423. The motion detecting process may be a well known motion detecting process based on full-search block matching principles, for example.

Specifically, the motion detector 421 detects a motion with respect to macroblock data MB(f) of the present frame stored in the frame memory 422 and macroblock data MB(f+1) of the following frame supplied through the input terminal 400, and produces motion vector data MV based on the detected motion, and also detects a motion with respect to macroblock data MB(f) of the present frame stored in the frame memory 422 and macroblock data MB(f−1) of the preceding frame stored in the frame memory 423, and produces motion vector data MV based on the detected motion.

A single signal line is shown as being connected to the output terminal of the motion detector 421, and only one symbol "MV" is used to indicate motion vector data. Actually, however, the motion detector 421 produces in each of the above motion detecting cycles as many motion vector data MV as the number of all macroblocks of the frame image data stored in the frame memory 422.

Based on the motion vector data MV supplied from the motion detector 421, the motion compensator 424 extracts the macroblock data MB(f+1) which are closest to the macroblock data MB(f) to be processed of the present frame, from the frame image data of the following frame supplied through the input terminal 400, and supplies the extracted macroblock data MB(f+1) to the adder 426.

Based on the motion vector data MV supplied from the motion detector 421, the motion compensator 425 extracts the macroblock data MB(f−1) which are closest to the macroblock data MB(f) to be processed of the present frame, from the frame image data of the preceding frame stored in the frame memory 423, and supplies the extracted macroblock data MB(f−1) to the adder 426.

The adder 426 adds the macroblock data MB(f+1) from the motion compensator 424 and the macroblock data MB(f−1) from the motion compensator 425 and multiplies the sum by "½", with the ½ multiplier therein, thereby producing average data representing the average of the macroblock data MB(f+1) from the motion compensator 424 and the macroblock data MB(f−1) from the motion compensator 425.

The adder 427 subtracts the average data supplied from the adder 426 from the macroblock data MB(f) of the present frame supplied from the frame memory 422, thereby producing differential data between the macroblock data MB(f) of the present frame and the macroblock data represented by the average data produced by the bidirectional predictive process.

The inter-/intra-frame decision unit 429 connects the movable contact "c" of the switch 428 selectively to the inter-frame fixed contact "a" or the intra-frame fixed contact "b" thereof based on the differential data from the adder 427, the macroblock data MB(f) from the frame memory 422, and a frame pulse Fp supplied from the controller 435. The inter-/intra-frame decision unit 429 also supplies an inter-/intra-frame selection signal SEL indicative of a controlled state of the switch 428 to the controller 435. The inter-/intra-frame selection signal SEL is transmitted together with encoded image data as decoding information EDa to enable a controller of an image decoder which serves as a main unit for effecting a decoding process to switch between inter-/intra-frame data in the same manner as in the encoding process for decoding the image data.

Details of the image encoder shown in FIG. 1 are as follows: Image data to be encoded in terms of macroblocks are the frame image data of the present frame which are stored in the frame memory 422. The motion detector 421 detects motions in order to seek the macroblock data MB(f+1), MB(f−1) of the following and preceding frames which are closest to the macroblock data MB(f) of the present frame to be encoded. When the macroblock data MB(f+1), MB(f−1) of the following and preceding frames which are closest to the macroblock data MB(f) of the present frame are detected, motion vector data MV are produced. Using the motion vector data MV, the macroblock data MB(f+1), MB(f−1) of the following and preceding frames which are closest to the macroblock data MB(f) of the present frame are extracted so as not to transmit data which are in common with the previously transmitted data.

After the differential data are produced between the macroblock data MB(f) of the present frame and the macroblock data obtained according to the bidirectional predictive process by the adder 427, the macroblock data MB(f) of the present frame cannot be decoded merely based on the differential data. Therefore, the motion vector data MV are supplied to the variable length coder 432, and after the motion vector data MV are compressed by the variable length coder 421, the compressed motion vector data MV and the differential data are transmitted.

The inter-/intra-frame decision unit 429 serves to select either the encoding of the differential data or the encoding of the output data from the frame memory 422. The encoding of the differential data, i.e., the encoding of differential information between frames, is referred to as "inter-frame encoding", and the encoding of the output data from the frame memory 422 is referred to as "intra-frame encoding". The term "encoding" does not signify the differential calculation effected by the adder 427, but connotes the encoding process carried by the DCT circuit 430, the quantizer 431, and the variable length coder 432. The inter-/intra-frame decision unit 429 actually switches between the inter-/intra-frame encoding processes in terms of macroblocks. However, for an easier understanding of the present invention, it is assumed that the inter-/intra-frame decision unit 429 switches between the inter-/intra-frame encoding processes in terms of frames.

Image data of each of frames which are outputted from the switch 428 and encoded are generally referred to as an I picture, a B picture, or a P picture depending on how they are encoded.

The I picture represents one frame of encoded image data produced when the macroblock data MB(f) of the present frame supplied from the switch 428 are intra-frame-encoded by the DCT circuit 430, the quantizer 431, and the variable length coder 432. For generating an I picture, the inter-/intra-frame decision unit 429 controls the switch 428 to connect the movable contact "c" to the fixed contact "b".

The P picture represents one frame of encoded image data that comprise inter-frame-encoded data of differential data between the macroblock data MB(f) of the present frame supplied from the switch 428 and motion-compensated macroblock data of an I or P picture which precede in time the macroblock data MB(f) of the present frame, and data produced when the macroblock data MB(f) of the present frame are intra-frame-encoded. For generating a P picture, the motion vector data MV used to effect a motion compensating process on the image data of the I picture are generated from image data to be encoded as a P picture and image data preceding the image data in the sequence of the image data supplied to the image encoder.

The B picture represents data produced when differential data between the macroblock data MB(f) of the present frame supplied from the switch 428 and six types of macroblock data (described below) are inter-frame-encoded.

Two of the six types of macroblock data are the macroblock data MB(f) of the present frame supplied from the switch 428 and motion-compensated macroblock data of an I or P picture which precede in time the macroblock data MB(f) of the present frame. Other two of the six types of macroblock data are the macroblock data MB(f) of the present frame supplied from the switch 428 and motion-compensated macroblock data of an I or P picture which follow in time the macroblock data MB(f) of the present frame. Still other two of the six types of macroblock data are interpolated macroblock data generated from I and P pictures which respectively precede and follow in time the macroblock data MB(f) of the present frame supplied from the switch 428 and interpolated macroblock data generated from P and P pictures which respectively precede and follow in time the macroblock data MB(f) of the present frame supplied from the switch 428.

Since the P picture contains encoded data using image data other than the image data of the present frame, i.e., inter-frame-encoded data, and also since the B picture comprises only inter-frame-encoded data, the P and B pictures cannot be decoded on their own. To solve this problem, a plurality of related pictures are put together into one GOP (Group Of Pictures) which is processed as a unit.

Usually, a GOP comprises an I picture or a plurality of I pictures and zero or a plurality of non-I pictures. For an easier understanding of the present invention, it is assumed that intra-frame-encoded image data represent an I picture, bidirectionally predicted and encoded image data represent a B picture, and a GOP comprises a B picture and an I picture.

In FIG. 1, an I picture is generated along a route from the frame memory 422 through the switch 428, the DCT circuit 430, the quantizer 431 to the variable length coder 432, and a B picture is generated along a route from the input terminal 400 through the motion compensator 424, the adder 426, the output terminal of the frame memory 423, the motion compensator 425, the adder 426, the adder 427, the switch 428, the DCT circuit 430, the quantizer 431 to the variable length coder 432.

The DCT circuit 430 converts the output data from the switch 428, in each block of 8 lines×8 pixels, from DC data into coefficient data of harmonic AC components. The quantizer 431 quantizes the coefficient data from the DCT circuit 430 at a predetermined quantization step size. The variable length coder 432 encodes the quantized coefficient data from the quantizer 431 and the motion vector data MV from the motion detector 421 according to the Huffman encoding process, the run-length encoding process, or the like. The output encoder 433 generates inner and outer parity bits respectively with respect to the encoded data outputted from the variable length coder 432 and the decoding information EDa from the controller 435. The output encoder 433 then adds the generated inner and outer parity bits respectively to the encoded data outputted from the variable length coder 432 and the decoding information EDa from the controller 435, thereby converting a train of data to be outputted into a train of data in a product code format. A synchronizing signal and other signals are also added to the train of data in the product code format.

Data contained in a GOP when it is outputted include decoding information, frame data of a B picture, decoding information, and frame data of an I picture, arranged successively in the order named from the start of the GOP.

The decoding information EDa comprises GOP start data indicating the start of the GOP, the inter-/intra-frame selection signal SEL referred to above, and other data. If the GOP start data have a value of "1", then the GOP start data indicate that the frame data with the GOP start data added to its start are frame data at the start of the GOP. If the GOP start data have a value of "0", then the GOP start data indicate that the frame data with the GOP start data added to its start are not frame data at the start of the GOP, but frame data at the start of a picture.

Operation of the image encoder shown in FIG. 1 will be described below.

For generating an I picture of a GOP, the inter/intra-frame decision unit 429 controls the switch 428 to connect the movable contact "c" to the intra-frame fixed contact "b". Frame image data read from the frame memory 422 are encoded by the DCT circuit 430, the quantizer 431, and the variable length coder 432. At this time, decoding information EDa is supplied from the controller 435 to the output encoder 433. To the encoded data from the variable length coder 432 and the decoding information EDa from the controller 435, there are added inner and outer parity bits by the output encoder 433, which then outputs an I picture.

For generating a B picture of a GOP, the inter/intra-frame decision unit 429 controls the switch 428 to connect the movable contact "c" to the inter-frame fixed contact "a".

The motion detector 421 detects a motion successively in the macroblock data MB(f) of the present frame and the macroblock data MB(f+1) in the frame image data of the following frame. As a result, the motion detector 421 selects the macroblock data MB(f+1) which is closest to the macroblock data MB(f) of the present frame are selected, and produces motion vector data MV indicative the position of the macroblock data MB(f+1) with respect to the macroblock data MB(f). Similarly, the motion detector 421 detects a motion successively in the macroblock data MB(f) of the present frame and the macroblock data MB(f−1) in the frame image data of the preceding frame. As a result, the motion detector 421 selects the macroblock data MB(f−1) which is closest to the macroblock data MB(f) of the present frame are selected, and produces motion vector data MV indicative the position of the macroblock data MB(f+1) with respect to the macroblock data MB(f).

The two motion vector data MV thus produced are supplied to the variable length coder 432 and also to the motion compensators 424, 425. The motion compensator 424 extracts the macroblock data MB(f+1) represented by the motion vector data MV, and supplies the extracted macroblock data MB(f+1) to the adder 426. The motion compensator 425 extracts the macroblock data MB(f−1) represented by the motion vector data MV, and supplies the extracted macroblock data MB(f−1) to the adder 426.

The adder 426 adds the macroblock data MB(f+1) from the motion compensator 424 and the macroblock data MB(f−1) from the motion compensator 425, and multiplies the sum by "½", thereby averaging the macroblock data MB(f+1), MB(f−1). The average data from the adder 426 are supplied to the adder 427 through the subtractive input terminal thereof. The additive input terminal of the adder 427 is supplied with the macroblock data MB(f) of the present frame read from the frame memory 422. The adder 427 subtracts the average data from the adder 426 from the macroblock data MB(f) of the present frame. The adder 427 produces output data which are inter-frame-encoded by the DCT circuit 430, the quantizer 431, and the variable length coder 432. The encoded data are supplied to the output coder 433, which adds the decoding information EDa and inner and outer parity bits to the encoded data, and outputs a B picture.

When all the macroblock data MB(f) stored in the frame memory 422 have been inter-frame-encoded in the manner described above, the frame image data stored in the frame memory 422 are read and supplied to the frame memory 423, and stored as image data of a previous frame in the frame memory 423. The frame memory 422 is now supplied with the image data of the next frame as the image data of the present frame.

The concept of the encoding process carried out by the image encoder will be described below with reference to FIG. 2 of the accompanying drawings.

FIG. 2 shows the frame image data of successive frames that are to be encoded which are denoted by respective frame numbers F1–F10. Those frame image data which are shown hatched are frame image data I1, I3, I5, I7, I9 as I pictures, and those frame image data which are shown blank are frame image data B2, B4, B6, B8, B10 as B pictures (or frame image data P2, P4, P6, P8, P10 as P pictures). The frame image data I1, B2 of the frame numbers F1, F2 make up a GOP, the frame image data I3, B4 of the frame numbers F3, F4 make up a GOP, the frame image data I5, B6 of the frame numbers F5, F6 make up a GOP, the frame image data I7, B8 of the frame numbers F7, F8 make up a GOP, and the frame image data I9, B10 of the frame numbers F9, F10 make up a GOP.

Of the frame image data shown in FIG. 2, the frame image data I1, I3, I5, I7, I9 of the frame numbers F1, F3, F5, F7, F9 are read from the frame memory 422 and supplied through the switch 428 to the DCT circuit 430, the quantizer 431, and the variable length coder 432, which intra-frame-encode the supplied frame image data.

For encoding image data of a B picture, as indicated by the arrows in FIG. 2, frame image data on both sides of frame image data to be encoded, i.e., frame image data of frames which precede and follow the frame image data to be encoded, are used to inter-frame-encode the image data. For example, the frame image data I1, I3 of the frames which precede and follow the frame image data of the frame number F2 are used to encode the frame image data of the frame number F2, and the frame image data I3, I5 of the frames which precede and follow the frame image data of the frame number F4 are used to encode the frame image data of the frame number F4.

For example, for encoding the frame image data B2 of the frame number F2, the frame image data B2 are stored as the frame image data of the present frame in the frame memory 422 shown in FIG. 1. At this time, the frame memory 423 stores the frame image data I1 of the frame number F1 as the frame image data of the preceding frame. When the frame image data B2 start being encoded, the frame image data I3 of the frame number F3 are supplied as the frame image data of the following frame through the input terminal 400.

The motion detector 421 detects a motion with respect to the macroblock data MB(f) of the frame image data B2 of the frame number F2 which are read from the frame memory 422 and the macroblock data MB(f−1) of the frame image data I1 of the frame number F1 which are read from the frame memory 423, and, as a result, produces one set of motion vector data MV. The motion detector 421 detects a motion with respect to the macroblock data MB(f) of the frame image data B2 of the frame number F2 which are read from the frame memory 422 and the macroblock data MB(f+1) of the frame image data I3 of the frame number F3 which are supplied from the input terminal 400, and, as a result, produces one set of motion vector data MV.

The motion compensator 424 extracts the macroblock data MB(f−1) of the frame image data I1 of the frame number F1 which are indicated by the motion vector data MV. The motion compensator 425 extracts the macroblock data MB(f+1) of the frame image data I3 of the frame number F3 which are indicated by the motion vector data MV. The macroblock data MB(f−1), MB(f+1) which are extracted respectively by the motion compensators 424, 425 have their contents, i.e., their arrangement of the levels of pixel data in the macroblocks, closet to the macroblock data MB(f) of the frame image data B2 of the frame number F2.

The adder 426 adds the macroblock data MB(f−1) of the frame image data I1 of the frame number F1 from the motion compensator 424 and the macroblock data MB(f+1) of the frame image data I3 of the frame number F3 from the motion compensator 425 and multiplies the sum by "½" with the ½ multiplier therein, thereby producing average data representing the average of the two macroblock data MB(f−1), MB(f+1). The average data are supplied from the adder 426 to the adder 427 through the subtractive input terminal thereof.

The adder 427 is also supplied with the macroblock data MB(f) of the frame image data B2 of the frame number F2 through the additive input terminal thereof. The adder 427 thus subtracts the average data from the macroblock data MB(f) of the frame image data B2 of the frame number F2, producing differential data. The produced differential data are supplied through the switch 428 to the DCT circuit 430, the quantizer 431, and the variable length coder 432, which encode the differential data. The above process is effected on all the macroblock data MB(f) of the frame image data B2 of the frame number F2, thereby interframe-encoding the frame image data B2 of the frame number F2. The frame image data B4, B6, B8, F10 of the frame numbers F4, F6, F8, F10 are similarly inter-frame encoded.

The concept of a decoding process will be described below with reference to FIG. 2. FIG. 2 shows the frame image data to be decoded of successive image frames which are denoted by respective frame numbers F1~F10. Those frame image data which are shown hatched are frame image data as I pictures, and those frame image data which are shown blank are frame image data as B pictures (or frame image data as P pictures).

Of the frame image data shown in FIG. 2, the frame image data I1, I3, I5, I7, I9 of the frame numbers F1, F3, F5, F7, F9 are decoded by the image decoder and then outputted as reproduced image data.

As indicated by the arrows in FIG. 2, frame image data as a B picture are decoded using frame image data on both sides of the frame image data to be decoded, i.e., frame image data of frames which precede and follow the frame image data to be decoded. For example, the frame image data I1, I3 of the frames which precede and follow the frame image data B2 of the frame number F2 are used to decode the frame image data B2 of the frame number F2.

For example, for decoding the frame image data B2 of the frame number F2, the frame image data I1 of the frame number F1 as an I picture and the frame image data I3 of the frame number F3 as an I picture are used to decode the frame image data B2 of the frame number F2. The decoding process employs the motion vector data which have been produced by the motion detection with respect to the frame image data B2 of the frame number F2 and the frame image data I1 of the frame number F1, and also the frame image data B2 of the frame number F2 and frame image data I3 of the frame number F3.

The macroblock data indicated by the motion vector data are extracted from the frame image data of the frame number F1, and the macroblock data indicated by the motion vector data are extracted from the frame image data of the frame number F3. These macroblock data are added to each other, and averaged to produce average data by being multiplied by the coefficient "½". The differential data of the frame image data B2 of the frame number F2 and the average data are added to each other, thereby restoring the macroblock data of the frame image data B2 of the frame number F2.

The above compression encoding process is employed when digital video data are recorded on magnetic tapes, optical disks such as CD-ROMs, and hard disks. For compressing and encoding moving image data of a long period of time, such as movie image data and recording all the compressed and encoded moving image data on such a storage medium, it is necessary that the amount of all image data to be recorded which have been compressed and encoded be equal to or smaller than the remaining amount of data available after the decoding information EDa and the parity bits are removed from the amount of all data that can be recorded on the storage medium.

For example, CD-ROMs are mass-produced by a stamper as a master. Such a stamper is manufactured by the following manufacturing steps:

1. A glass substrate is coated with a resist material, forming a resist film on the glass substrate.

2. Digital video data which have been compressed and encoded that are carried by a laser beam emitted from a laser beam source are applied to the resist film.

3. Only the area of the resist film to which the laser beam has been applied is removed by development.

4. A melted resin such as polycarbonate or the like is flowed onto the resist film on the glass substrate.

5. After the resin layer is hardened, it is peeled off the glass substrate.

6. The irregular surface of the resin layer is plated by electroless plating, so that a plated layer is formed on the irregular surface of the resin layer.

7. The plated layer is then plated with a metal such as nickel or the like, so that a metal plated layer is formed on the plated layer on the irregular surface of the resin layer.

8. The resin layer is then peeled off the plated layer on the irregular surface of the resin layer.

The remaining plated layer after the resin layer is peeled off serves as the stamper.

Unlike hard disks and magnetooptical disks, digital video data are compressed, encoded, and recorded on optical disks such as CD-ROMs when the above stamper is manufactured. If the amount of all compressed and encoded image data to be recorded is smaller than the amount of all image data that can be recorded on the glass substrate, then all the compressed and encoded image data are recorded on the glass substrate, only leaving a blank area free of any recorded digital video data in the recordable area of the glass substrate. However, if the amount of all compressed and encoded image data to be recorded is greater than the amount of all image data that can be recorded on the glass substrate, then some of all the compressed and encoded image data to be recorded are not recorded on the glass substrate.

Storage mediums such as magnetooptical disks, hard disks, or the like where data can be recorded repeatedly in the same storage area can remedy the above problem by recording the data again on the storage medium though it results in an expenditure of additional time. However, storage mediums such as CD-ROMs which are mass-produced by one or more stampers cannot alleviate the above drawback unless a stamper or stampers are fabricated again, resulting in a much greater expenditure of time and expenses. Once CD-ROMs mass-produced by a stamper or stampers that are fabricated from a glass substrate which misses some of all the compressed and encoded image data to be recorded are on the market, the CD-ROM manufacturer has to collects those CDROMs from the market.

According to one conventional solution, a single quantization step size capable of recording all image data to be recorded on a storage medium is determined based on the amount of all image data to be recorded and the storage capacity of the storage medium, and the data of the quantization step size are supplied to a quantizer when the image data are recorded on the storage medium. Stated otherwise, the quantization step size in the quantizer 431 in the image encoder shown in FIG. 1 may be set to a predetermined quantization step size. In this manner, all image data to be recorded can reliably be recorded on a storage medium.

Moving image data vary at different degrees from frame to frame. Moving objects in moving images have various complex moving patterns including simple translation, different moving speeds, different moving directions, changes in moving directions per unit time, changes in the shape of moving objects, etc. If the moving pattern of a moving object is not simple translation, then when macroblock data closest to macroblock data in frame image data to be encoded of a present frame are extracted from frame image data of a preceding or following frame using motion vector data produced as a result of the detection of a motion by the motion detector 21 shown in FIG. 1, a pattern of the levels of pixel data in the extracted macroblock data of the preceding or following frame is not greatly different from a pattern of the levels of pixel data in the macroblock data of the present frame.

Therefore, when the amount of differential data produced by subtracting the average data of the macroblock data of the preceding and following frame from the macroblock data of the present frame is not greatly different from the amount of the macroblock data of the present frame. Specifically, when frames of moving image data are observed, since the moving image data do not vary constantly from image to image, the amount of data produced in each macroblock, each frame, and hence each GOP is not constant.

Therefore, the moving image data, the amount of which produced in each macroblock, each frame, and hence each GOP is not constant, are always quantized at a constant quantization step size. When the amount of differential data from the adder 427 shown in FIG. 1 is large, the DCT circuit 430 produces many types of coefficient data, but such coefficient data are quantized roughly at the single quantization step size by the quantizer 431. Conversely, when the amount of differential data from the adder 427 shown in FIG. 1 is smaller, the DCT circuit 430 produces fewer types of coefficient data, but such coefficient data are quantized finely at the single quantization step size by the quantizer 431.

For example, it is assumed that when the amount of differential data is large, "20" types of coefficient data are produced, and when the amount of differential data is smaller, "4" types of coefficient data are produced, and that the quantization step size is "4". When the amount of differential data is large, the coefficient data are quantized at the quantization step size of "4" even though there are "20" types of coefficient data. When the amount of differential data is smaller, the coefficient data are quantized at the quantization step size of "4" even though there are only "4" types of coefficient data. Accordingly, when the amount of information is large, it is quantized roughly, and when the amount of information is smaller, it is quantized finely. Since the information cannot be quantized appropriately depending on the amount thereof, the quality of an image restored from an image which contains a large amount of information, in particularly, is poor.

There has been a demand for a method of and a system for quantizing image data appropriately depending on the amount of differential data, and recording all image data reliably on a storage medium.

SUMMARY OF THE INVENTION

It is therefore an object of the present invention to provide a method of and a system for encoding image information, and a method of and a system for recording image information, to record all image data reliably on a storage medium without lowering the quality of a restored image.

According to the present invention, there is provided a method of recording image information on a recording medium, comprising the steps of storing motion vector information produced by detecting a motion of image information outputted from a signal source, detecting an amount of encoded image information, in a predetermined unit, produced by encoding the image information outputted from the signal source using the motion vector information, assigning an amount of information in the amount of information recordable on the recording medium to image information in the predetermined unit based on the amount of encoded image information in the predetermined unit, obtaining compression ratio information representing a compression ratio used when the image information is encoded, based on the assigned amount of information, encoding the image information outputted from the signal source using the motion vector information and the compression ratio information, and recording the image information thus encoded on the recording medium.

According to the present invention, there is also provided a method of encoding image information, comprising the steps of storing motion vector information produced by detecting a motion of image information outputted from a signal source, detecting an amount of encoded image information, in a predetermined unit, produced by encoding the image information outputted from the signal source using the motion vector information, assigning an amount of information in the amount of information usable on a recording medium to image information in the predetermined unit based on the amount of encoded image information in the predetermined unit, obtaining compression ratio information representing a compression ratio used when the image information is encoded, based on the assigned amount of information, and encoding the image information outputted from the signal source using the motion vector information and the compression ratio information.

According to the present invention, there is further provided a system for recording image information on a recording medium, comprising first memory means for storing image information outputted from a signal source, motion detecting means for effecting a motion detecting process on main image information from the signal source and auxiliary image information from the first memory means to produce motion vector information, vector information memory means for storing the motion vector information produced by the motion detecting means, encoding means for encoding the image information outputted from the signal source, recording means for recording the image information encoded by the encoding means on the recording medium, decoding means for decoding the image information encoded by the encoding means, second memory means for storing the image information decoded by the decoding means, motion compensating means for reading image information represented by the motion vector information produced by the motion detecting means, from the second memory means, first adding means for subtracting the auxiliary image information read by the motion compensating means from the main image information from the signal source, second adding means for adding the image information decoded by the decoding means and the auxiliary image information read by the motion compensating means, and control means for detecting the amount of the image information encoded by the encoding means, obtaining compression ratio information representative of a compression ratio in the encoding means based on the detected amount of the image information, supplying the compression ratio information to the encoding means to control the compression ratio in the encoding means, and controlling the first memory means, the motion detecting means, the vector information memory means, the encoding means, the recording means, the decoding means, the second memory means, the motion compensating means, the first adding means, and the second adding means, the control means comprising means for controlling the motion detecting means to produce the motion vector information, detecting the amount of the image information encoded by the encoding means, and calculating compression ratios of all the image information to be recorded, in a predetermined unit, based on the detected amount of the image information and an amount of information recordable on the recording medium, in a preprocessing procedure for producing the motion vector information and calculating the compression ratio in the encoding means, and means for supplying the motion vector information read from the vector information memory means to the motion compensating means to use the motion vector information in the motion compensating means, and controlling the compression ratio in the encoding means, when the image information outputted from the signal source is recorded on the recording medium by the recording means.

According to the present invention, there is also provided a system for recording image information on a recording medium, comprising memory means for storing image information outputted from a signal source, motion detecting means for effecting a motion detecting process on main image information from the signal source and auxiliary image information from the first memory means to produce motion vector information, vector information memory means for storing the motion vector information produced by the motion detecting means, encoding means for encoding the image information outputted from the signal source, recording means for recording the image information encoded by the encoding means on the recording medium, decoding means for decoding the image information encoded by the encoding means, supplying the decoded information to the memory means, and storing the decoded information in the memory means, motion compensating means for reading image information represented by the motion vector information produced by the motion detecting means, from the memory means, first adding means for subtracting the auxiliary image information read by the motion compensating means from the main image information from the signal source, second adding means for adding the image information decoded by the decoding means and the auxiliary image information read by the motion compensating means, and control means for detecting the amount of the image information encoded by the encoding means, obtaining compression ratio information representative of a compression ratio in the encoding means based on the detected amount of the image information, supplying the compression ratio information to the encoding means to control the compression ratio in the encoding means, and controlling the memory means, the motion detecting means, the vector information memory means, the encoding means, the recording means, the decoding means, the motion compensating means, the first adding means, and the second adding means, the control means comprising means for controlling the motion detecting means to produce the motion vector information, detecting the amount of the image information encoded by the encoding means, and calculating compression ratios of all the image information to be recorded, in a predetermined unit, based on the detected amount of the image information and an amount of information recordable on the recording medium, in a preprocessing procedure for producing the motion vector information and calculating the compression ratio in the encoding means, and means for supplying the motion vector information read from the vector information memory means to the motion compensating means to use the motion vector information in the motion compensating means, and controlling the compression ratio in the encoding means, when the image information outputted from the signal source is recorded on the recording medium by the recording means.

According to the present invention, there is further provided a system for encoding image information, comprising motion detecting means for detecting a motion of image information outputted from a signal source to produce motion vector information, memory means for storing the motion vector information produced by the motion detecting means, encoding means for encoding the image information outputted from the signal source based on the motion vector information produced by the motion detecting means or the motion vector information stored in the memory means, and control means for controlling the motion detecting means, the memory means, and the encoding means, the control means comprising means for storing the motion vector information produced by the motion detecting means in the memory means, determining an amount of information in a predetermined unit of the encoded image information from the encoding means, and determining compression ratio information representing a compression ratio in the encoding means, in the predetermined unit with respect to all image information to be recorded, based on the determined amount of information and a usable amount of information, and means for reading the motion vector information from the memory means and supplying the read motion vector information and the compression ratio information to the encoding means.

Before image information from the signal source is recorded on the recording medium by the recording means, motion vector information produced by the motion detecting means is stored in the memory means, and the amount of information with respect to an predetermined unit of encoded information from the encoding means is determined. Based on the determined amount of information and the amount of information recordable on the recording medium, compression ration information indicative of a compression ratio in the encoding means in the recording process is determined in the predetermined unit. When the image information from the signal source is recorded on the recording medium by the recording means, the motion vector information stored in the memory means is read, and the read motion vector information and the compression ratio information are supplied to the encoding means. Therefore, in a preprocessing procedure prior to the recording process, it is possible to obtain the motion vector information and the compression ratio information in the predetermined unit of all the image information for recording all the image information from the signal source on the recording medium. In the recording process, the image information is encoded using the motion vector information and the compression ratio information, and recorded on the recording medium.

BRIEF DESCRIPTION OF THE DRAWINGS

FIG. 3A is a view of a source image recording medium and a storage medium;

FIG. 3B is a view showing an image of an (n−1)th frame, illustrative of translation of an object;

FIG. 3C is a view showing an image of an nth frame, illustrative of translation of an object;

FIG. 3D is a view showing an image of an (n−1)th frame, illustrative of random movement of an object;

FIG. 3E is a view showing an image of an nth frame, illustrative of random movement of an object;

FIG. 4A is a diagram illustrative of the concept of a fixed-rate encoding process;

FIG. 4B is a diagram illustrative of the concept of a variable-rate encoding process;

FIG. 4C is a diagram illustrative of a comparison between the fixed and variable rate encoding processes;

FIGS. 7A through 7C are diagrams of table data stored in respective tables in a table area 64b of a RAM in the digital video data recording system;

FIG. 7D is a diagram showing motion vector data recorded on a hard disk;

FIG. 19 is a diagram showing a recording table used in the digital video data recording system shown in FIG. 18;

DETAILED DESCRIPTION OF THE PREFERRED EMBODIMENTS

A. Principles of the Invention

Figure 1:
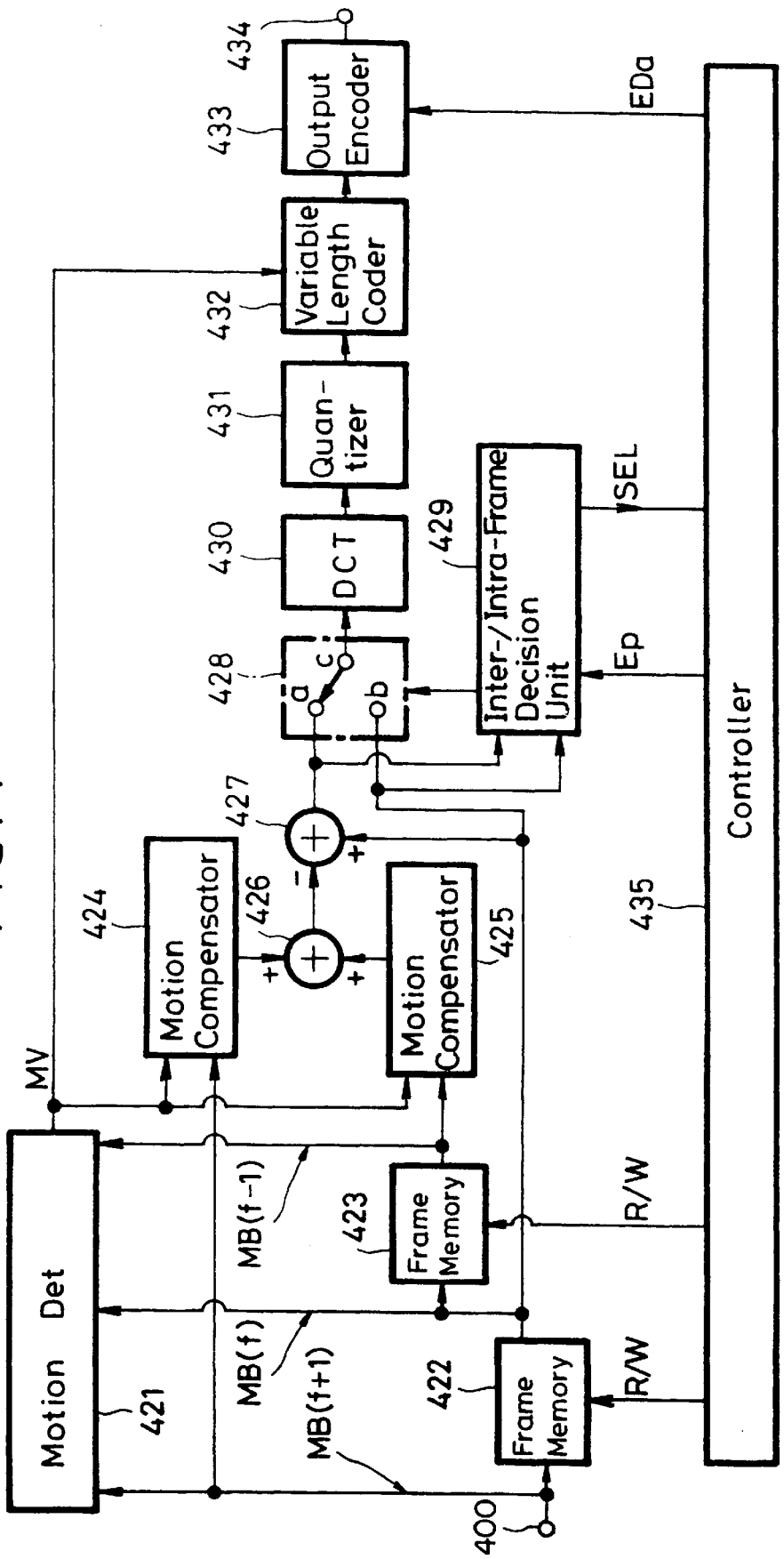
FIG. 1 is a block diagram of a conventional image encoder.
Figure 2:
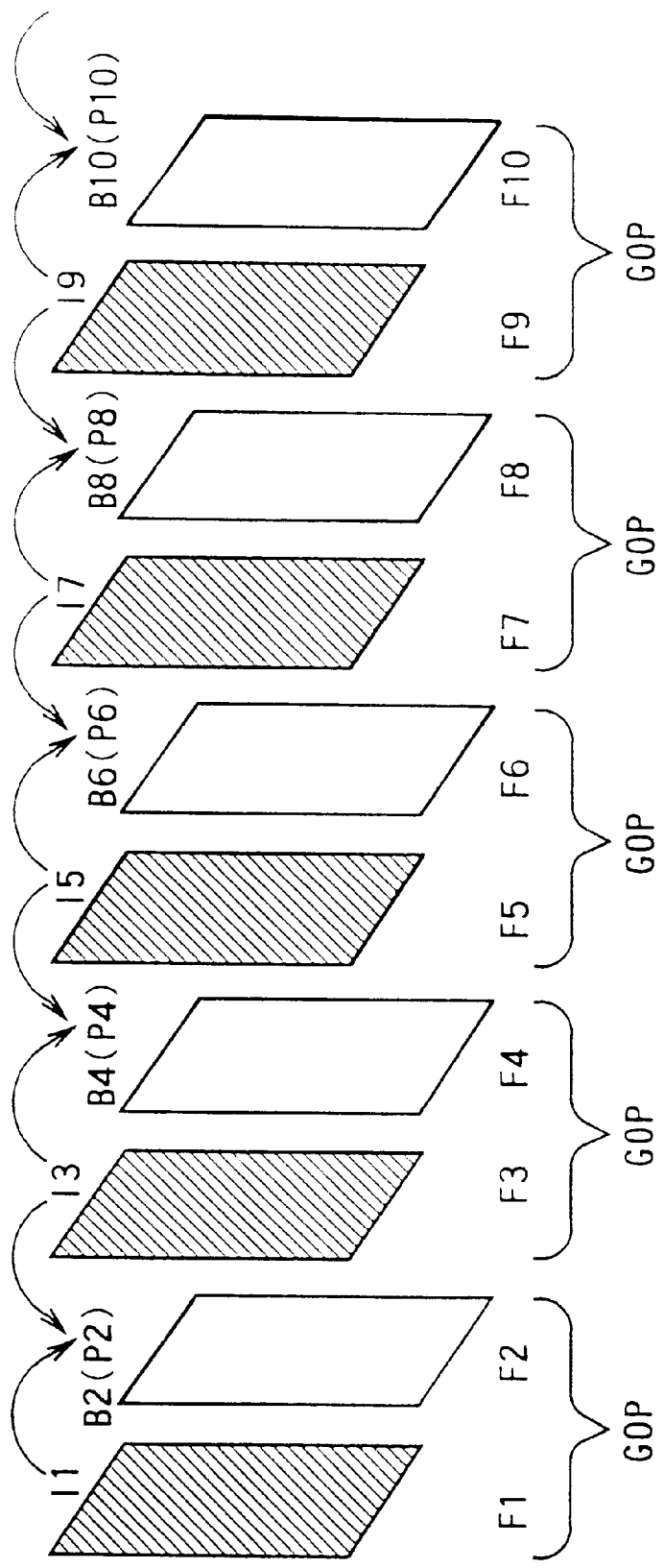
FIG. 2 is a diagram illustrative of an encoding process carried out by the image encoder shown in FIG. 1 and a decoding process carried out by an image decoder.

FIGS. 3A through 3E and 4A through 4C show the principles of the present invention.

As shown in FIG. 3A, a source image recording medium comprises a magnetic tape, for example, and a storage medium comprises an optical disk, for example, and it is assumed that source image data recorded on the magnetic tape are recorded on the optical disk. It is necessary that the source image data which have been recorded on the magnetic tape for a recording time T be fully recorded on the optical disk which has a storage capacity S. If the optical disk comprises a CD-ROM or the like which is manufactured by a stamper, then the process of recording the source image data on the optical disk is more strictly a process of recording the source image data on a glass substrate for fabricating a stamper which is used to manufacture the optical disk.

FIGS. 3B and 3C and FIGS. 3D and 3E show frame image data of (n−1)th and nth frames which are extracted from a series of frame image data that are produced when a running chick is shot by a video camera which is fixed. FIG. 3B shows preceding frame image data V(n−1) of an (n−1)th frame, and FIG. 3C shows present frame image data V(n) of an nth frame which follows in time the preceding frame image data V(n−1) shown in FIG. 3B. FIG. 3D shows preceding frame image data V(n−1) of an (n−1)th frame, and FIG. 3E shows present frame image data V(n) of an nth frame which follows in time the preceding frame image data V(n) shown in FIG. 3D.

For illustrative purpose, it is assumed that the size of one macroblock, described above, is large enough to surround chicks Pi(n−1) and Pi(n) shown in FIGS. 3B through 3E.

The chick Pi(n−1) which is a moving object in the image represented by the preceding frame image data V(n−1) is positioned as shown in FIG. 3B. In the image represented by the present frame image data V(n) which follows the preceding frame image data V(n−1), the chick Pi is positioned at a right-hand end as shown in FIG. 3C. This is because the chick has run between the two frames within a range that can be shot by the video camera.

The above translation of the chick will be described below in terms of macroblock data. In the preceding frame image data V(n−1), macroblock data B(n−1) are spaced a distance m1 from the left-hand end of the image as shown in FIG. 3B. In the present frame image data V(n) which follows the preceding frame image data V(n−1), macroblock data B(n) are spaced a distance m2 from the left-hand end of the image as shown in FIG. 3C. These macroblock data B(n−1), B(n) are identical to each other.

For motion detection, an agreement between the macroblock data B(n) of the present frame and all macroblock data in a search area which is established in the preceding frame image data V(n−1) is detected, and motion vector data are produced based on the macroblock data of the preceding frame which provide the best agreement. For motion compensation, the macroblock data B(n−1) represented by the motion vector data are extracted from preceding frame image data V(n−1), and the extracted macroblock data B(n−1) of the preceding frame are subtracted from the macroblock data B(n) of the present frame.

When the chick is translated as shown in FIGS. 3B and 3C, therefore, a pattern of the levels of pixel data in the macroblock data B(n−1) of the preceding frame and a pattern of the levels of pixel data in the macroblock data B(n) of the present frame are identical to each other, and any differential data produced when the extracted macroblock data B(n−1) are subtracted from the macroblock data B(n) are "0". Consequently, the amount of differential data is minimum when an object is translated.

In FIGS. 3D and 3E, the chick Pi(n−1) in the image represented by the preceding frame image data V(n−1) and the chick Pi(n) in the image represented by the present frame image data V(n) face in different directions, and the chick is not completely translated in an interval of time between these two frames. In this case, there is almost no similarity between a pattern of the levels of pixel data in the macroblock data B(n−1) of the preceding frame and a pattern of the levels of pixel data in the macroblock data B(n) of the present frame, and any differential data produced when the extracted macroblock data B(n−1) are subtracted from the macroblock data B(n) are large. Consequently, the amount of differential data is large when an object makes a complex motion.

Image data characterized by a smaller amount of differential data will hereinafter referred to as an "image of good encoding efficiency", and image data characterized by a larger amount of differential data will hereinafter referred to as an "image of poor encoding efficiency".

Images include images of good encoding efficiency and images of poor encoding efficiency. Encoding processes include a fixed-rate encoding process and a variable-rate encoding process in which the quantization step size is varied depending on the complexity of image data to be encoded. The fixed-rate encoding process, the variable-rate encoding process, and the difference between the fixed- and variable-rate encoding processes will be described below with reference to FIGS. 4A through 4C.

FIG. 4A is illustrative of the fixed-rate encoding process. In FIG. 4A, the vertical axis represents the amount of generated data, the horizontal axis represents time in terms of seconds (t), S indicates the storage capacity of the storage medium shown in FIG. 3A, T indicates a period of time for which source image data are recorded on the source image recording medium, and ts indicates the duration of time of any optional scene, e.g., a GOP.

In the fixed-rate encoding process, since a quantizer has a constant quantization step size, the amount of encoded data is of a constant value x(i) as shown in FIG. 4A regardless of whether image data to be encoded represents an image of good encoding efficiency or an image of poor encoding efficiency.

FIG. 4B is illustrative of the variable-rate encoding process. In FIG. 4B, the vertical axis represents the amount (d) of generated data, the horizontal axis represents time in terms of seconds (t), T indicates a period of time for which source image data are recorded on the source image recording medium, ts indicates the duration of time of any optional scene, e.g., a GOP, and d(i−2), d(i−1), . . . , d(i+3) indicate the respective amounts of generated data in respective scenes, with the progressively greater values in parentheses signifying more subsequent scenes.

In the variable-rate encoding process, a quantizer has a variable quantization step size which is varied depending on the complexity of image data to be encoded. If the image data to be encoded represents an image of good encoding efficiency, then the variable quantization step size of the quantizer is reduced. If the image data to be encoded represents an image of poor encoding efficiency, then the variable quantization step size of the quantizer is increased. Therefore, as shown in FIG. 4B, the amount of encoded data varies from scene to scene.

FIG. 4C illustrates the difference between the fixed- and variable-rate encoding processes. In FIG. 4C, the vertical axis represents the bit rate, and the horizontal axis represents time in terms of seconds (t). The straight-line curve shows the bit rate when image data are encoded by the fixed-rate encoding process. The broken-line curve shows the bit rate when image data are encoded by the variable-rate encoding process. In FIG. 4C, Sa represents an image of good encoding efficiency, and Sb represents an image of poor encoding efficiency.

As shown in FIG. 4C, when the image data of the image Sa of good encoding efficiency are encoded by the variable-rate encoding process, the bit rate is lower by a stippled area than when they are encoded by the fixed-rate encoding process. Conversely, when the image data of the image Sa of good encoding efficiency are encoded by the fixed-rate encoding process, useless information is created. Stated otherwise, inasmuch as a small amount of differential data is quantized at a large quantization step size, the bit rate of the quantized image data is unduly increased.

When the image data of the image Sb of poor encoding efficiency are encoded by the variable-rate encoding process, the bit rate is higher by a hatched area than when they are encoded by the fixed-rate encoding process. Conversely, when the image data of the image Sb of poor encoding efficiency are encoded by the fixed-rate encoding process, a lack of information occurs. Stated otherwise, inasmuch as a large amount of differential data is quantized at a small quantization step size, the bit rate of the quantized image data is unduly reduced.

It follows from the above analysis of the fixed- and variable-rate encoding processes that it is necessary to employ the variable-rate encoding process in order to encode image data. However, if the source image data which have been recorded on the source image recording medium for the recording time T are to be fully recorded on the storage medium having the storage capacity S, then different preprocessing procedures are required by the fixed-rate encoding process and the variable-rate encoding process, respectively.

For encoding image data according to the fixed rate encoding process, a fixed quantization step size capable of fully recording the source image data which have been recorded on the source image recording medium for the recording time T on the storage medium having the storage capacity S is determined based on the recording time T and the storage capacity S, and data indicative of the fixed quantization step size are given to a quantizer to record the image data.

For encoding image data according to the variable-rate encoding process, the quantization step size used by a quantizer is variable depending on the amount of differential data. Before source image data are actually recorded on the storage medium, it is necessary to encode the source image data, detect the amounts of encoded data of respective scenes, and divide and assign the storage capacity of the storage medium to the amounts of encoded data of respective scenes in such a manner that the sum of the amounts of encoded data of respective scenes is equal to or smaller than the storage capacity of the storage medium.

It can be understood from the above explanation of the fixed- and variable-rate encoding processes that the quality of an image produced when image data encoded by the fixed-rate encoding process are decoded is lower than the quality of an image produced when image data encoded by the variable-rate encoding process are decoded, but the fixed rate encoding process is advantageous in that any preprocessing procedure required by the fixed-rate encoding process may be simple calculations only. While the quality of an image produced when image data encoded by the variable-rate encoding process are decoded is much higher than the quality of an image produced when image data encoded by the fixed-rate encoding process are decoded, the variable-rate encoding process is disadvantageous in that it requires a preprocessing sequence of encoding image data and detecting the amounts of encoded data of all image data to be recorded.

Because it is a vital requirement to increase the quality of images produced when encoded image data are decoded, however, the variable-rate encoding process as a whole is more advantageous than the fixed-rate recording process insofar as the preprocessing procedure of the variable-rate encoding process is simplified as much as possible.

B. Concept of 1st Embodiment

Figure 5:
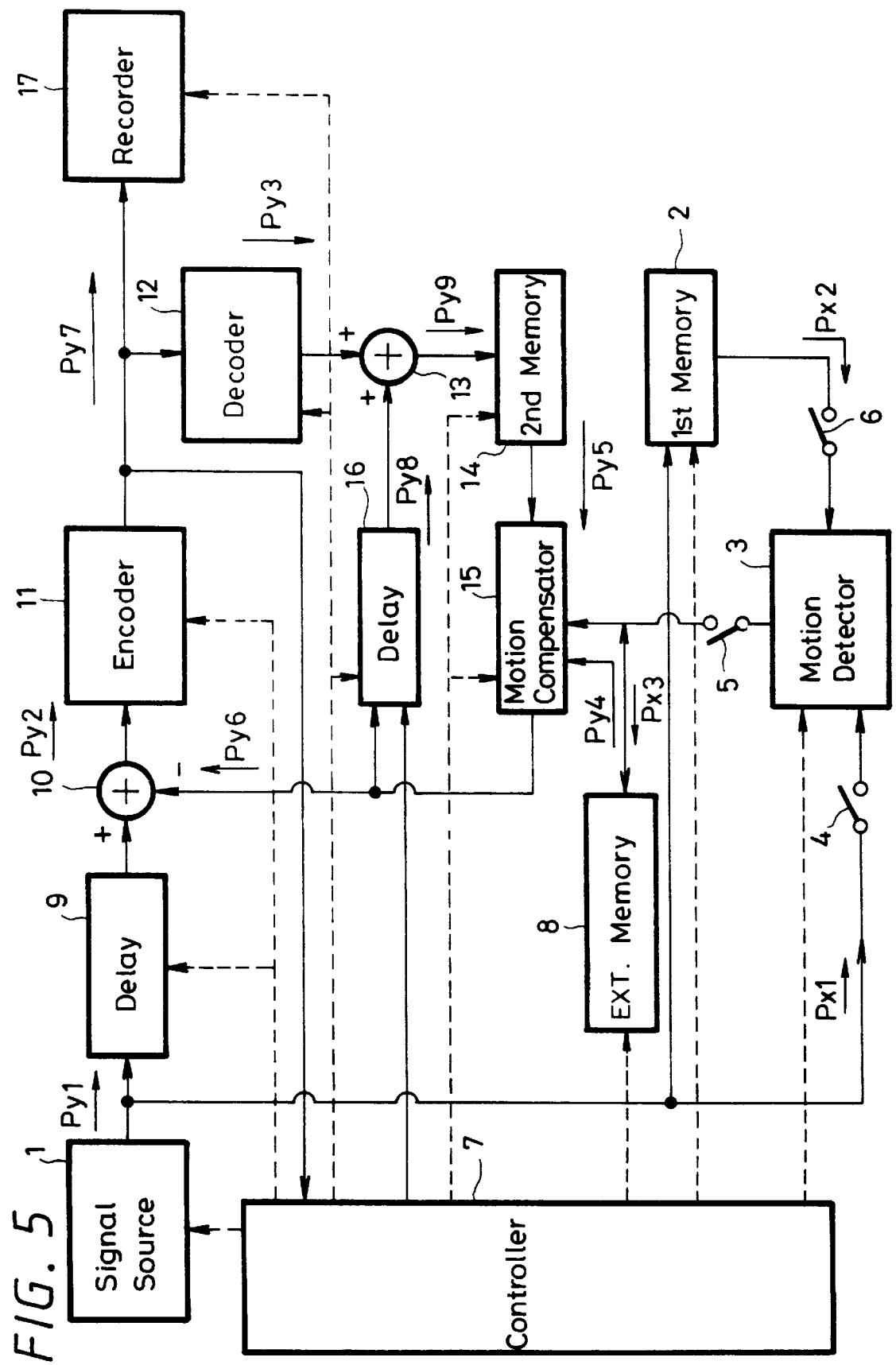
FIG. 5 is a block diagram of an image information recording apparatus, showing a conceptual arrangement of a first embodiment of the present invention.

FIG. 5 illustrates in block form an image information recording apparatus, showing a conceptual arrangement of a first embodiment of the present invention.

Structure:

As shown in FIG. 5, the image information recording apparatus comprises a signal source 1 for outputting image information to be recorded, a first memory 2 for storing the image information supplied from the signal source 1, a motion detector 3 for detecting a motion based on the image information supplied from the signal source 1 and the image information supplied from the first memory 2, switches 4, 6, 5 for selectively electrically connecting the signal source 1 and the motion detector 3, the first memory 2 and the motion detector 3, and the motion detector 3 and a motion compensator 15, an external memory 8 for storing motion vector data supplied from the motion detector 3, a delay unit 9 for delaying the image information supplied from the signal source 1, an adder 10 for subtracting motion-compensated image information supplied from the motion compensator from the delayed image information supplied from the delay unit 9, an encoder 11 for encoding output data from the adder 10, a decoder 12 for decoding the encoded output data supplied from the encoder 11, an adder 13 for adding decoded output data supplied from the decoder 12 and the image information which has been motion-compensated by the motion compensator 15 and delayed by a delay unit 16, a second memory 14 for storing output data from the adder 13, the motion compensator 15 for extracting image information represented by the motion vector data from the external memory 8 from the image information stored in the second memory 14, the delay unit 16 for delaying the image information supplied from the motion compensator 15, a controller 7 for controlling the above components and determining a compression ratio in the encoder 11 depending on the complexity of images, and a recorder 17 for recording the encoded output data supplied from the encoder 11.

Before image information from the signal source 1 is recorded on a recording medium by the recorder 17, the image information recording apparatus effects a preprocessing procedure of storing motion vector data produced by the motion detector 3 in the external memory 8 and determining a compression ratio for one or more images. The image information recording apparatus uses the motion vector data stored in the external memory 8 when the image information from the signal source 1 is recorded on the recording medium by the recorder 17.

Specifically, the image information recording apparatus first effects the preprocessing procedure. In the preprocessing procedure, the motion detector 3 determines motion vector data, which are stored in the external memory 8. The controller 7 determines a compression ratio for one or more images. Thereafter, the image information recording apparatus effects a recording process. In the recording process, image information represented by the motion vector data read from the external memory 8 is read from the second memory 14 by the motion compensator 15, and subtracted from image information supplied from the delay unit 9 by the adder 10. Differential data outputted from the adder 10 are encoded by the encoder 11 at the compression ratio determined in the preprocessing procedure, and encoded output data from the encoder 11 are recorded on the recording medium by the recorder 11.

In summary, in the case where the variable-rate encoding process is employed in the image information recording apparatus, motion vector data are determined in the preprocessing procedure and stored in the external memory 8, and when the image information from the signal source 1 is to be recorded on the recording medium by the recorder 17, the motion vector data stored in the external memory 8 are used, and compression ratio information determined in the preprocessing procedure is also used. Thus, the image information recording apparatus is not required to have the motion detector 3 carry out a motion detecting process, and is capable of fully recording the image information to be recorded, on the recording medium.

Operation in Preprocessing Procedure:

Operation of the image information recording apparatus in the preprocessing procedure will be described below.

The switches 4, 5, 6 are turned on by switch control signals from the controller 7. The motion detector 3 and the signal source 1, the motion detector 3 and the first memory 2, and the motion detector 3 and the external memory 8 are electrically connected when the respective switches 4, 6, 5 are turned on.

The signal source 1 starts to output image information under the control of the controller 7. The image information outputted from the signal source 1 is supplied to and stored in the first memory 2. The image information outputted from the signal source 1 is also supplied to the motion detector 3 as indicated by the arrow Px1 in FIG. 5. At the same time, the image information stored in the first memory 2 is read therefrom and supplied to the motion detector 3 as indicated by the arrow Px2 under the control of the controller 7. The motion detector 3 effects a motion detecting process on the image information from the signal source 1 and the image information from the first memory 2, and produces motion vector data based on the result of the motion detecting process. The motion vector data generated by the motion detector 3 are supplied to the external memory 8 as indicated by the arrow Px3. The external memory 8 stores the motion vector data supplied from the motion detector 3 according to a control signal supplied from the controller 7. The controller 7 determines a compression ratio for one or more images. The above preprocessing procedure is carried out with respect to all image data to be recorded.

Operation in Recording Process:

Operation of the image information recording apparatus in the recording process will be described below.

The switches 4, 5, 6 are turned off by switch control signals from the controller 7. The motion detector 3 and the signal source 1, the motion detector 3 and the first memory 2, and the motion detector 3 and the external memory 8 are electrically disconnected when the respective switches 4, 6, 5 are turned off.

The signal source 1 starts to output image information under the control of the controller 7. The image information outputted from the signal source 1 is supplied to the delay unit 9 as indicated by the arrow Py1. The image information is then delayed by the delay unit 9 for a period of time which is required by a motion compensating process in the motion compensator 15, and then supplied to the adder 10. The image information which is supplied to the adder 10 for the first time is outputted as it is from the adder 10 because no image information is supplied from the motion compensator 15 to the adder 10. The image information outputted from the adder 10 is supplied to the encoder 11 as indicated by the arrow Py2, and encoded by the encoder 11. The encoded image information is supplied to the decoder 12 as indicated by the arrow Py3, and decoded back to the original image information by the decoder 12. The decoded image information is supplied to the adder 13.

The image information which is supplied to the adder 13 for the first time is outputted as it is from the adder 13 because no image information is supplied from the motion compensator 15 through the delay unit 16 to the adder 13. The image information outputted from the adder 13 is supplied to the second memory 14, and stored in the second memory 14 according to a control signal from the controller 7.

The image information successively outputted from the signal source 1 is delayed for the above delay time by the delay unit 9, and then supplied to the adder 10 as indicated by the arrow Py1. At the same time, the motion vector data stored in the external memory 8 are read therefrom according to a control signal that is supplied from the controller 7 to the external memory 8. The motion vector data read from the external memory 8 are supplied to the motion compensator 15 as indicated by the arrow Py4. The motion compensator 15 reads image information represented by the motion vector data supplied from the external memory 8 from the second memory 14 as indicated by the arrow Py5. The image information read from the second memory 14 is supplied to the adder 10 as indicated by the arrow Py6.

The adder 10 subtracts the image information read from the second memory 14 by the motion compensator 15 from the image information supplied from the signal source 1 through the delay unit 9. Differential data outputted as a resultant sum from the adder 10 are supplied to the encoder 11 as indicated by the arrow Py2, and encoded by the encoder 11 based on the compression ratio information which has been determined in the preprocessing procedure. The encoded image information from the encoder 11 is then supplied to the recorder 17 as indicated by the arrow Py7, and recorded on the recording medium by the recorder 17.

The image information read by the motion compensator 15 is also supplied through the delay unit 16 to the adder 13 as indicated by the arrow Py8. The adder 13 adds the image information from the decoder 12 and the image information from the delay unit 16. Sum output data from the adder 13 are supplied to the second memory 14 as indicated by the arrow Py9, and stored in the second memory 14. The above recording process is carried out with respect to all image data to be recorded.

Advantages of the Concept of 1st Embodiment:

As can be seen from the above explanation of the concept of the first embodiment, the image information recording apparatus shown in FIG. 5 carries out the preprocessing procedure by determining motion vector data, and storing the motion vector data in the external memory 8, and carries out the recording process by effecting a motion compensating process using the motion vector data stored in the external memory 8 without effecting a motion detecting process in the motion detector 3, and subtracting image information produced by the motion compensation from image information to be encoded. Therefore, in the case where the encoder 11 employs the variable-rate encoding process, the recording process can reliably be carried out. Since it is not necessary in the recording process to effect a motion detecting process in the motion detector 3 which is of a large circuit scale, the consumption of electric energy by the image information recording apparatus is greatly reduced. Accordingly, the image information recording apparatus offers outstanding advantages in that it employs the variable-rate encoding process for improved image quality and simplifies the overall process for largely reducing the consumption of electric energy.

Figure 6:
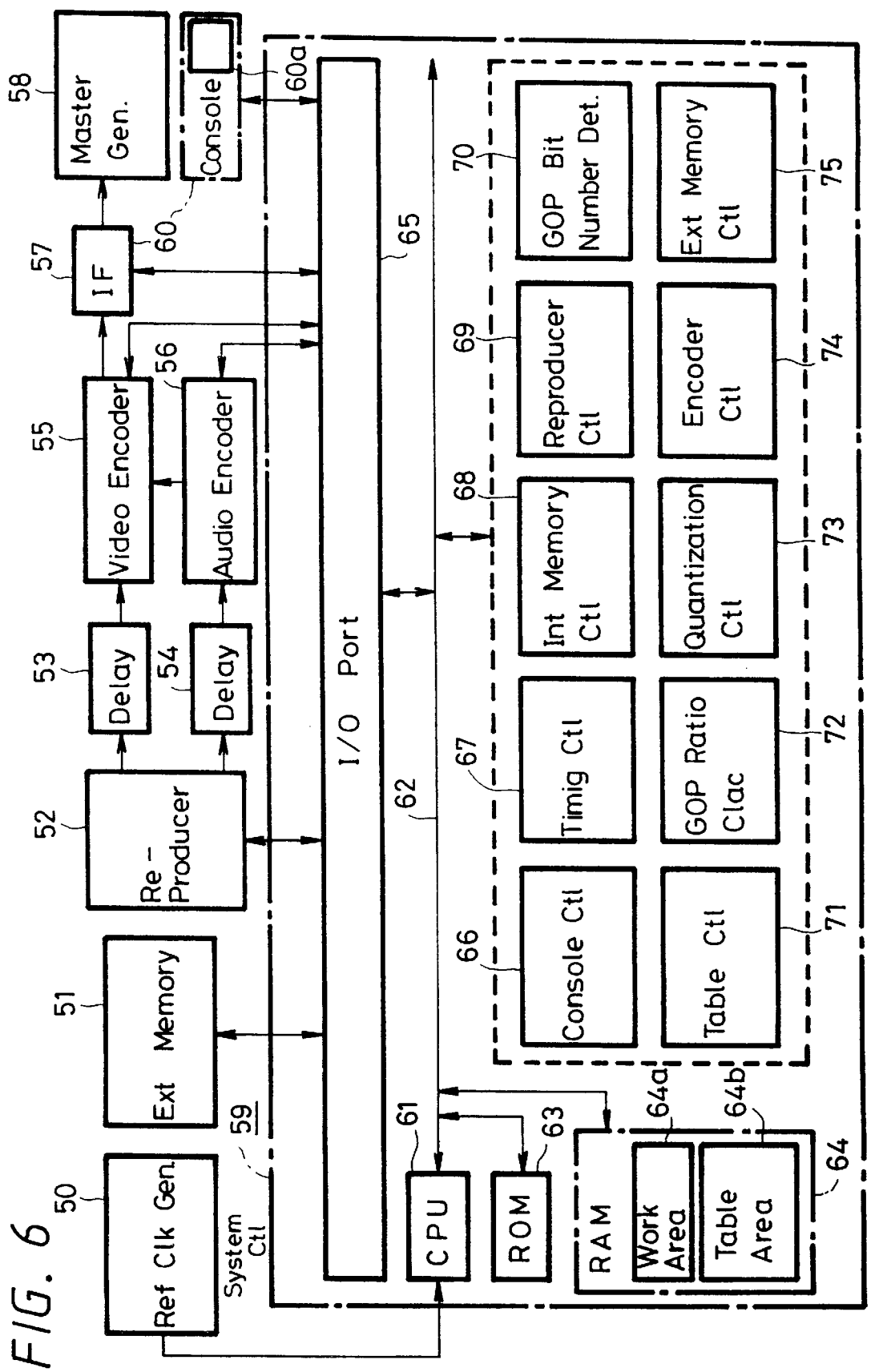
FIG. 6 is a block diagram of a digital video data recording system according to the first embodiment of the present invention.

Specific details of the first embodiment will be described below with reference to FIG. 6. In FIG. 6, a reproducer 52 corresponds to the signal source 1 shown in FIG. 5, a system controller 59 to the controller 7 shown in FIG. 5, an external memory 51 to the external memory 8 shown in FIG. 5, a master generator 58 to the recorder 17 shown in FIG. 5, and various circuits in a video encoder 55 to the remaining components shown in FIG. 5.

C. Structure and Operation of Digital Video Data Recording System

FIG. 6 shows in block form a digital video data recording system according to the first embodiment of the present invention. Structure:

As shown in FIG. 6, the digital video data recording system comprises a reference clock generator 50 having a quartz crystal oscillator, for example, an external memory 51 such as a hard disk drive or the like, a reproducer 52 such as a digital VTR or the like, a delay unit 53 for delaying video data from the reproducer 52 for a period of time which is required by an encoding process in an audio encoder 56, a video encoder 55 for encoding the video data delayed by the delay unit 53, a delay unit 54 for delaying audio data from the reproducer 52 for a period of time which is required by an encoding process in the video encoder 55, the audio encoder 56 for encoding the audio data delayed by the delay unit 54, an interface 57 for transmitting the encoded video data from the video encoder 55 and the encoded audio data from the audio encoder 56 to a master generator 58, a system controller 59 for controlling the above components, and a console 60 for giving instructions to the system controller 59.

The master generator 58 may comprise any one of various systems described below. If a disk to be manufactured as a final product is a read-only disk such as a CD-ROM or the like, then one of at least two systems may be employed for manufacturing the disk.

A first system is designed to manufacture a disk having two recording layers on one or both sides thereof. The first system comprises a device for exposing a resist layer on a glass substrate to a laser beam emitted from a semiconductor laser and modulated by recording data, a device for developing the exposed glass substrate, a device for flowing a melted resin such as polycarbonate or the like onto the glass substrate to form a first polycarbonate layer, a device for electrolessly plating the first polycarbonate layer which is peeled off the glass substrate after the first polycarbonate layer is hardened, plating the plated layer on the first polycarbonate layer with a metal such as nickel, forming grooves in a second polycarbonate layer, as melted, with a stamper which is produced by peeling off the first polycarbonate layer, plating the second polycarbonate layer, flowing melted polycarbonate onto the plated layer on the second polycarbonate layer or a surface of the second polycarbonate layer opposite to the plated layer to form a third polycarbonate layer thereon, forming grooves in the third polycarbonate layer with a stamper manufactured in the same manner as described above and carrying other video data recorded thereon, plating the third polycarbonate layer, and flowing a resin such as polycarbonate or the lie onto the plated layer to provide a protective layer.

A second system is designed to manufacture a disk having two recording layers on one or both sides thereof. The second system comprises a device for forming a resist layer on a disk of a resin such as polycarbonate or the like, a device for exposing the resist layer to a laser beam emitted from a semiconductor laser and modulated by recording data, a device for developing the exposed resin disk, a device for plating the developed resin disk, a device for flowing a melted resin such as polycarbonate or the like onto the plated layer, a device for forming a resist layer on the polycarbonate layer or a surface opposite thereto, exposing the resist layer to a laser beam emitted from the semiconductor laser and modulated by recording data, a device for developing the exposed layer, a device for plating the developed layer, a device for flowing a melted resin such as polycarbonate or the like onto the plated layer to provide a protective film.

For an optical disk such as a magnetooptical disk or a phase-change medium, the master generator 58 serves as a drive capable of recording information on and reproducing information from a disk which has a single recording layer on one side thereof, a disk which has a single recording layer on each of two sides thereof, a disk which has two recording layers on one side thereof, and a disk which has two recording layers on each of two sides thereof.

For recording information on and reproducing information from a disk having two recording layers, it is necessary to employ an optimum combination of processes of employing two recording layers of different transmittances, detecting a light beam reflected in focus among light beams reflected from the two recording layers, causing an emitted layer beam to be focused at different points on the two recording layers, varying the wavelength of an emitted layer beam with a wave plate, and employing reverse logic schemes on the two recording layers.

The console 60 has a group of keys for supplying various commands to the system controller 59 and also an LCD (Liquid Crystal Display) 60a.

The internal structure of the system controller 59 will be described below.

As shown in FIG. 6, the system controller 59 has a CPU 61 to which a bus assembly 62 comprising address, data, and control buses is connected. The system controller 59 also has a ROM 63 which stores program data, parameter data, etc., a RAM 64 including a work area 64A and a table area 64b, and an input/output port 65 for transmitting and receiving information to the above components of the digital video data recording system, all connected to the bus assembly 62.

When the digital video data recording system is turned on, the CPU 61 performs various functions which are indicated in an area surrounded by the broken lines in the system controller 59.

The functions performed by the CPU 61 will be described below.

A console controller 66 has a function to analyze control information represented by a control key (not shown) of the console 60 when the control key is pressed, a function to display a menu image (described later on) on the display panel of the LCD 60a, and a function to convert information to be displayed on the display panel of the LCD 60a into character data.

A timing controller 67 has a function to give various timing signals to the external memory 51, the reproducer 52, the delay units 53, 54, the video encoder 55, the audio encoder 56, the interface 57, and the master generator 58, based on a reference clock signal from the reference clock generator 50.

An internal memory controller 68 has a function to supply a read control signal to the ROM 63 for reading data stored in the ROM 63, and a function to supply a read/write control signal to the RAM 64 for writing data in the RAM 64 and reading data from the RAM 64.

A reproducer controller 69 has a function to supply a control signal to the reproducer 52 through the input/output port 65 for controlling operation of the reproducer 52.

A GOP bit number detector 70 has a function to detect the number of bits of each encoded GOP supplied from the video encoder 55 through the input/output port 65.

A table controller 71 has a function to control the registration of the number of bits of each encoded GOP, detected by the GOP bit number detector 70, in a table stored in the table area 64b of the RAM 64, and the readout of the data registered in the table.

A GOP ratio calculator 72 has a function to calculate a ratio (hereinafter referred to as a "GOP ratio") of the number of bits of each encoded GOP to the number of bits recordable on the recording medium, based on the number of bits of each encoded GOP stored in the table.

A quantization controller 73 has a function to determine, with respect to each GOP, quantization step size data for assigning a recordable storage capacity of the recording medium to each GOP based on the GOP ratio calculated by the GOP ratio calculator 72, and supply the quantization step size data determined with respect to each GOP to the video encoder 55.

An encoder controller 74 has a function to control encoding processes in the video encoder 55 and the audio encoder 56.

An external memory controller 75 has a function to supply a control signal through the input/output port 65 to the external memory 51 for controlling the external memory 51.

More specific functions other than the functions described above will be described below with respect to operation of the digital video data recording system. Operation:

Operation of the digital video data recording system shown in FIG. 6 will be described below.

First, the digital video data recording system operates to determine motion vector data with respect to all video data to be recorded and also quantization step size data, and does not carry out a recording process.

The reproducer 52 is controlled by the system controller 59 to start reproducing video and audio data. The reproduced video data from the reproducer 52 are supplied through the delay unit 53 to the video encoder 55, which effects a motion detecting process and an encoding process on the video data. The audio data from the reproducer 52 are supplied through the delay unit 54 to the audio encoder 56, which effects an encoding process on the audio data.

When the video encoder 55 starts the motion detecting process, the video encoder 55 starts to produce successive motion vector data. The motion vector data produced by the video encoder 55 are supplied to the system controller 59, which supplies the motion vector data through the input/output port 65 to the external memory 51 and stores the motion vector data in the external memory 51. The video encoder 55 also effects the encoding process on the video data. The video data encoded by the video encoder 55 are supplied to the system controller 59, which detects the number of bits of each encoded GOP, determines a GOP ratio based on the detected number of bits of each encoded GOP, and determines quantization step size data based on the GOP ratio. The above process is continuously carried out with respect to all the video data to be recorded.

Then, the digital video data recording system starts to record the video data. The reproducer 52 is controlled by the system controller 59 to start reproducing video and audio data. The reproduced video data from the reproducer 52 are supplied through the delay unit 53 to the video encoder 55, which effects an encoding process on the video data. The audio data from the reproducer 52 are supplied through the delay unit 54 to the audio encoder 56, which effects an encoding process on the audio data.

When the video encoder 55 starts the encoding process, the system controller 59 reads the motion vector data from the external memory 51, and supplies the motion vector data to the video encoder 55. The system controller 59 also supplies the quantization step size data to the video encoder 55. The video encoder 55 effects a motion compensating process on the video data based on the motion vector data, and also effects a quantizing process on the video data based on the quantization step size data.

The video encoder 55 mixes the encoded video data with the audio data from the audio encoder 56. Output data from the video encoder 55 are supplied through the interface 57 to the master generator 58, which records the data on a master with a laser beam or the like. The above recording process is carried out with respect to all video data to be recorded.

D. Table Data in Table Area 64b

FIGS. 7A through 7C show table data stored in respective tables in the table area 64b of the RAM 64 shown in FIG. 6. FIG. 7D shows motion vector data recorded on a hard disk.

FIG. 7A shows table data stored in a time code table in the table area 64b of the RAM 64. The time code table stores material ID data representing a material recorded in the recording medium loaded in the reproducer 52, start time code data recorded at the start position of the recording medium, and end time code data recorded at the end position of the recording medium. The characters "hh:mm:ss:ff" in the columns of the start time code data and the end time code data represent hour (hh), minute (mm), second (s), and frame (ff). The time code table is referred to by the reproducer controller 69 shown in FIG. 6.

FIG. 7B shows table data stored in a GOP table in the table area 64b of the RAM 64. The GOP table stores material ID data representing a material recorded in the recording medium loaded in the reproducer 52, GOP number data representing the numbers or positions of the GOPs from the start of the recording medium, bit number data representing the numbers of bits of the GOPs, GOP ratio data, assigned bit number data, and quantization step size data QST.

The bit number data represent the number of bits of each GOP detected by the GOP bit number detector 70 shown in FIG. 6. The GOP ratio data represent a value produced when the bit number data of each GOP are divided by the total storage capacity of the recording medium. The assigned bit number data represent the number of bits to be assigned to a GOP by the quantization controller 73 based on the GOP ratio and the total storage capacity of the recording medium. The quantization step size data QST comprise data to be determined by the quantization controller 73, and represent a quantization step size for making the number of bits of encoded data produced after an output encoding process, equal to the number of bits represented by the assigned bit number data.

An example will be described on the assumption that the recording medium in the master generator 58 has a total storage capacity of 800 hundred million bits, one material is composed of two GOPs, the number of bits of a GOP having a GOP number "01" encoded in the preprocessing procedure is 2400 hundred millions, and the number of bits of a GOP having a GOP number "02" encoded in the preprocessing procedure is 800 hundred millions.

The sum of the number of bits of an encoded GOP having a GOP number "01" and the number of bits of an encoded GOP having a GOP number "02" is 3200 hundred millions. Since the recording medium has a total storage capacity of 800 hundred million bits, the data of 3200 hundred million bits cannot be recorded on the recording medium. The GOP ratio data of the GOP number "01" is 2400 hundred millions/ 800 hundred millions, i.e., 3:1, and the GOP ratio data of the GOP number "02" is 800 hundred millions/800 hundred millions, i.e., 1:1. Therefore, the total storage capacity of 800 hundred million bits of the recording medium may be divided such that the ratio of the number of bits assigned to the GOP of the GOP number "01" to the number of bits assigned to the GOP of the GOP number "02" is 3:1. As a result, 600 hundred million bits out of the total storage capacity are assigned to the GOP of the GOP number "01", and 200 hundred million bits out of the total storage capacity are assigned to the GOP of the GOP number "02".

The quantization step size data QST for the GOP of the GOP number "01" is set to a value for changing the total number of bits of the image data of the GOP after the output encoding process from original 2400 hundred millions to 600 hundred millions. The quantization step size data QST for the GOP of the GOP number "02" is set to a value for changing the total number of bits of the image data of the GOP after the output encoding process from original 800 hundred millions to 200 hundred millions.

FIG. 7C shows table data stored in a hard disk table in the table area 64b of the RAM 64, which is used if the external memory 51 shown in FIG. 6 comprises a hard disk drive. The hard disk table stores material ID data representing a material recorded in the recording medium loaded in the reproducer 52, track/sector number data representing addresses on the hard disk, and data length data (unit:byte) representing the lengths of data from the positions of the track/sector number data.

FIG. 7D shows motion vector data recorded on the hard disk. As shown in FIG. 7D, motion vector data produced with respect to video data of one material are recorded on the hard disk in the following format: When video data are recorded, the material ID data are first recorded, and then GOP number data are recorded, which are followed by successive motion vector data determined with respect to image data corresponding to the GOP number data.

E. Images Displayed on LCD 60a

Figure 8A:
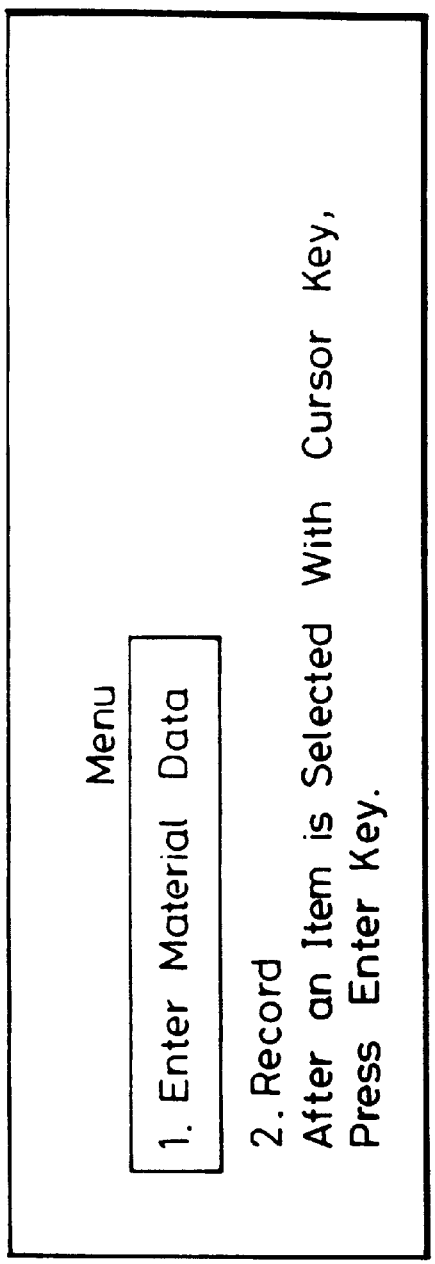
FIGS. 8A and 8B show a menu image and a material data information image, respectively, which are displayed on the display panel of the LCD 60a shown in FIG. 6.
Figure 8B:
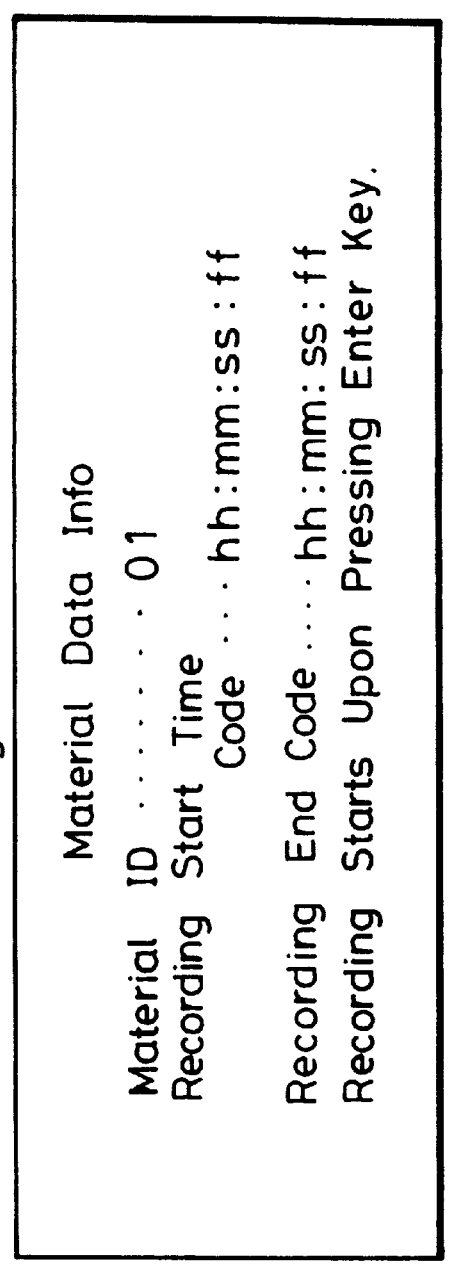

FIGS. 8A and 8B show a menu image and a material data information image, respectively, which are displayed on the display panel of the LCD 60a shown in FIG. 6.

As shown in FIG. 8A, the menu image displayed on the display panel of the LCD 60a contains two selectable items of entering material data and recording material data. One of the items can be selected by a cursor key (not shown) of the console 60, and the selected item can be executed when an enter key (not shown) of the console 60 is pressed. The item of entering material data is a process of entering a position of a material to be recorded, on the recording medium in the reproducer 52, and the item of recording material data is a process of recording the material, specified by the above item of entering material data, on the recording medium in the reproducer 52 on the recording medium in the master generator 59.

If the item of entering material data on the display panel is selected, then a material data information image shown in FIG. 8B is displayed on the display panel of the LCD 60a. As shown in FIG. 8B, the material data information image contains a material ID, a recording start time code, and a recording end time code. When the user enters numerical values through the console 60 while the material data information image is being displayed on the display panel of the LCD 60a, the entered numerical values are displayed as the recording start time code or the recording end time code on the display panel of the LCD 60a. When the user thereafter presses the enter key, the material automatically starts to be recorded under the control of the system controller 59.

Figure 9:
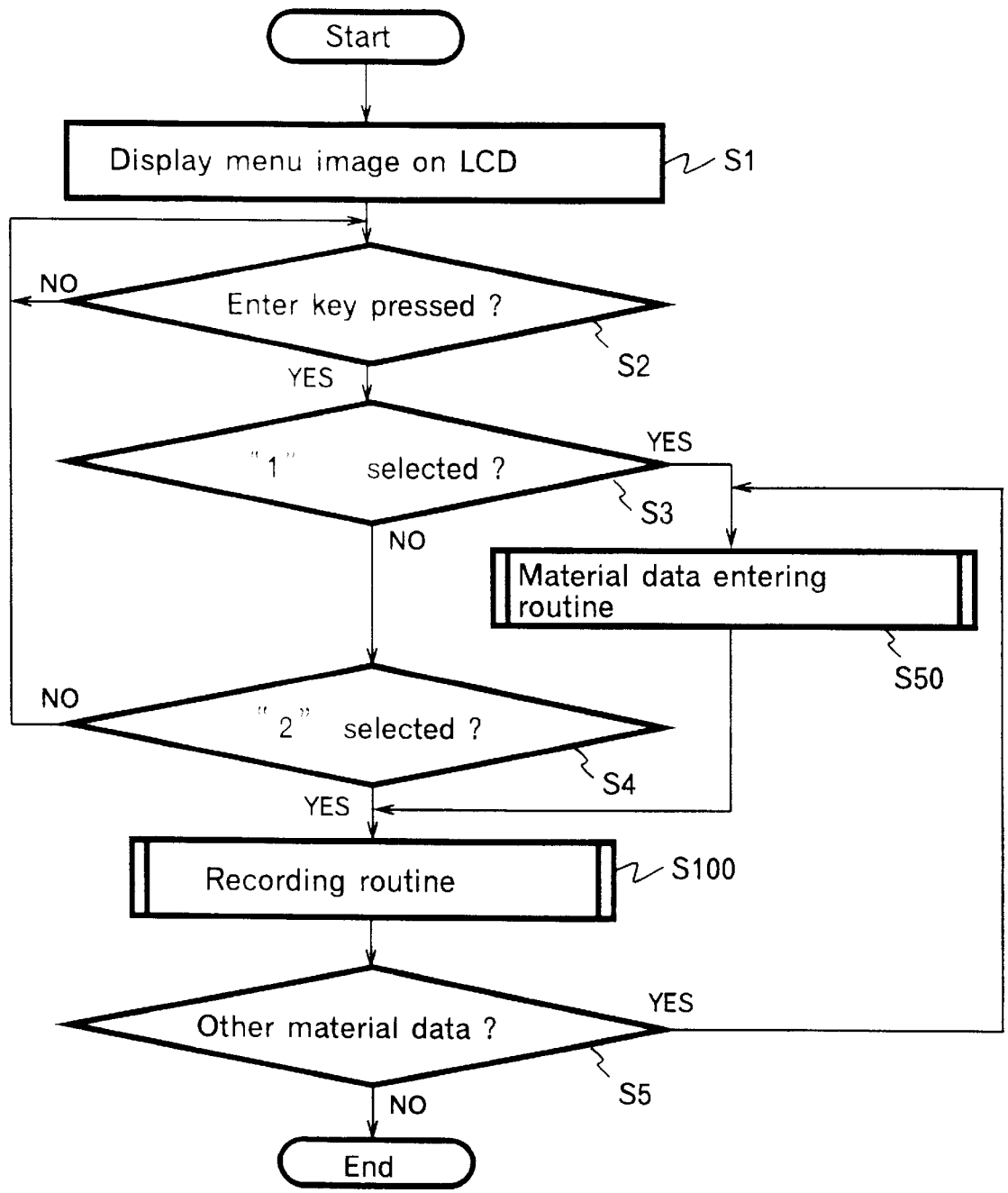
FIG. 9 is a flowchart of a main routine of control operation of the digital video data recording system shown in FIG. 6.

F. Main Routine of Control Operation of the Digital Video Data Recording System FIG. 9 shows a main routine of control operation of the digital video data recording system shown in FIG. 6. The control operation is mainly carried out by the functions which are performed by the CPU 61 shown in FIG. 6.

In a step S1 shown in FIG. 9, the internal memory controller 68 reads menu image data from the ROM 63 under the control of the console controller 66 shown in FIG. 6. The menu image data read from the ROM 63 are supplied through the input/output port 65 to the console 60, and displayed as the menu image on the display panel of the LCD 60a. Then, control proceeds to a step S2.

In the step S2, the console controller 66 decides whether the user has pressed the enter key (not shown) of the console 60 or not. If the user has pressed the enter key (YES), then control proceeds to a step S3.

In the step S3, the console controller 66 decides whether the item "1", i.e., the item of entering material data, is selected in the displayed menu image or not. If the item "1" is selected (YES), then control goes to a step S50, and if the item "1" is not selected (NO), then control goes to a step S4.

In the step S4, the console controller 66 decides whether the item "2", i.e., the item of recording material data, is selected in the displayed menu image or not. If the item "2" is selected (YES), then control goes to a step S100, and if the item "2" is not selected (NO), then control goes back to the step S2.

In the step S50, the digital video data recording system operates according to a material data entering routine. Thereafter, control goes to the step S100.

In the step S100, the digital video data recording system operates according to a material data recording routine. Thereafter, control goes to a step S5.

In the step S5, the internal memory controller 68 reads the time code table data from the table area 64b of the RAM 64 under the control of the table controller 71. The time code table data read from the table area 64b are supplied to the table controller 71. Based on the supplied time code table data, the table controller 71 decides whether there is a material to be processed next or not. If there is a material to be processed next (YES), then control goes back to the step S50, and if there is not a material to be processed next (NO), then control comes to an end.

G. Control Operation According to Material Data Entering Routine S50

Figure 10:
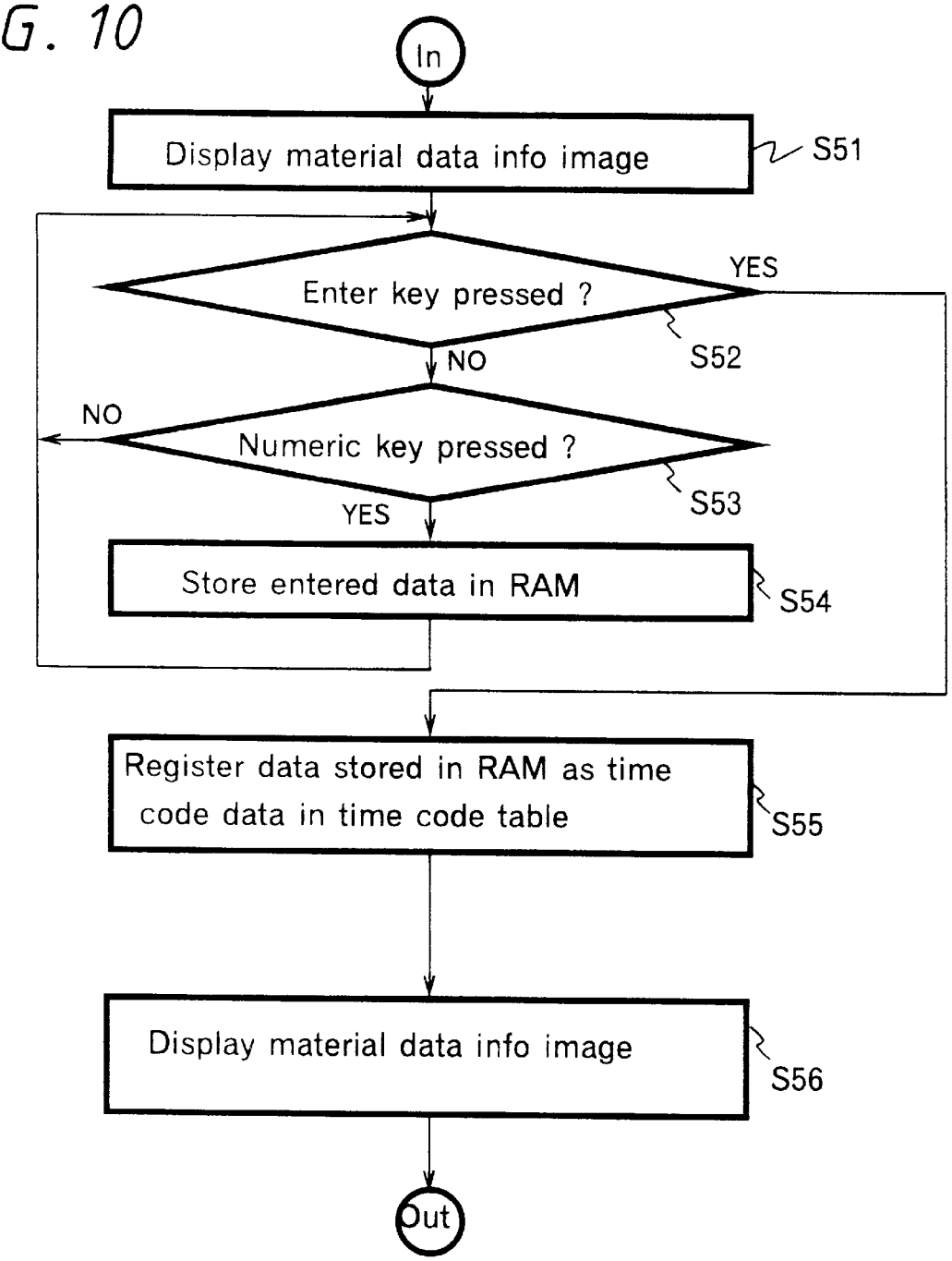
FIG. 10 is a flowchart of control operation of the digital video data recording system according to a material data entering routine in the main routine shown in FIG. 9.

FIG. 10 shows control operation of the digital video data recording system according to the material data entering routine in the step S50 shown in FIG. 9.

In a step S51 shown in FIG. 10, the internal memory controller 68 reads material data information image data from the ROM 63 under the control of the console controller 66. The material data information image data read from the ROM 63 are supplied through the input/output port 65 to the console 60, and displayed as a material data information image on the display panel of the LCD 60a. Then, control proceeds to a step S52.

In the step S52, the console controller 66 decides whether the user has pressed the enter key (not shown) of the console 60 or not. If the user has pressed the enter key (YES), then control jumps to a step S55. If the user has not pressed the enter key (NO), then control proceeds to a step S53.

In the step S53, the console controller 66 decides whether the user has pressed numerical keys (not shown) of the console 60 or not. If the user has pressed numerical keys (YES), then control proceeds to a step S54. If the user has not pressed numerical keys (NO), then control returns to the step S52.

In the step S54, the internal memory controller 68 supplies a read/write control signal to the RAM 64. The console 60 outputs numerical data corresponding to the pressed numerical keys, and the numerical data are supplied through the input/output port 65 and the bus assembly 62 to the RAM 64, which then stores the numerical data in the work area 64a. Thereafter, control goes back to the step S52.

In the step S55, when the console controller 66 recognizes that the enter key of the console 60 has been pressed by the user, the console controller 60 indicates the pressing of the enter key to the table controller 71. The table controller 71 controls the internal memory controller 68 to record the numerical data stored in the work area 64a of the RAM 64 as time code data in the time code table stored in the table area 64b of the RAM 64. Thereafter, control proceeds to a step S56.

In the step S56, the internal memory controller 68 reads the time code data registered in the time code table in the table area 64b of the RAM 64 under the control of the console controller 66. The time code data thus read are supplied through the input/output port 65 to the console 60, and displayed on the display panel of the LCD 60a. Specifically, the time code data registered by the user are displayed in a time code display area in the material data information image. Control then leaves the material data entering routine shown in FIG. 10, and goes back to the step S100 shown in FIG. 9.

H. Control Operation According to Material Data Recording Routine S100

Figure 11:
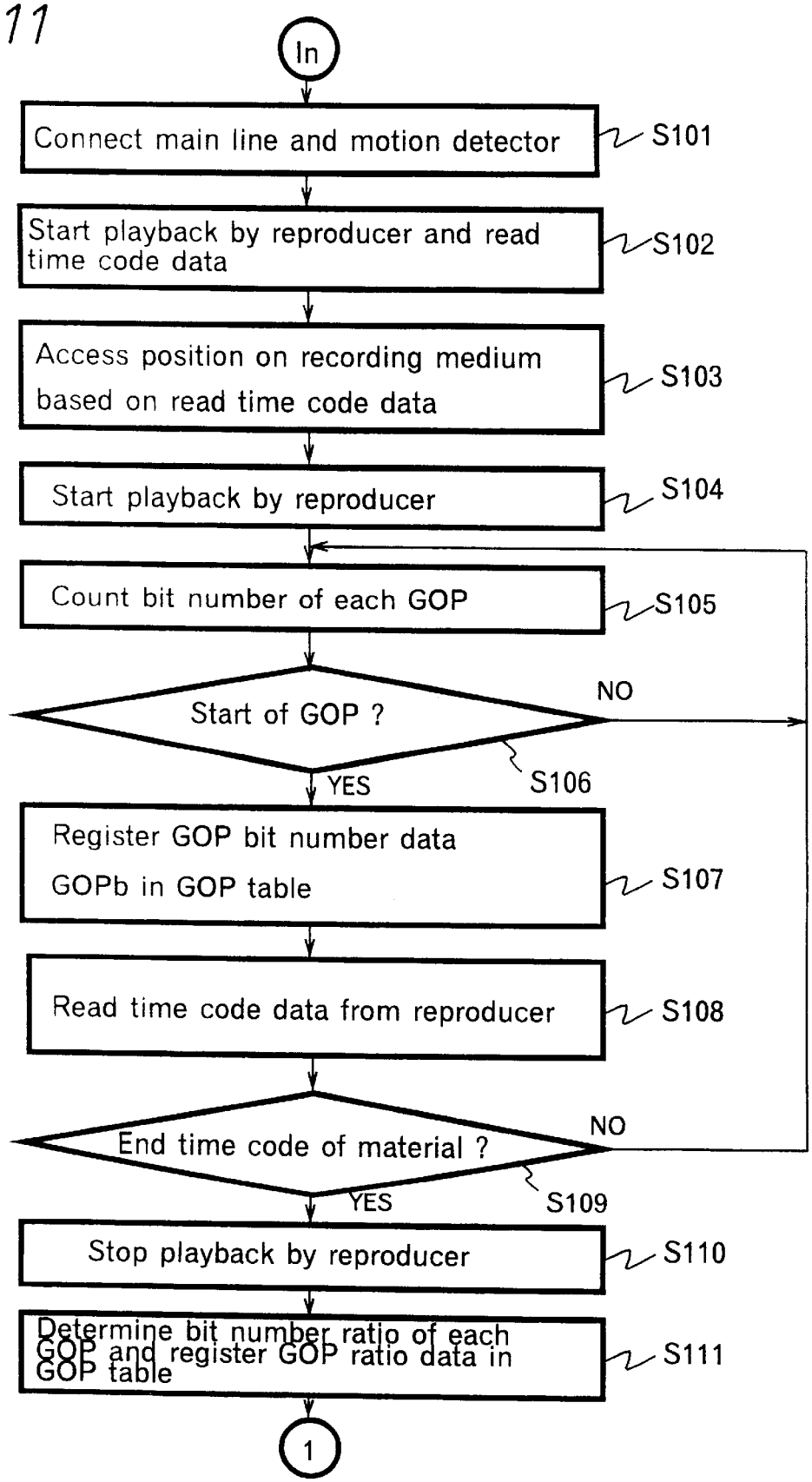
FIGS. 11 and 12 are a flowchart of control operation of the digital video data recording system according to a material data recording routine in the main routine shown in FIG. 9.
Figure 12:
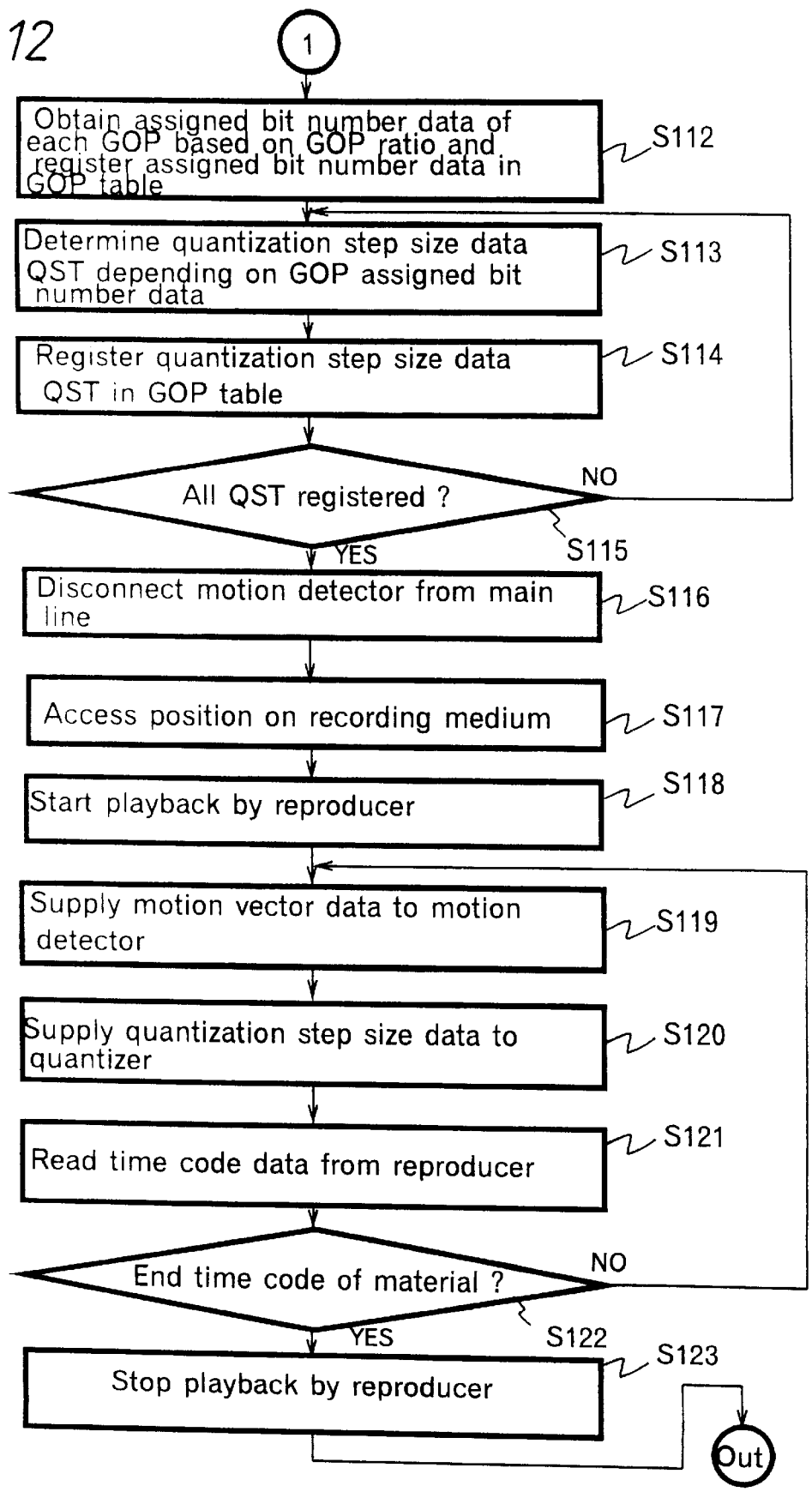

FIGS. 11 and 12 shows control operation of the digital video data recording system according to the material data recording routine in the step S100 shown in FIG. 9.

In a step S101 shown in FIG. 11, the encoder controller 74 supplies a control signal for connecting a main line and the motion detector through the input/output port 65 to the video encoder 55. Then, control proceeds to a step S102.

In the step S102, the reproducer controller 69 supplies a control signal representative of a playback mode through the input/output port 65 to the reproducer 52, causing the reproducer 52 to play back the material data. When the reproducer 52 starts the playback mode, time code data reproduced by the reproducer 52 are supplied through the input/output port 65 to the reproducer controller 69. The reproducer controller 69 now reads the supplied time code data. Then, control proceeds to a step S103.

In the step S103, the reproducer controller 69 compares the time code data read in the step S102 with the start time code data registered in the time code table (see FIG. 7A) stored in the table area 64b of the RAM 64. If the time code data read in the step S102 are smaller than the start time code data, then the reproducer controller 69 supplies a control signal indicative of a fast feed mode or a high-speed forward playback mode through the input/output port 65 to the reproducer 52. If the time code data read in the step S102 are greater than the start time code data, then the reproducer controller 69 supplies a control signal indicative of a rewind mode or a high-speed reverse playback mode through the input/output port 65 to the reproducer 52. The fast feed mode or the high-speed forward playback mode corresponds to a LTC (Longitudinal Time Code), and the rewind mode or the high-speed reverse playback mode corresponds to a VITC (Vertical Interval Time Code).

While accessing the material data, the reproducer controller 69 compares the time code data successively supplied from the reproducer 52 with the start time code data, and supplies a control signal indicative of a pause mode through the input/output port 65 to the reproducer 52 to bring the reproducer 52 into a pause mode when the time code data successively supplied from the reproducer 52 represent a time code which is a given period of time ahead of the start time code data. The above given period of time includes a pre-roll time and a time spent after the reproducer controller 69 supplies the playback mode control signal through the input/output port 65 to the reproducer 52 until the reproducer 52 actually starts the playback mode. Thereafter, control proceeds to a step S104.

In the step S104, the reproducer controller 69 supplies the playback mode control signal through the input/output port 65 to the reproducer 52, causing the reproducer 52 to start the playback mode. Thereafter, control proceeds to a step S105.

In the step S105, the GOP bit number detector 70 counts encoded data supplied through the input/output port 65 from the video encoder 55, for each GOP. Thereafter, control proceeds to a step S106.

In the step S106, the GOP bit number detector 70 decides whether the value of data at the start of a GOP in the encoded data supplied through the input/output port 65 from the video encoder 55 has a high level "1" or not, i.e., whether the start of a GOP is reached or not. If the value of data has a high level "1" (YES), then control proceeds to a step S107. If the value of data does not have a high level "1" (NO), then control returns to the step S105. The decision step S106 is a step for the GOP bit number detector 70 to detect the number of bits of encoded data from the video encoder 55 for each GOP.

In the step S107, the GOP bit number detector 70 supplies detected GOP bit number data GOPb of the GOP to the RAM 64. Under the control of the table controller 71, the internal memory controller 68 supplies a read/write control signal to the RAM 64 to register the GOP bit number data GOPb detected by the GOP bit number detector 70 in the GOP table (see FIG. 7B) in the table area 64b. Then, control proceeds to a step S108.

In the step S108, the reproducer controller 69 reads the time code data supplied from the reproducer 52 through the input/output port 65. Then, control proceeds to a step S109.

In the step S109, the reproducer controller 69 compares the time code data supplied through the input/output port 65 from the reproducer 52 with the end time code data registered in the time code table (see FIG. 7A) in the table area 64b of the RAM 64, and decides whether the compared time code data agree with each other or not. If the compared time code data agree with each other (YES), then control goes to a step S110. If the compared time code data do not agree with each other (NO), then control goes back to the step S105.

In the step S110, the reproducer controller 69 supplies a control signal indicative of a stop mode through the input/output port 65 to the reproducer 52, stopping the playback mode of the reproducer 52. Thereafter, control proceeds to a step Sill.

In the step Sill, the GOP ratio calculator 72 controls the internal memory controller 68 to read the GOP bit number data GOPb successively from the GOP table in the table area 64b of the RAM 64, and also read total bit number data of the recording medium which are stored in the ROM 63. The GOP bit number data GOPb read from the GOP table and the total bit number data read from the ROM 63 are supplied to the GOP ratio calculator 72. The GOP ratio calculator 72 calculates GOP ratios based on the GOP bit number data GOPb and the total bit number data, and supplies the calculated GOP ratios to the RAM 64. The GOP ratio data are registered in the GOP table in the table area 64b of the RAM 64. Thereafter, control proceeds to a step S112 shown in FIG. 12.

In the step S112, the quantization controller 73 controls the internal memory controller 68 to read the GOP ratio data successively from the GOP table in the table area 64b of the RAM 64, and also read the total bit number data of the recording medium which are stored in the ROM 63. The GOP bit number data GOPb read from the GOP table and the total bit number data read from the ROM 63 are supplied to the quantization controller 73. The quantization controller 73 calculates the numbers of bits to be assigned to the respective GOPs based on all the GOP ratio data and the total bit number data. The quantization controller 73 supplies the calculated assignment bit number data to the RAM 64. The table controller 71 controls the internal memory controller 68 to supply a read/write control signal to the RAM 64, which stores the assignment bit number data in the GOP table in the table area 64b thereof. Thereafter, control proceeds to a step S113.

In the step S113, the quantization controller 73 controls the internal memory controller 68 to read the GOP bit number data GOPb and the assignment bit number data from the GOP table in the table area 64b. The GOP bit number data GOPb and the assignment bit number data which are read from the GOP table are supplied to the quantization controller 73. Based on the GOP bit number data GOPb and the assignment bit number data, the quantization controller 73 determines quantization step sizes to be used in quantizing the image data of the respective GOPs. Then, control proceeds to a step S114.

In the step S114, the quantization controller 73 supplies the quantization step size data determined in the step S113 to the RAM 64. The table controller 71 controls the internal memory controller 68 to supply a read/write control signal to the RAM 64, which stores the quantization step size data in the GOP table in the table area 64b thereof. Thereafter, control proceeds to a step S115.

In the step S115, the quantization controller 73 controls the internal memory controller 68 to supply a read/write control signal for reading the GOP bit number data GOPb and the assignment bit number data from the GOP table in the table area 64b. If no GOP bit number data GOPb and no assignment bit number data have been registered, then any data supplied to the quantization controller 73 are all "0". The quantization controller 73 decides whether the data read and supplied from the RAM 64 are all "0" or not, i.e., whether all the quantization step size data QST have been determined and registered or not. If all the quantization step size data QST have been registered (YES), then control proceeds to a step S116. If all the quantization step size data QST have not been registered (NO), then control returns to the step S113.

In the step S116, the encoder controller 74 supplies a control signal for disconnecting the motion detector from the main line through the input/output port 65 to the video encoder 55. Then, control goes to a step S117.

In the step 117, the reproducer controller 69 compares the time code data read when the playback mode of the reproducer 52 is stopped in the step S110 with the start time code data registered in the time code table (see FIG. 7A) stored in the table area 64b of the RAM 64. If the time code data read in the step S117 are smaller than the start time code data, then the reproducer controller 69 supplies a control signal indicative of a fast feed mode or a high-speed forward playback mode through the input/output port 65 to the reproducer 52. If the time code data read in the step S117 are greater than the start time code data, then the reproducer controller 69 supplies a control signal indicative of a rewind mode or a high-speed reverse playback mode through the input/output port 65 to the reproducer 52.

While accessing the material data, the reproducer controller 69 compares the time code data successively supplied from the reproducer 52 with the start time code data, and supplies a pause mode control signal through the input/output port 65 to the reproducer 52 to bring the reproducer 52 into the pause mode when the time code data successively supplied from the reproducer 52 represent a time code which is a given period of time ahead of the start time code data. The above given period of time includes a pre-roll time and a time spent after the reproducer controller 69 supplies the playback mode control signal through the input/output port 65 to the reproducer 52 until the reproducer 52 actually starts the playback mode. Thereafter, control proceeds to a step S118.

In the step S118, the reproducer controller 69 supplies the playback mode control signal through the input/output port 65 to the reproducer 52, causing the reproducer 52 to start the playback mode. Thereafter, control proceeds to a step S119.

In the step S119, the external memory controller 75 controls the internal memory controller 68 to supply a read/write control signal to the RAM 64 for thereby reading track/sector number data and data length data registered with respect to the material ID of the material data to be processed, from the hard disk table (see FIG. 7C) in the table area 64b. The track/sector number data and the data length data are supplied to the external memory controller 75. The external memory controller 75 supplies track/sector number data and data length data for reading motion vector data of frame image data to be processed, among the track/sector number data and the data length data which have been supplied, through the input/output port 65 to the external memory 51. In this manner, the motion vector data of the frame image data are successively read from the external memory 51. Then, control proceeds to a step S120.

In the step S120, the quantization controller 73 controls the internal memory controller 68 to supply a read/write control signal to the RAM 64 for thereby reading the quantization step size data QST from the GOP table in the table area 64b thereof. The quantization step size data QST read from the RAM 64 are supplied to the quantization controller 73. The quantization controller 73 then supplies the quantization step size data QST read from the RAM 64 through the input/output port 65 to the video encoder 55. Then, control proceeds to a step S121.

In the step S121, the reproducer controller 69 reads time code data supplied from the reproducer 52 through the input/output port 65. Then, control proceeds to a step S122.

In the step S122, the reproducer controller 69 compares the time code data supplied through the input/output port 65 from the reproducer 52 with the end time code data registered in the time code table (see FIG. 7A) in the table area 64b of the RAM 64, and decides whether the compared time code data agree with each other or not. If the compared time code data agree with each other (YES), then control goes to a step S123. If the compared time code data do not agree with each other (NO), then control goes back to the step S119.

In the step S123, the reproducer controller 69 supplies a stop mode control signal through the input/output port 65 to the reproducer 52, stopping the playback mode of the reproducer 52. Control then leaves the material data recording routine shown in FIGS. 11 and 12 and returns to the main routine shown in FIG. 9.

I. Internal Structure and Operation of Video Encoder 55 Shown in FIG. 6

Figure 13:
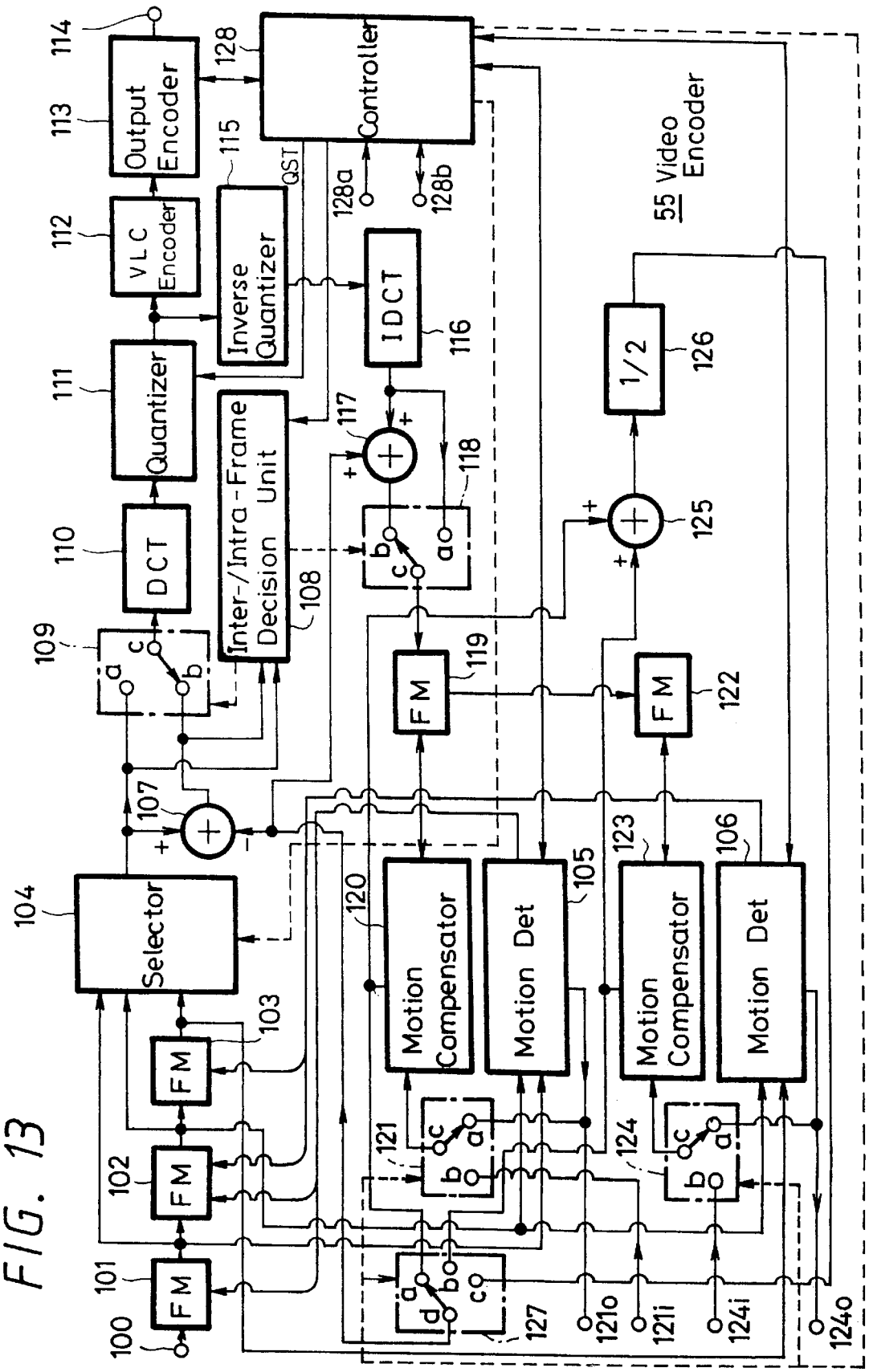
FIG. 13 is a block diagram of a video encoder in the digital video data recording system shown in FIG. 6.

FIG. 13 is a block diagram of the video encoder 55 in the digital video data recording system shown in FIG. 6.

Internal Structure of Video Encoder 55:

As shown in FIG. 13, the video encoder 55 comprises frame memories 101, 102, 103 for successively storing image data supplied through an input terminal 100, a selector 104 for selectively outputting the image data from the frame memories 101, 102, 103 according to a control signal from a controller 128, a motion detecting block for effecting a motion detecting process to produce motion vector data, a motion compensating block for effecting a motion compensating process based on the motion vector data produced by the motion detecting block, an adder 107 for calculating differential data between macroblock data having a size of 16 lines×16 pixels supplied from the selector 104 and motion-compensated macroblock data having a size of 16 lines×16 pixels supplied from the motion compensating block, an inter-/intra-frame decision unit 108 for selecting either the macroblock data from the selector 104 or the differential data from the adder 107, a switch 109 for selecting either the macroblock data from the selector 104 or the differential data from the adder 107 under the control of the inter-/intra-frame decision unit 108, a compressing and encoding block for compressing and encoding output data from the switch 109, and the controller 128 for controlling the above components.

Image data are successively supplied through the input terminal 100, and stored in the frame memory 101 during a frame period. In a next frame period, the image data read from the frame memory 101 are successively stored in the frame memory 102. In a further next frame period, the image data read from the frame memory 102 are successively stored in the frame memory 103. After elapse of the periods of three frames, therefore, the frame memory 103 stores the image data of a first frame, the frame memory 102 stores the image data of a second frame, and the frame memory 101 stores the image data of a third frame. If it is assumed that the frame memory 102 outputs the image data of a present frame, then the frame memory 101 outputs the image data of a future frame, and the frame memory 103 outputs the image data of a past frame. The image data of each macroblock outputted from the frame memory 101 are referred to as macroblock data of a following frame, the image data of each macroblock outputted from the frame memory 102 are referred to as macroblock data of a present frame, and the image data of each macroblock outputted from the frame memory 103 are referred to as macroblock data of a preceding frame.

The compressing and encoding block comprises a DCT (Discrete cosine Transform) circuit 110 for converting the macroblock data or the differential data supplied from the switch 109, in each block of 8 lines×8 pixels, from DC data into coefficient data of harmonic AC components, a quantizer 111 for quantizing coefficient data from the DCT circuit 110 with quantization step size data QST supplied from the controller 128, a VLC (Variable Length Code) encoder 112 for converting coefficient data from the quantizer 111 according to the Huffman encoding process, the runlength encoding process, or the like, and an output encoder 113 for adding inner and outer parity bits to the variable-length-coded data outputted from the VLC encoder 112 for recording or transmission, thereby converting the data into a train of data in a product code format.

The motion detecting block comprises a motion detector 105 for effecting a motion detecting process on the macroblock of the following frame from the frame memory 101 and the macroblock of the present frame from the frame memory 102 to produce motion vector data, and a motion detector 106 for effecting a motion detecting process on the macroblock of the preceding frame from the frame memory 103 and the macroblock of the present frame from the frame memory 102 to produce motion vector data.

The motion compensating block comprises an inverse quantizer 115, an IDCT (Inverse Discrete Cosine Transform) circuit 116, an adder 117, a switch 118, a frame memory 119, a motion compensator 120, a switch 121, a frame memory 122, a motion compensator 123, a switch 124, and a switch 127.

The inverse quantizer 115 inversely quantizes coefficient data from the quantizer 111 to obtain the coefficient data produced by the DCT circuit 110. The IDCT circuit 116 converts the coefficient data supplied from the inverse quantizer 115 into original macroblock data or differential data. The adder 117 adds the output data from the IDCT circuit 116 and motion-compensated macroblock data to each other. The switch 118 selectively supplies the output data from the adder 117 and the output data from the IDCT circuit 116 to the frame memory 119 based on a switching control signal from the inter-/intra-frame decision unit 108.

The motion compensator 120 selects appropriate macroblock data among frame data stored in the frame memory 119 based on the motion vector data which have been supplied from the motion detector 105 or read from the external memory 51 shown in FIG. 6 and supplied from the input/output port 65 of the system controller 59 through an input terminal 121i and the switch 121, and outputs the selected macroblock data as motion-compensated macroblock data. The switch 121 selectively supplies the motion vector data from the motion detector 105 and the motion vector data read from the external memory 51 shown in FIG. 6 and supplied to the system controller 59 and then supplied from the system controller 59, to the motion compensator 120 based on a switching control signal supplied from the controller 128.

The motion compensator 120 has an input terminal for being supplied with the motion vector data, the input terminal being connected to a movable contact "c" of the switch 121. The switch 121 has a fixed contact "a" connected to an output terminal of the motion detector 105, and another fixed contact "b" connected through the input terminal 121i to the input/output port 65 shown in FIG. 6.

The motion compensator 123 selects appropriate macroblock data among frame data stored in the frame memory 122 based on the motion vector data which have been supplied from the motion detector 106 or read from the external memory 51 shown in FIG. 6 and supplied from the input/output port 65 of the system controller 59 through an input terminal 124i and the switch 124, and outputs the selected macroblock data as motion-compensated macroblock data. The switch 124 selectively supplies the motion vector data from the motion detector 106 and the motion vector data read from the external memory 51 shown in FIG. 6 and supplied to the system controller 59 and then supplied from the system controller 59, to the motion compensator 123 based on a switching control signal supplied from the controller 128.

The motion compensator 123 has an input terminal for being supplied with the motion vector data, the input terminal being connected to a movable contact "c" of the switch 124. The switch 124 has a fixed contact "a" connected to an output terminal of the motion detector 106, and another fixed contact "b" connected through the input terminal 124i to the input/output port 65 shown in FIG. 6.

An adder 125 adds the motion-compensated macroblock data from the motion compensators 120, 123. A ½ multiplier 126 multiplies sum output data from the adder 125 by a coefficient "½". The switch 127 selectively supplies the motion-compensated macroblock data from the motion compensator 120, the motion-compensated macroblock data from the motion compensator 123, and the average data from the ½ multiplier 126 to the adder 107 according to a switching control signal from the controller 128.

The inter-/intra-frame decision unit 108 compares variance values of the macroblock data from the selector 104 and the differential data from the adder 107, and selects a smaller variance value.

The motion compensator 120 effects a motion compensating process on the macroblock data of a frame (a future frame) which follows in time the macroblock data of a frame outputted from the selector 104. The motion compensator 123 effects a motion compensating process on the macroblock data of a frame (a past frame) which precedes in time the macroblock data of a frame outputted from the selector 104.

The macroblock data of frames successively outputted from the selector 104 are supplied to the adder 107, which calculates differential data between the macroblock data from the selector 104 and an either one of the data from the motion compensator 120, the motion compensator 123, and the ½ multiplier 126 for encoding purpose. The differential data from the adder 107 are differential data between frames. Since the differential data between frames are encoded, the encoding process therefor is referred to as the inter-frame encoding process. Since the macroblock data from the selector 104 are encoded as they are, the encoding process therefor is referred to as the intra-frame encoding process.

It is assumed in the description which follows that a B picture is produced by calculating differential data between image data which precede and follow the B picture, and a P picture is produced from an I picture. Actually, macroblock data of the best encoding efficiency are selected for encoding among the macroblock data which have been compensated by a forward motion compensating process, an interpolating motion compensating process, and a backward motion compensating process, and for decoding, and the data of each macroblock are compensated for decoding in the same manner as they are compensated for encoding.

Specifically, differential data in one B picture are data produced when the macroblock data which have been compensated by either the forward motion compensating process, the interpolating motion compensating process, or the backward motion compensating process, are subtracted from the macroblock data to be encoded, and differential data in one P picture are data produced when the macroblock data which have been compensated by either the forward motion compensating process or the backward motion compensating process, are subtracted from the macroblock data to be encoded. Therefore, the words "image data" used hereinbelow mean "image data of each macroblock" except when the words "image data" are used to denote image data of each original frame.

Operation for Producing Motion Vector Data:

Operation of the video encoder shown in FIG. 13 for producing motion vector data will be described below.

For producing motion vector data, the controller 128 generates switching control signals based on control signals supplied from the system controller 59 shown in FIG. 6 to connect the motion detector 105 and the motion compensator 120 and the motion detector 106 and the motion compensator 123, and supplies the switching control signals to the switches 121, 124, respectively, to connect the movable contacts "c" thereof to the respective fixed contacts "a".

Image data supplied to the input terminal 100 are stored successively in the frame memories 101, 102, 103. The motion detector 105 effects a motion detecting process on macroblock data of a following frame read from the frame memory 101 and macroblock data of a present frame read from the frame memory 102, and produces motion vector data based on the result of the motion detecting process. The motion vector data are supplied through an output terminal 121o to the system controller 59 and also through the switch 121 to the motion compensator 120.

The motion detector 106 effects a motion detecting process on macroblock data of a preceding frame read from the frame memory 103 and the macroblock data of the present frame read from the frame memory 102, and produces motion vector data based on the result of the motion detecting process. The motion vector data are supplied through an output terminal 124o to the system controller 59 and also through the switch 124 to the motion compensator 120.

The motion vector data supplied to the system controller 59 through the output terminals 121o, 124o are then supplied through the system controller 59 to the external memory 51 shown in FIG. 6, and stored in the external memory 51.

After motion vector data representing motion vectors between all the macroblock data of the present frame and all the macroblock data of the following frame and motion vector data representing motion vectors between all the macroblock data of the present frame and all the macroblock data of the preceding frame are produced, the video encoder starts an encoding process.

The encoding process of encoding the macroblock data outputted from the selector 104 will be described below also with reference to FIGS. 15A and 15B. It is assumed in the following description that switching between inter- and intra-frame encoding processes is effected for each frame.

Figures 15A, 15B, 15C:
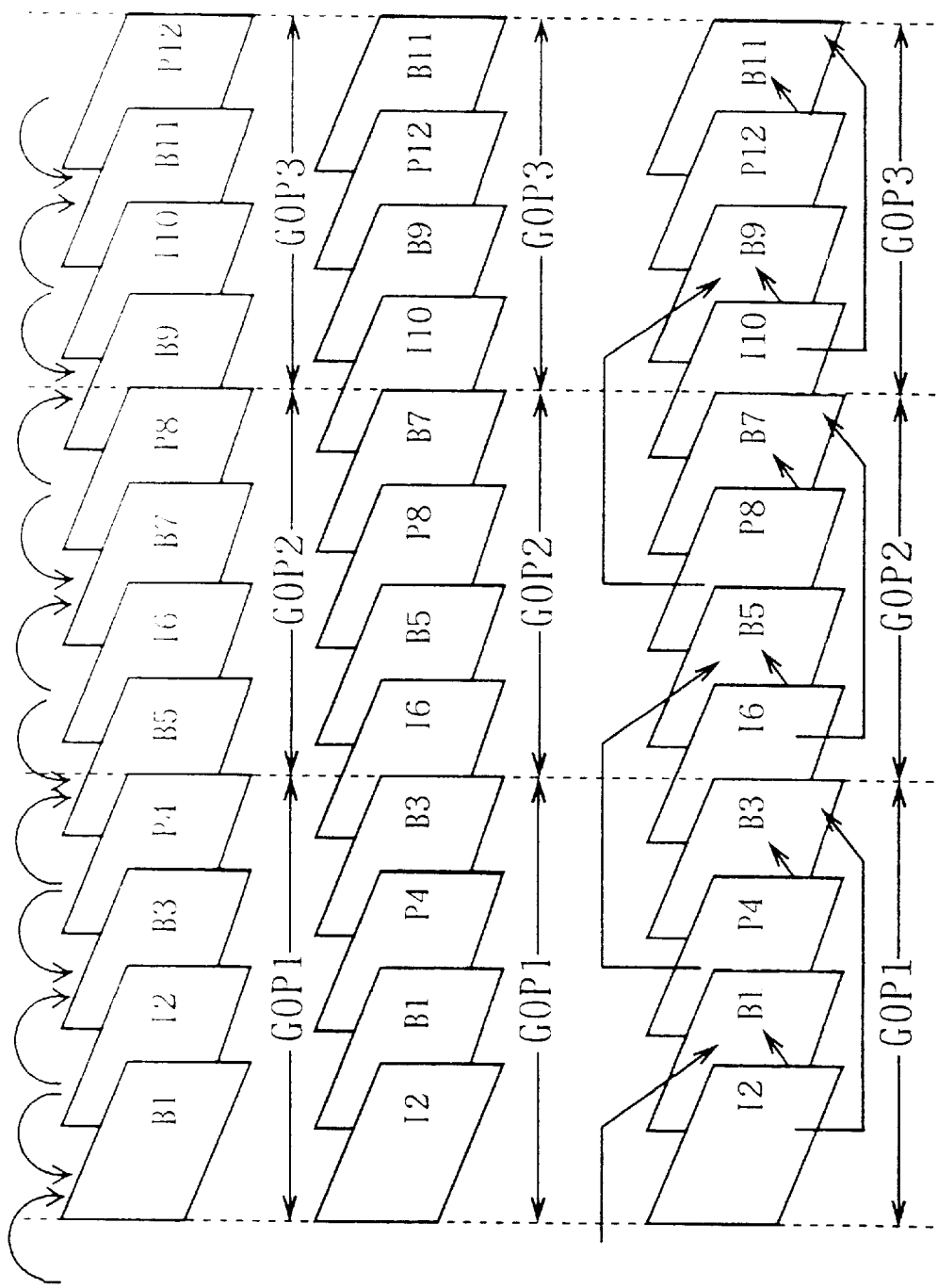
FIGS. 15A and 15B are diagrams illustrative of an encoding process of encoding image data outputted from a selector in the video encoder shown in FIG. 13.
FIG. 15C is a diagram illustrative of a process of decoding image data encoded by the video encoder shown in FIG. 13.

FIG. 15A shows frames of image data supplied to the input terminal 100. FIG. 15B shows the order in which image data are outputted from the selector 104 and encoded. Numerals in the frames the order of the supplied frames, and alphabetical letters in the frames indicate that the image data of frames carrying "I" become a B picture when encoded, the image data of frames carrying "I" become a I picture when encoded, and the image data of frames carrying "P" become a P picture when encoded.

The image data which are pointed by the arrows are image data which are encoded, and the image data from which the arrows are originated are image data which are used to encode the above image data. The arrows in FIG. 15A indicate which frame image data are used as predictive image data for encoding the image data of the frames indicated by the arrows. For example, the image data of the third frame which will be encoded into a B picture are encoded on the basis of differential data between the image data of the third frame and either the image data of the second frame which will be encoded into an I picture, or the image data of the fourth frame which will be encoded into a P picture, or the sum of the image data of these two frames. For the P pictures, any arrows for indicating frames for use as perceptive image data are omitted from illustration.

The frames in a GOP 2 shown in FIGS. 15A and 15B will be described by way of example below. It is assumed that the frame memory 122 shown in FIG. 13 stores the image data P4 used as predictive image data for the image data B5 shown in FIG. 15A, and, for illustrative purpose, predictive image data from the ½ multiplier 126 are used at all times for being encoded into B pictures.

The image data I6, shown in FIG. 15B, of each of macroblock data are outputted successively from the selector 104. At this time, the movable contacts "c" of the switches 109, 118 are connected to the fixed contacts "b" thereof. Therefore, the macroblock data of the image data I6 pass through the switch 109, are processed by the DCT circuit 110, the quantizer 111, the VLC encoder 112, and the output encoder 113, and are outputted from an output terminal 114.

Coefficient data of the image data I6 which are quantized by the quantizer 111 are converted back into the original macroblock data having a size of 8 lines×8 pixels by the inverse quantizer 115 and the IDCT circuit 116, and the original macroblock data are supplied through the switch 118 to the frame memory 119 and successively stored therein.

After the image data P4 are stored in the frame memory 122 and the image data I6 are stored in the frame memory 119, predictive image data from the ½ multiplier 126 are subtracted from the image data B5 outputted from the selector 104 by the adder 107, which produces differential data that are encoded. Before image data B5 are outputted from the selector 104, the image data I6 are stored in the frame memory 101, the image data B5 are stored in the frame memory 102, and the image data P4 are stored in the frame memory 103.

The motion detector 105 effects a motion detecting process on each macroblock of the image data B5 stored in the frame memory 102 and each macroblock of the image data I6 stored in the frame memory 101, producing motor vector data indicative of which part (macroblock data) of the image data I6 is in agreement with each of the macroblocks of the image data B5. The motion vector data of each macroblock are used in the motion compensator 120 to successively read the corresponding macroblock data in the image data I6 stored in the frame memory 119, i.e., to effect a motion compensating process.

The motion detector 106 effects a motion detecting process on each macroblock of the image data B5 stored in the frame memory 102 and each macroblock of the image data P4 stored in the frame memory 103, producing motor vector data indicative of which part (macroblock data) of the image data P4 is in agreement with each of the macroblocks of the image data B5. The motion vector data of each macroblock are used in the motion compensator 123 to successively read the corresponding macroblock data in the image data P4 stored in the frame memory 122, i.e., to effect a motion compensating process.

As the macroblock data of the image data B4 are outputted from the selector 104, the ½ multiplier 126 outputs average data indicative of the average of the macroblock data of the motion-compensated image data I6 from the motion compensator 120 and the macroblock data of the motion-compensated image data P4 from the motion compensator 123, and supplies the average data through the switch 127 to the adder 107. The adder 107 subtracts the supplied average data from the macroblock data of the image data B5, thereby producing differential data that are encoded by the compressing and encoding block. The above process is carried out with respect to all the macroblock data of the image data B5.

The image data P8 are encoded next. Before the image data P8 are outputted from the selector 104, the image data P8 are stored in the frame memory 101, the image data B7 are stored in the frame memory 102, and the image data I6 are stored in the frame memory 103.

The motion detector 105 effects a motion detecting process on each macroblock of the image data B7 stored in the frame memory 102 and each macroblock of the image data P8 stored in the frame memory 101, producing motor vector data indicative of which part (macroblock data) of the image data P8 is in agreement with each of the macroblocks of the image data B7. The motion vector data of each macroblock are used in the motion compensator 120 to successively read the corresponding macroblock data in the image data I6 stored in the frame memory 122, i.e., to effect a motion compensating process.

As the macroblock data of the image data P8 are outputted from the selector 104, the motion-compensated macroblock data of the image data I6 are supplied from the motion compensator 120 through the switch 127 to the adder 107. Therefore, the adder 107 subtracts the motion-compensated macroblock data of the image data I6 from the macroblock data of the image data P8, thereby producing differential data that are encoded by the compressing and encoding block and outputted from the output terminal 114. The above process is carried out with respect to all the macroblock data of the image data P8. After the image data P8 are encoded, the image data I6 stored in the frame memory 119 are stored in the frame memory 122.

During the above process, the encoded differential data from the quantizer 111 are converted back to the original differential data by the inverse quantizer 115 and the IDCT circuit 116, and the original differential data are supplied to the adder 117. The adder 117 adds the original differential data and the motion-compensated macroblock data supplied from the motion compensator 120 through the switch 127, thus converting the differential data back to the macroblock data of the image data P8. The macroblock data of the image data P8 are supplied through the switch 118 to the frame memory 119. The above process is carried out until the storage of the image data P8 into the frame memory 119 is finished.

The image data B7 are encoded next. Before the image data B7 are outputted from the selector 104, the image data P8 are stored in the frame memory 101, the image data B7 are stored in the frame memory 102, and the image data I6 are stored in the frame memory 103.

The motion detector 105 effects a motion detecting process on each macroblock of the image data B7 stored in the frame memory 102 and each macroblock of the image data P8 stored in the frame memory 101, producing motor vector data indicative of which part (macroblock data) of the image data P8 is in agreement with each of the macroblocks of the image data B7. The motion vector data of each macroblock are used in the motion compensator 120 to successively read the corresponding macroblock data in the image data P8 stored in the frame memory 119, i.e., to effect a motion compensating process.

The motion detector 106 effects a motion detecting process on each macroblock of the image data B7 stored in the frame memory 102 and each macroblock of the image data I6 stored in the frame memory 103, producing motor vector data indicative of which part (macroblock data) of the image data I6 is in agreement with each of the macroblocks of the image data B7. The motion vector data of each macroblock are used in the motion compensator 123 to successively read the corresponding macroblock data in the image data I6 stored in the frame memory 122, i.e., to effect a motion compensating process.

As the macroblock data of the image data B7 are outputted from the selector 104, the ½ multiplier 126 outputs average data indicative of the average of the macroblock data of the motion-compensated image data P8 from the motion compensator 120 and the macroblock data of the motion-compensated image data I6 from the motion compensator 123, and supplies the average data through the switch 127 to the adder 107. The adder 107 subtracts the supplied average data from the macroblock data of the image data B7, thereby producing differential data that are encoded by the compressing and encoding block and outputted from the output terminal 114. The above process is carried out with respect to all the macroblock data of the image data B7. After the image data B7 are encoded, the image data P8 stored in the frame memory 119 are stored in the frame memory 122.

The image data of each frame of the GOP 2 are encoded in the manner described above. The image data of the frames of the other GOPs are encoded in the same manner. The controller 128 adds the motion vector data from the motion detectors 105, 106, data indicative of a motion compensation type (or data indicative of the data subtracted in the encoding process), and data indicative of a picture type to the compressed data or compressed differential data supplied to the output encoder 113, and also adds data indicative of the start of each GOP and data indicative of the encoding order to the compressed data or compressed differential data. The compressed data or compressed differential data to which the above data are added are converted into data in a product code format by the output encoder 113, and then supplied through an input/output terminal 128b to the system controller 59 shown in FIG. 6. From the compressed data or compressed differential data supplied to the system controller 59, there is detected the number of bits of each GOP by the GOP bit number detector 70 shown in FIG. 6.

Recording Operation of Video Encoder 55:

Operation of the video encoder 55 shown in FIG. 13 in a recording process will be described below. Only the encoding of frame image data of a B picture will be described.

In the recording process, the controller 128 generates switching control signals based on control signals supplied from the system controller 59 shown in FIG. 6 to connect the motion detector 105 to the motion compensator 120 and disconnect the motion detector 106 from the motion compensator 123, and supplies the switching control signals to the switches 121, 124, respectively, to connect the movable contacts "c" thereof to the respective fixed contacts "b". The controller 128 also supplies control signals to the motion detectors 105, 106 to stop their motion detecting process based on the control signals supplied from the system controller 59. The motion detectors 105, 106 now stop their motion detecting process although they supply read/write control signals to the frame memories 101, 102, 103.

Under the control of the external memory controller 75 of the system controller 59, motion vector data read from the external memory 51 and supplied through the system controller 59 are supplied through the input terminal 121i and the switch 121 to the motion compensator 120 and through the input terminal 124i and the switch 124 to the motion compensator 123. The motion vector data are also supplied through input/output terminal 128b to the controller 128.

Image data supplied to the input terminal 100 are successively stored in the frame memories 101, 102, 103. The motion compensator 120 reads macroblock data represented by the motion vector data supplied through the input terminal 121i and the switch 121 from the frame memory 119. The motion compensator 123 reads macroblock data represented by the motion vector data supplied through the input terminal 124i and the switch 124 from the frame memory 122.

The macroblock data read from the frame memory 119 by the motion compensator 120 and the macroblock data read from the frame memory 122 by the motion compensator 123 are supplied to the adder 125, which adds the supplied macroblock data. Sum output data from the adder 125 are supplied to the ½ multiplier 126, which multiplies the supplied data by the coefficient "½", thus averaging the data. The average data are supplied through the switch 127 to the adder 107, which subtracts the average data from the macroblock data of the present frame supplied from the selector 104, thus producing differential data. The differential data are supplied through the switch 109 to the DCT circuit 110, which converts the differential data into coefficient data ranging from DC to harmonic AC components. The coefficient data from the DCT circuit 110 are supplied to the quantizer 111.

The quantization step size data QST from the system controller 59 are supplied through the input/output terminal 128b to the controller 128, which supplies the quantization step size data QST to the quantizer 111. The quantizer 111 quantizes the coefficient data from the DCT circuit 110 based on the quantization step size data QST.

The controller 128 adds the motion vector data supplied from the external memory 51 through the system controller 59, data indicative of a motion compensation type (or data indicative of the data subtracted in the encoding process), and data indicative of a picture type to the compressed data or compressed differential data supplied to the output encoder 113, and also adds data indicative of the start of each GOP and data indicative of the encoding order to the compressed data or compressed differential data. The compressed data or compressed differential data to which the above data are added are converted into data in a product code format by the output encoder 113, and then outputted through the output terminal 114 and supplied through the interface 57 to the master generator 58 shown in FIG. 6, which records the supplied data on a master.

J. Internal Structure and Operation of Motion Detectors 105, 105 Shown in FIG. 13

An example of the motion detectors 105, 106 shown in FIG. 13 will be described below with reference to FIG. 14. The motion detector shown in FIG. 14 effects a motion detecting process according to a method referred to as block matching.

In the video encoder shown in FIG. 13, the frame memory 102 serves as a frame memory for storing present frame image data, the frame memory 101 as a frame memory for storing past frame image data, and the frame memory 103 as a frame memory for storing future frame image data.

When the motion detecting process is to be effected on the frame image data of the future frame stored in the frame memory 101 and the frame image data of the present frame stored in the frame memory 102, the frame image data stored in the frame memory 102 serve as the frame image data of a reference frame and the frame image data stored in the frame memory 101 serve as the frame image data of the present frame. When the motion detecting process is to be effected on the frame image data of the present frame stored in the frame memory 102 and the frame image data of the past frame stored in the frame memory 103, the frame image data stored in the frame memory 103 serve as the frame image data of a reference frame and the frame image data stored in the frame memory 102 serve as the frame image data of the present frame.

Figure 14:
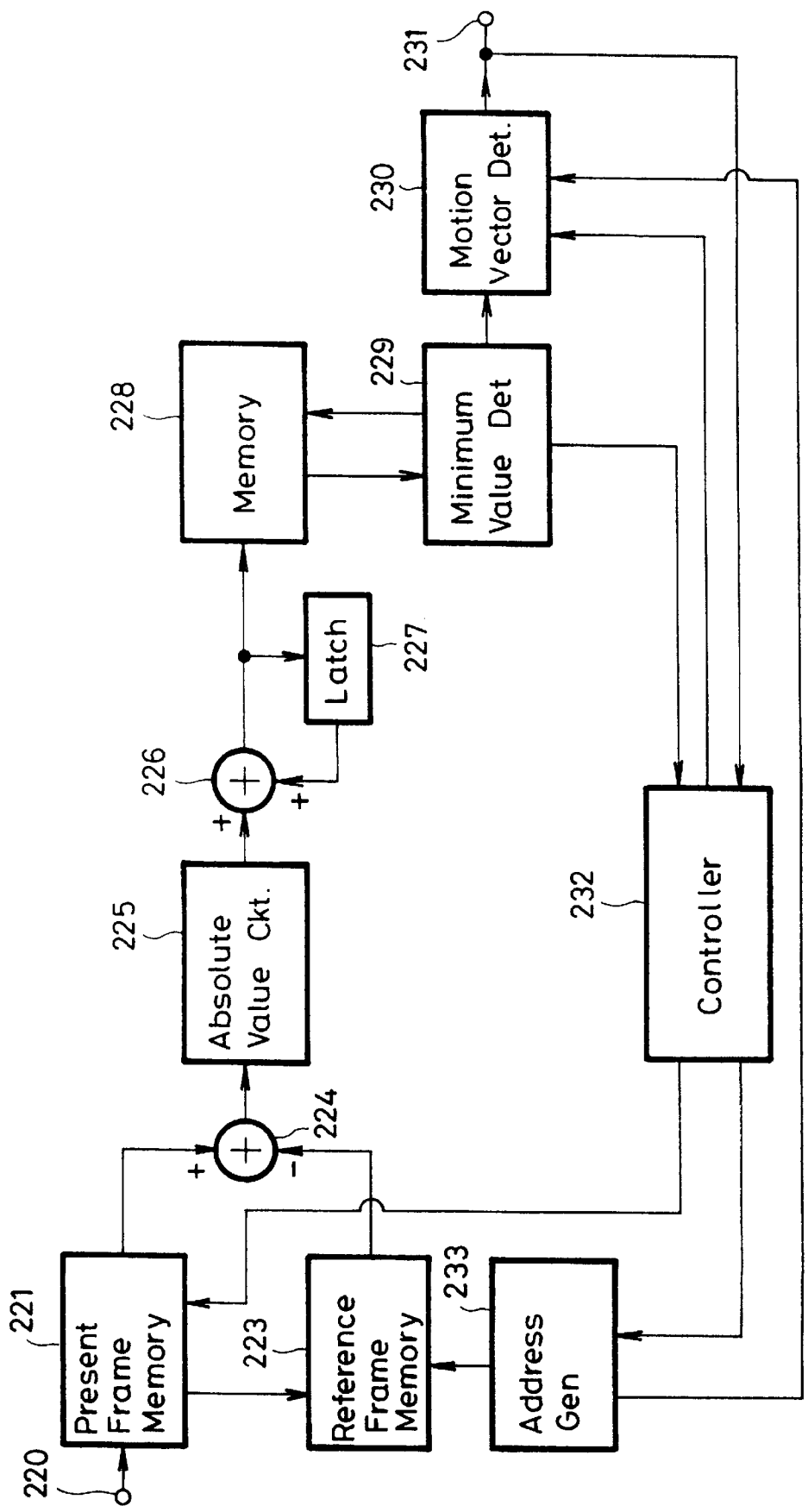
FIG. 14 is a block diagram of each of motion detectors in the video encoder shown in FIG. 13.

When the motion detecting process is to be effected on the frame image data of an nth frame and the frame image data of an (n−1)th frame, a frame memory 221 shown in FIG. 14 corresponds to the frame memory 102 of the video encoder shown in FIG. 13, and a frame memory 223 shown in FIG. 14 corresponds to the frame memory 103 of the video encoder shown in FIG. 13. When the motion detecting process is to be effected on the frame image data of the nth frame and the frame image data of an (n+1)th frame, the frame memory 221 shown in FIG. 14 corresponds to the frame memory 101 of the video encoder shown in FIG. 13, and the frame memory 223 shown in FIG. 14 corresponds to the frame memory 102 of the video encoder shown in FIG. 13.

A controller 232 shown in FIG. 14 corresponds to the controller 128 shown in FIG. 13.

Internal Structure of the Motion Detector:

The motion detector shown in FIG. 14 has the present frame memory 221 for storing the image data of a present frame, the reference frame memory 223 for storing the image data of a preceding frame (a reference frame), an address generator 233 for supplying different addresses successively to the reference frame memory 223, an adder 224 for subtracting pixel data of a reference macroblock supplied from the reference frame memory 223 from pixel data of a macroblock in question of the present frame, producing differential data, an absolute circuit 225 for producing the absolute value of the differential data from the adder 224, a latch 227 for holding the absolute value data from the absolute circuit 225, an adder 226 for adding output data from the absolute circuit 225 and latched output data from the latch 227 to produce differential absolute sum data of for reference macroblock, a memory 228 for storing the differential absolute sum data from the adder 226, a minimum value detector 229 for detecting a minimum value of the differential absolute sum data stored in the memory 228, a motion vector detector 230 for producing motion vector data corresponding to one macroblock in question based on the minimum value of the differential absolute sum data from the minimum value detector 229 and the addresses of the reference macroblock and the macroblock in question from which the minimum value of the differential absolute sum data can be obtained, and supplying the motion vector data to the controller 232, the system controller 59 shown in FIG. 6, the controller 128 and the switch 121 shown in FIG. 13, and the controller 232 for controlling an address generator 233 based on the minimum value of the differential absolute sum data from the minimum value detector 229 and the motion vector data from the motion vector detector 230, and controlling the writing of image data into the present frame memory 221 and the reading of image data stored therein.

The motion vector detector 230 produces motion vector data by reading motion vector data, which are obtained from the addresses of the reference macroblock and the macroblock in question from which the minimum value of the differential absolute sum data can be obtained, e.g., data of distances of movement in vertical and horizontal directions, from a ROM or the like as a conversion table.

Operation of Motion Detector:

Under the control of the controller 232, pixel data of a macroblock (8×8 pixels or 16×16 pixels) as a macroblock in question are successively repeatedly read from the present frame memory 221. Under the control of the controller 232, the address generator 233 establishes a search area in a storage space of the reference frame memory 223, establishes a reference block having the same size as the above macroblock in the search area, and successively supplies address data for successively reading pixel data in the reference block to the reference frame memory 223. When all the pixel data in the established reference block have been read, the address generator 233 supplies address data to the reference frame memory 223 thereby to shift the position of the reference block one pixel in the search area, and then successively supplies address data to the reference frame memory 223 to read the pixel data in the reference block which has positionally been shifted one pixel.

The adder 224 subtracts the pixel data in the reference block read from the reference frame memory 223 from the pixel data in the block in question read from the present frame memory 221. Differential data outputted from the adder 224 are supplied to the absolute value circuit 225, which produces absolute value data supplied through the adder 226 to the latch 227, which has already stored differential absolute sum data from the adder 226. Therefore, differential absolute sum data between the block in question in the present frame memory 221 and one reference block in the reference frame memory 223 are successively stored in the memory 288. Eventually, the memory 288 stores as many differential absolute sum data as the number of many blocks in question which are successively shifted one pixel in the search area.

When all calculations relative to the pixel data of one block in question and the pixel data of a plurality of reference macroblocks in one search area are completed, the minimum value detector 229 selects the minimum differential absolute sum data among all the differential absolute sum data in the memory 228, and supplies the selected minimum differential absolute sum data to the motion vector detector 230 and supplies a control signal to the controller 232 for starting the process for a next block in question.

The differential absolute sum data from the minimum value detector 229 are supplied to the motion vector detector 230. The motion vector detector 230 produces motion vector data based on the addresses of the reference macroblock and the macroblock in question from which the minimum differential absolute sum data can be obtained by the minimum value detector 229. The motion vector data produced by the motion vector detector 230 are supplied to the controller 232, and supplied through an output terminal 231 to the motion compensators 120, 123 shown in FIG. 13 and through the system controller 59 to the external memory 51. After the controller 232 establishes a search area in the same process as described above, the controller 232 controls the address generator 233 and the present frame memory 221 for effecting calculations on the pixel data in a next macroblock in question and the pixel data in a reference block.

The above block matching technique is disclosed in U.S. Pat. No. 4,897,720.

K. Predictive Directions in Decoding Image Data Encoded by Video Encoder 55 Shown in FIG. 13

A process of decoding image data encoded by the video encoder 55 shown in FIG. 13 will be described with reference to FIG. 15C.

Encoded data of a B or P picture are decoded using the same frame image data as the frame image data used in the encoding process, as shown in FIG. 15C. Motion vector data which are added to encoded frame image data in the encoding process are used to extract macroblock data used in the encoding process from frame image data used in the decoding process.

For example, as s how n in FIG. 15C, the macroblock data of the encoded data B5 are decoded by adding average data produced when macroblock data read from the frame image data P4 used in the encoding process based on the motion vector data and macroblock data read from the frame image data I6 based on the motion vector data are added and the sum data are multiplied by a coefficient "½", and differential data of the encoded data B5.

The image data of the frames of GOPs are successively decoded as described above.

The decoded image data of the frames of GOPs are read in the order of B1, I2, B3, P4, B5, I6, B7, P7, P8, B9, I10, B11, P12, thereby rearranging the image data in the GOPs. It is to be noted that the order of the GOPs remains the same, whereas the image data in each of the GOPs are rearranged into the true order of frames before they are encoded.

Advantages of 1st Embodiment:

According to the first embodiment, in the digital video data recording system shown in FIG. 6, frame image data to be recorded are supplied twice to the video encoder 55. In the first cycle of operation, motion vector data are produced and stored in the external memory 51, the number of bits of encoded data is detected for each GOP to determine a GOP ratio, the number of all bits of the storage medium is divided and assigned to the GOPs, and quantization step size data are determined based on the assigned bit numbers. In the second cycle of operation, the motion vector data stored in the external memory 51 in the first cycle are read, the motion compensating process is effected using the read motion vector data, data produced by the motion compensating process are converted into coefficient data by the DCT circuit 110, thereafter the coefficient data are quantized based on the quantization step size data, the quantized coefficient data are VLC-encoded, the VLC-encoded data are encoded for outputting purpose, and the encoded data are recorded on a master by the master generator 58.

Therefore, the frame image data can be optimally encoded depending on the number of bits thereof, and all the image data to be recorded can be recorded on the storage medium. In the recording process, since the motion detecting processes of the motion detectors 105, 106 are stopped, the consumption of electric energy by the digital video data recording system is largely reduced.

L. Concept of 2nd Embodiment

Figure 16:
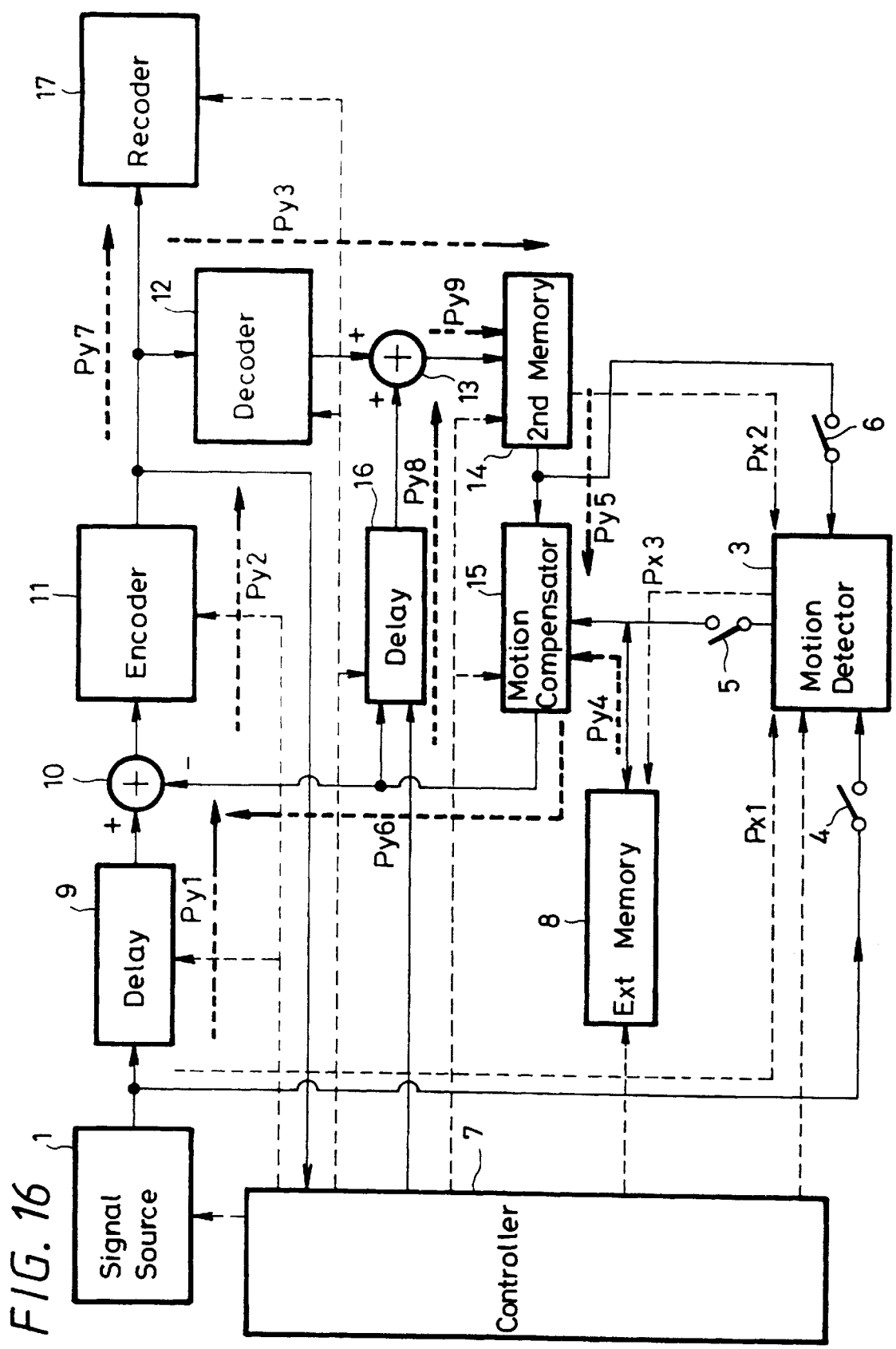
FIG. 16 is a block diagram of an image information recording apparatus, showing a conceptual arrangement of a second embodiment of the present invention.

FIG. 16 illustrates in block form an image information recording apparatus, showing a conceptual arrangement of a second embodiment of the present invention.

Structure:

The image information recording apparatus shown in FIG. 16 differs from the image information recording apparatus shown in FIG. 5 in that the image information recording apparatus shown in FIG. 16 does not have the first memory 2 in the image information recording apparatus shown in FIG. 5. Those parts shown in FIG. 16 which are identical to those shown in FIG. 5 are denoted by identical reference characters, and will not be described in detail below.

In the case where the variable-rate encoding process is employed in the image information recording apparatus shown in FIG. 16, motion vector data and compression ratio information indicative of a compression ratio for each of one or more image information items are determined in the preprocessing procedure and stored in the external memory 8, and when the image information from the signal source 1 is to be recorded on the recording medium by the recorder 17, the motion vector data stored in the external memory 8 are used. Thus, the image information recording apparatus is not required to have the motion detector 3 carry out a motion detecting process. The compression ratio information determined in the preprocessing procedure is used to effect an encoding process. Only the second memory 14 is used when the encoding process is carried out to detect motion vector data and when a motion compensating process is carried out using the motion vector data read from the external device 8.

Operation in Preprocessing Procedure:

Operation of the image information recording apparatus shown in FIG. 16 in the preprocessing procedure will be described below.

The switches 4, 5, 6 are turned on by switch control signals from the controller 7. The motion detector 3 and the signal source 1, the motion detector 3 and the second memory 14, and the motion detector 3 and the external memory 8 are electrically connected when the respective switches 4, 6, 5 are turned on.

The signal source 1 starts to output image information under the control of the controller 7. The image information outputted from the signal source 1 is encoded by the encoder 11, thereafter decoded by the decoder 13, added to macroblock data from the delay unit 16, and then supplied to and stored in the second memory 14. The image information outputted from the signal source 1 is also supplied to the motion detector 3 as indicated by the arrow Px1 in FIG. 16. At the same time, the image information stored in the second memory 14 is read therefrom and supplied to the motion detector 3 as indicated by the arrow Px2 under the control of the controller 7. The motion detector 3 effects a motion detecting process on the image information from the signal source 1 and the image information from the second memory 14, and produces motion vector data based on the result of the motion detecting process. The motion vector data generated by the motion detector 3 are supplied to the external memory 8 as indicated by the arrow Px3. The external memory 8 stores the motion vector data supplied from the motion detector 3 according to a control signal supplied from the controller 7. The controller 7 determines a compression ratio for one or more images. The above preprocessing procedure is carried out with respect to all image data to be recorded.

Operation in Recording Process:

operation of the image information recording apparatus shown in FIG. 16 in the recording process will be described below.

The switches 4, 5, 6 are turned off by switch control signals from the controller 7. The motion detector 3 and the signal source 1, the motion detector 3 and the second memory 14, and the motion detector 3 and the external memory 8 are electrically disconnected when the respective switches 4, 6, 5 are turned off.

The signal source 1 starts to output image information under the control of the controller 7. The image information outputted from the signal source 1 is supplied to the delay unit 9 as indicated by the arrow Py1. The image information is then delayed by the delay unit 9 for a period of time which is required by a motion compensating process in the motion compensator 15, and then supplied to the adder 10. The image information which is supplied to the adder 10 for the first time is outputted as it is from the adder 10 because no image information is supplied from the motion compensator 15 to the adder 10. The image information outputted from the adder 10 is supplied to the encoder 11 as indicated by the arrow Py2, and encoded by the encoder 11. The encoded image information is supplied to the decoder 12 as indicated by the arrow Py3, and decoded back to the original image information by the decoder 12. The decoded image information is supplied to the adder 13.

The image information which is supplied to the adder 13 for the first time is outputted as it is from the adder 13 because no image information is supplied from the motion compensator 15 through the delay unit 16 to the adder 13. The image information outputted from the adder 13 is supplied to the second memory 14, and stored in the second memory 14 according to a control signal from the controller 7.

The image information successively outputted from the signal source 1 is delayed for the above delay time by the delay unit 9, and then supplied to the adder 10 as indicated by the arrow Py1. At the same time, the motion vector data stored in the external memory 8 are read therefrom according to a control signal that is supplied from the controller 7 to the external memory 8. The motion vector data read from the external memory 8 are supplied to the motion compensator 15 as indicated by the arrow Py4. The motion compensator 15 reads image information represented by the motion vector data supplied from the external memory 8 from the second memory 14 as indicated by the arrow Py5. The image information read from the second memory 14 is supplied to the adder 10 as indicated by the arrow Py6.

The adder 10 subtracts the image information read from the second memory 14 by the motion compensator 15 from the image information supplied from the signal source 1 through the delay unit 9. Differential data outputted as a resultant sum from the adder 10 are supplied to the encoder 11 as indicated by the arrow Py2, and encoded by the encoder 11 based on the compression ratio information which has been determined in the preprocessing procedure. The encoded image information from the encoder 11 is then supplied to the recorder 17 as indicated by the arrow Py7, and recorded on the recording medium by the recorder 17.

The image information read by the motion compensator 15 is also supplied through the delay unit 16 to the adder 13 as indicated by the arrow Py8. The adder 13 adds the image information from the decoder 12 and the image information from the delay unit 16. Sum output data from the adder 13 are supplied to the second memory 14 as indicated by the arrow Py9, and stored in the second memory 14. The above recording process is carried out with respect to all image data to be recorded.

Advantages of the Concept of 2nd Embodiment:

As can be seen from the above explanation of the concept of the second embodiment, the image information recording apparatus shown in FIG. 16 carries out the preprocessing procedure by determining motion vector data, and storing the motion vector data in the external memory 8, and carries out the recording process by effecting a motion compensating process using the motion vector data stored in the external memory 8 without effecting a motion detecting process in the motion detector 3, and subtracting image information produced by the motion compensation from image information to be encoded. The image information recording apparatus employs only the second memory 14 therein. Therefore, in the case where the encoder 11 employs the variable-rate encoding process, the recording process can reliably be carried out. Since it is not necessary in the recording process to effect a motion detecting process in the motion detector 3 which is of a large circuit scale, the consumption of electric energy by the image information recording apparatus is greatly reduced. Accordingly, the image information recording apparatus offers outstanding advantages in that it employs the variable-rate encoding process for improved image quality, simplifies the overall process for largely reducing the consumption of electric energy, and requires a minimized memory capacity.

Specific details of the second embodiment will be described below with reference to FIG. 17. In FIG. 16, the signal source 1 corresponds to the reproducer 52 shown in FIG. 6, the controller 7 corresponds to the system controller 59 shown in FIG. 6, the external memory 8 corresponds to the external memory 51 shown in FIG. 6, the recorder 17 corresponds to the master generator 58 shown in FIG. 6, and the remaining components correspond to various circuits in the video encoder 55 shown in FIG. 6.

M. Another Structure and Operation of the Video Encoder Shown in FIG. 6

Figure 17:
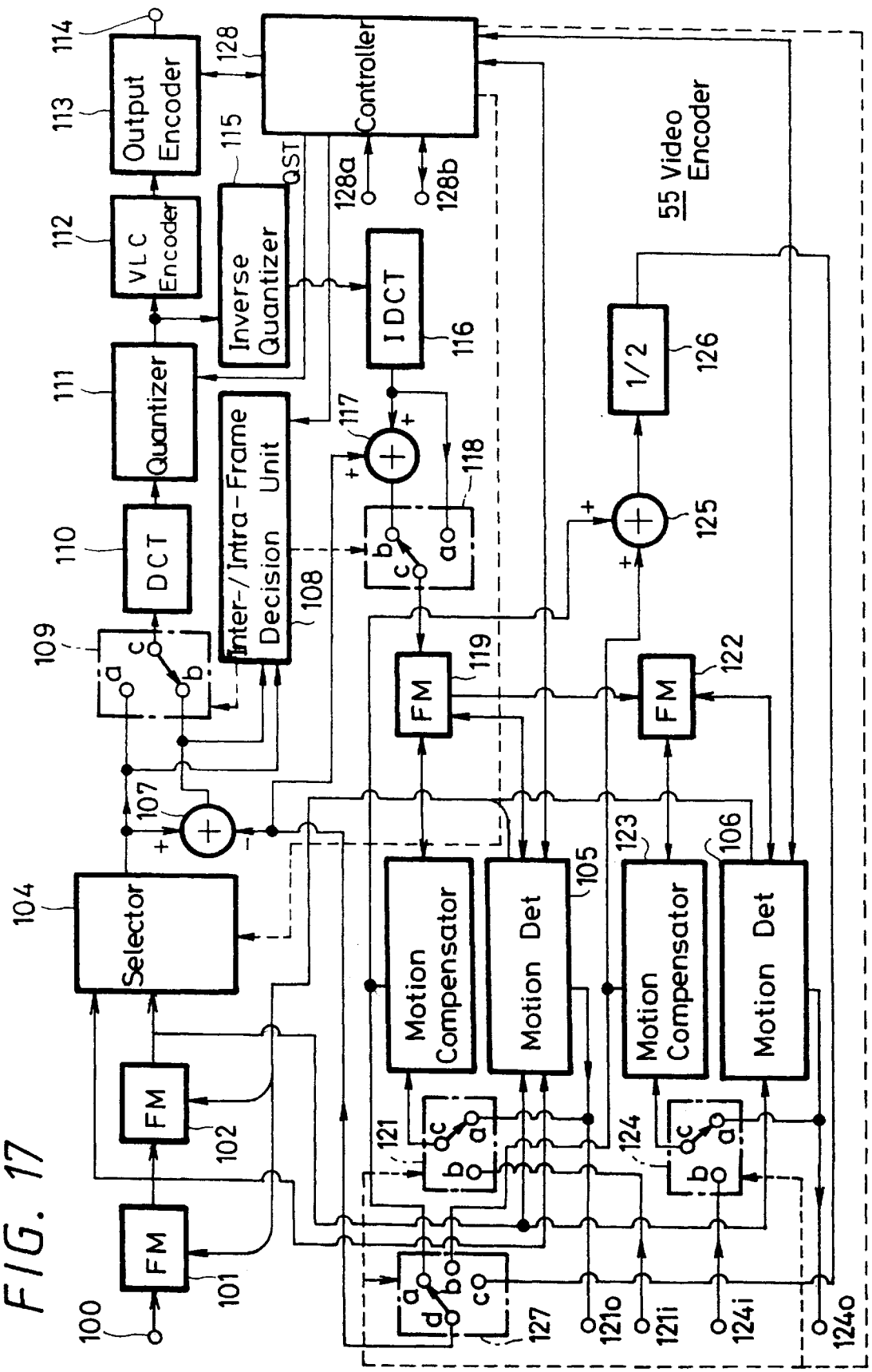
FIG. 17 is a block diagram of a digital video data recording system according to the second embodiment of the present invention.

FIG. 17 is a block diagram of another internal structure of the video encoder 55 shown in FIG. 6.

Structure:

The video encoder shown in FIG. 17 structurally differs from the video encoder shown in FIG. 13 in that the video encoder shown in FIG. 17 employs only the frame memories 101, 102 among the frame memories 101, 102, 103 of the video encoder shown in FIG. 13, frame image data stored in the frame memories 101, 102 are used in the motion detecting process and the motion compensating process, motion detectors 305, 306 supply read/write control signals respectively to the frame memories 119, 122, the motion detector 305 supplies a read/write control signal to the frame memories 101, 102, and the controller 128 controls the selector 104 to selectively output the image data read from the frame memories 101, 102.

Operation for Producing Motion Vector Data:

Operation of the video encoder shown in FIG. 17 for producing motion vector data will be described below.

For producing motion vector data, the controller 128 generates switching control signals based on control signals supplied from the system controller 59 shown in FIG. 6 to connect the motion detector 305 and the motion compensator 120 and the motion detector 306 and the motion compensator 123, and supplies the switching control signals to the switches 121, 124, respectively, to connect the movable contacts "c" thereof to the respective fixed contacts "a".

Frame image data supplied to the input terminal 100 are supplied successively in the frame memories 101, 102, and also stored successively in the frame memories 119, 122 through the selector 104, the switch 109, the DCT circuit 110, the quantizer 111, the inverse quantizer 115, the IDCT circuit 116, the adder 117 (only for B and P pictures), and the switch 11R.

The process of encoding the macroblock data outputted from the selector 104 will be described below also with reference to FIGS. 15A and 15B. The frames in a GOP 2 shown in FIGS. 15A and 15B will be described by way of example below.

It is assumed that the frame memory 101 stores the image data I6 shown in FIG. 15A, the frame memory 1012 stores the image data B5 shown in FIG. 15A, the frame memory 122 stores the image data P4 used as predictive image data for the image data B5 shown in FIG. 15A, and, for illustrative purpose, predictive image data from the ½ multiplier 126 are used at all times for being encoded into B pictures.

The image data I6, shown in FIG. 15B, read from the frame memory 101 of each of macroblock data is outputted successively from the selector 104. At this time, the movable contacts "c" of the switches 109, 118 are connected to the fixed contacts "b" thereof. Therefore, the macroblock data of the image data I6 pass through the switch 109, are processed by the DCT circuit 110, the quantizer 111, the VLC encoder 112, and the output encoder 113, and are outputted from the output terminal 114.

Coefficient data of the image data I6 which are quantized by the quantizer 111 are converted back into the original macroblock data having a size of 8 lines×8 pixels by the inverse quantizer 115 and the IDCT circuit 116, and the original macroblock data are supplied through the switch 118 to the frame memory 119 and successively stored therein.

After the image data P4 are stored in the frame memory 122 and the image data I6 are stored in the frame memory 119, predictive image data from the ½ multiplier 126 are subtracted from the image data B5 outputted from the selector 104 by the adder 107, which produces differential data that are encoded.

The motion detector 305 effects a motion detecting process on each macroblock of the image data I6 stored in the frame memory 119 and each macroblock of the image data B5 stored in the frame memory 102, producing motor vector data indicative of which part (macroblock data) of the image data I6 is in agreement with each of the macroblocks of the image data B5. The motion vector data of each macroblock are used in the motion compensator 120 to successively read the corresponding macroblock data in the image data I6 stored in the frame memory 119, i.e., to effect a motion compensating process.

The motion detector 306 effects a motion detecting process on each macroblock of the image data B5 stored in the frame memory 102 and each macroblock of the image data P4 stored in the frame memory 122, producing motor vector data indicative of which part (macroblock data) of the image data P4 is in agreement with each of the macroblocks of the image data B5. The motion vector data of each macroblock are used in the motion compensator 123 to successively read the corresponding macroblock data in the image data P4 stored in the frame memory 122, i.e., to effect a motion compensating process.

As the macroblock data of the image data B5 are outputted from the selector 104, the ½ multiplier 126 outputs average data indicative of the average of the macroblock data of the motion-compensated image data I6 from the motion compensator 120 and the macroblock data of the motion-compensated image data P4 from the motion compensator 123, and supplies the average data through the switch 127 to the adder 107. The adder 107 subtracts the supplied average data from the macroblock data of the image data B5, thereby producing differential data that are encoded by the compressing and encoding block. The above process is carried out with respect to all the macroblock data of the image data B5.

Concurrent with the encoding process effected on the image data B5, the image data I6 stored in the frame memory 119 are read therefrom and supplied to the frame memory 122 and stored therein. Simultaneously, the image data B5 as the sum output data from the adder 117 are supplied through the switch 118 to the frame memory 118. The image data B7, P8 supplied through the input terminal 100 are successively stored in the frame memories 102, 101.

The image data P8 are encoded next. For generating the image data of a P picture, the motion detector 305 supplies a read/write control signal to both the frame memories 101, 102.

The motion detector 305 effects a motion detecting process on each macroblock of the image data B7 stored in the frame memory 102 and each macroblock of the image data P8 stored in the frame memory 101, producing motor vector data indicative of which part (macroblock data) of the image data P8 is in agreement with each of the macroblocks of the image data B7. The motion vector data of each macroblock are used in the motion compensator 120 to successively read the corresponding macroblock data in the image data I6 stored in the frame memory 122, i.e., to effect a motion compensating process. It is to be noted that the macroblock data of the image data I6 are compensated for based on the motion vector data produced from the image data P8, B7.

As the macroblock data of the image data P8 read from the frame memory 101 are selected by and outputted from the selector 104, the motion-compensated macroblock data of the image data I6 are supplied from the motion compensator 120 through the switch 127 to the adder 107. Therefore, the adder 107 subtracts the motion-compensated macroblock data of the image data I6 from the macroblock data of the image data P8, thereby producing differential data that are encoded by the compressing and encoding block and outputted from the output terminal 114. The above process is carried out with respect to all the macroblock data of the image data P8. After the image data P8 are encoded, the image data I6 stored in the frame memory 119 are stored in the frame memory 122.

During the above process, the encoded differential data from the quantizer 111 are converted back to the original differential data by the inverse quantizer 115 and the IDCT circuit 116, and the original differential data are supplied to the adder 117. The adder 117 adds the original differential data and the motion-compensated macroblock data supplied from the motion compensator 120 through the switch 127, thus converting the differential data back to the macroblock data of the image data P8. The macroblock data of the image data P8 are supplied through the switch 118 to the frame memory 119. The above process is carried out until the storage of the image data P8 into the frame memory 119 is finished.

The image data B7 are encoded next. Before the image data B7 are outputted from the selector 104, the image data P8 are stored in the frame memory 101, the image data B7 are stored in the frame memory 102, the image data P8 are stored in the frame memory 119, and the image data I6 are stored in the frame memory 122.

The motion detector 305 effects a motion detecting process on each macroblock of the image data B7 stored in the frame memory 102 and each macroblock of the image data P8 stored in the frame memory 119, producing motor vector data indicative of which part (macroblock data) of the image data P8 is in agreement with each of the macroblocks of the image data B7. The motion vector data of each macroblock are used in the motion compensator 120 to successively read the corresponding macroblock data in the image data P8 stored in the frame memory 119, i.e., to effect a motion compensating process.

The motion detector 306 effects a motion detecting process on each macroblock of the image data B7 stored in the frame memory 102 and each macroblock of the image data I6 stored in the frame memory 122, producing motor vector data indicative of which part (macroblock data) of the image data I6 is in agreement with each of the macroblocks of the image data B7. The motion vector data of each macroblock are used in the motion compensator 123 to successively read the corresponding macroblock data in the image data I6 stored in the frame memory 122, i.e., to effect a motion compensating process.

As the macroblock data of the image data B7 are outputted from the selector 104, the ½ multiplier 126 outputs average data indicative of the average of the macroblock data of the motion-compensated image data P8 from the motion compensator 120 and the macroblock data of the motion-compensated image data I6 from the motion compensator 123, and supplies the average data through the switch 127 to the adder 107. The adder 107 subtracts the supplied average data from the macroblock data of the image data B7, thereby producing differential data that are encoded by the compressing and encoding block and outputted from the output terminal 114. The above process is carried out with respect to all the macroblock data of the image data B7. After the image data B7 are encoded, the image data P8 stored in the frame memory 119 are stored in the frame memory 122.

The image data of each frame of the GOP 2 are encoded in the manner described above. The motion vector data produced by the motion detectors 305, 306 are supplied through the output terminals 121o, 124o to the system controller 59 shown in FIG. 6.

The motion vector data supplied through the output terminals 121o, 124o to the system controller 59 are supplied through the system controller 59 to the external memory 51 shown in FIG. 6, and stored therein.

The image data of the other GOPs are subjected to the motion detecting process and the encoding process in the same manner as described above. The controller 128 adds the motion vector data supplied from the motion detectors 305, 306, data indicative of a motion compensation type (or data indicative of the data subtracted in the encoding process), and data indicative of a picture type to the compressed data or compressed differential data supplied to the output encoder 113, and also adds data indicative of the start of each GOP and data indicative of the encoding order to the compressed data or compressed differential data. The compressed data or compressed differential data to which the above data are added are converted into data in a product code format by the output encoder 113, and then outputted through the output terminal 128b and supplied to the system controller 59 shown in FIG. 6. The number of bits of each GOP of the compressed data or compressed differential data supplied to the system controller 59 is detected by the GOP bit number detector 70 shown in FIG. 6.

Operation in Encoding Process:

Operation of the video encoder shown in FIG. 17 for encoding frame image data using the motion vector data stored in the external memory 51 will be described below. Only the encoding of frame image data of a B picture will be described.

In the encoding process, the controller 128 generates switching control signals based on control signals supplied from the system controller 59 shown in FIG. 6 to connect the motion detector 305 to the motion compensator 120 and disconnect the motion detector 306 from the motion compensator 123, and supplies the switching control signals to the switches 121, 124, respectively, to connect the movable contacts "c" thereof to the respective fixed contacts "b". The controller 128 also supplies control signals to the motion detectors 305, 306 to stop their motion detecting process based on the control signals supplied from the system controller 59. The motion detectors 305, 306 now stop their motion detecting process although they supply read/write control signals to the frame memories 101, 102.

Under the control of the external memory controller 75 of the system controller 59, motion vector data read from the external memory 51 and supplied through the system controller 59 are supplied through the input terminal 121i and the switch 121 to the motion compensator 120 and through the input terminal 124i and the switch 124 to the motion compensator 123. The motion vector data are also supplied through input/output terminal 128b to the controller 128.

Image data supplied to the input terminal 100 are successively stored in the frame memories 101, 102. The motion compensator 120 reads macroblock data represented by the motion vector data supplied through the input terminal 121i and the switch 121 from the frame memory 119. The motion compensator 123 reads macroblock data represented by the motion vector data supplied through the input terminal 124i and the switch 124 from the frame memory 122.

The macroblock data read from the frame memory 119 by the motion compensator 120 and the macroblock data read from the frame memory 122 by the motion compensator 123 are supplied to the adder 125, which adds the supplied macroblock data. Sum output data from the adder 125 are supplied to the ½ multiplier 126, which multiplies the supplied data by the coefficient "½", thus averaging the data. The average data are supplied through the switch 127 to the adder 107, which subtracts the average data from the macroblock data of the present frame supplied from the selector 104, thus producing differential data. The differential data are supplied through the switch 109 to the DCT circuit 110, which converts the differential data into coefficient data ranging from DC to harmonic AC components. The coefficient data from the DCT circuit 110 are supplied to the quantizer 111.

The quantization step size data QST from the system controller 59 are supplied through the input/output terminal 128b to the controller 128, which supplies the quantization step size data QST to the quantizer 111. The quantizer 111 quantizes the coefficient data from the DCT circuit 110 based on the quantization step size data QST.

The controller 128 adds the motion vector data supplied from the external memory 51 through the system controller 59, data indicative of a motion compensation type (or data indicative of the data subtracted in the encoding process), and data indicative of a picture type to the compressed data or compressed differential data supplied to the output encoder 113, and also adds data indicative of the start of each GOP and data indicative of the encoding order to the compressed data or compressed differential data. The compressed data or compressed differential data to which the above data are added are converted into data in a product code format by the output encoder 113, and then outputted through the output terminal 114 and supplied through the interface 57 to the master generator 58, which records the supplied data on a master.

Advantages of 2nd embodiment

According to the second embodiment, the frame memories 119, 122 are used in both the motion detecting process and the recording process. Therefore, the second embodiment offers an advantage in that one frame memory may be dispensed with, in addition to the advantages offered by the first embodiment.

3rd Embodiment:

N. Another Structure of the Digital Video Data Recording System Shown in FIG. 6

Figure 18:
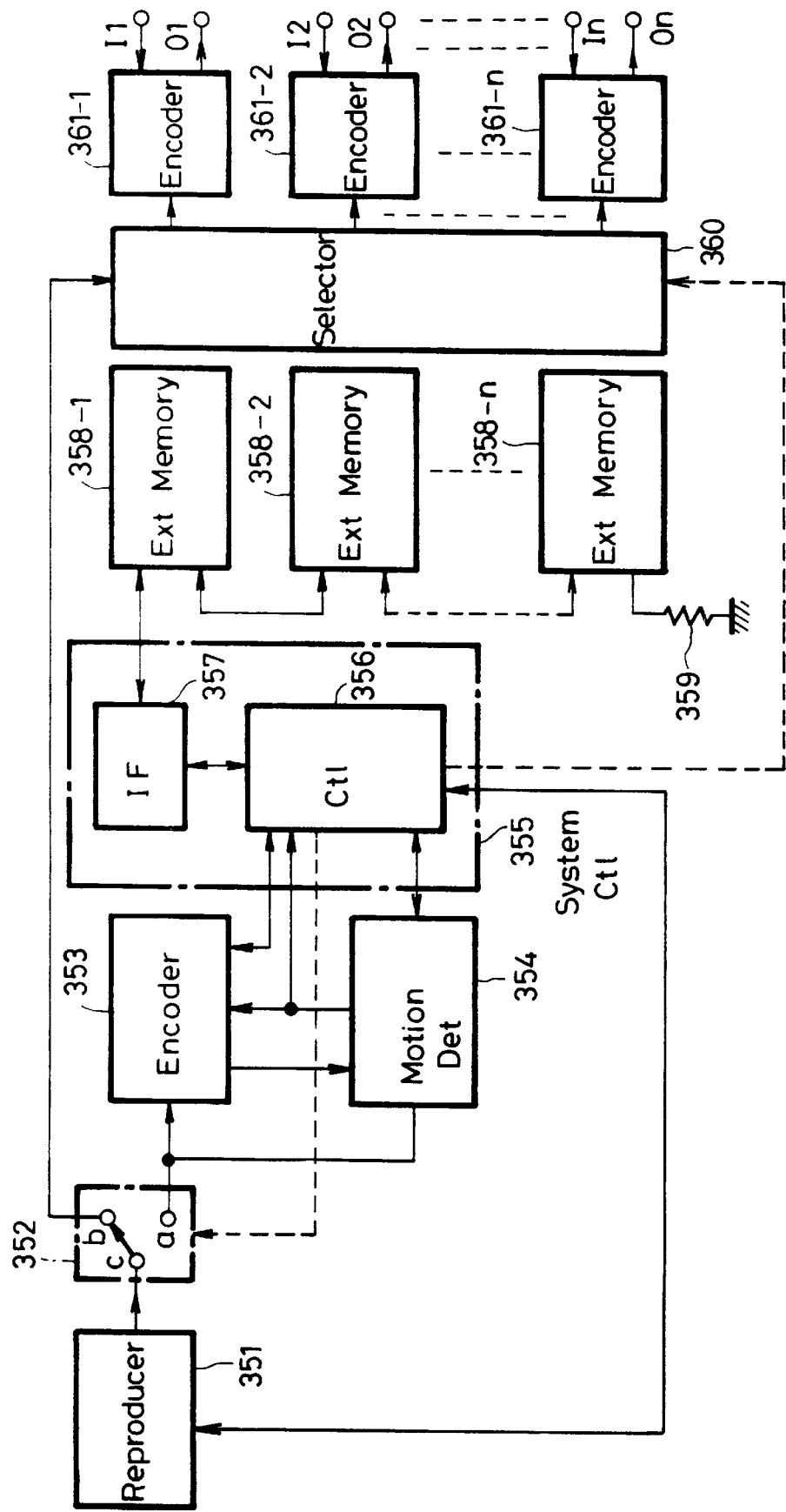
FIG. 18 is a block diagram of a digital video data recording system according to a third embodiment of the present invention.

FIG. 18 shows a digital video data recording system according to a third embodiment of the present invention.

Structure

In FIG. 18, a reproducer 351 corresponds to the reproducer 52 shown in FIG. 6, an encoder 353 includes the DCT circuit 110, the quantizer 111, the VLC encoder 112, and the output encoder 113 shown in FIGS. 13 and 17, a system controller 355 corresponds to the system controller 59 shown in FIG. 6, external memories 358-1~358-n correspond to the external memory 51 shown in FIG. 6, and encoders 361-1~361-n are structurally identical to the encoder 353.

The system controller 355 has an interface 357 which may comprise an SCSI2 interface, for example.

The external memories 358-1~358-n correspond to respective materials which are recorded on a recording medium loaded in the reproducer 351, and store motion vector data which are determined with respect to the materials. A resistor connected to the external memory 358-n serves as a terminator.

The encoders 361-1~361-n correspond to the materials, and serve to encode the materials assigned by a selector 360 based on motion vector data read from the external memories 358-1~358-n. The encoders 361-1~361-n have respective input terminals I1~In for entering motion vector data and quantization step size data supplied from the system controller 355. The encoders 361-1~361-n also have respective output terminals O1~On for supplying encoded data to the interface 57 shown in FIG. 6. Since the encoders 361-1~361-n do not operate simultaneously, all the output terminals O1~On may be connected to the input terminal of the interface 57.

In the digital video data recording system shown in FIG. 18, the reproducer 351 plays back a recording medium with a plurality of materials recorded thereon. In a first cycle of operation, motion vector data and quantization step size data are produced with respect to all the materials, and the produced motion vector data are stored in the external memories 358-1~358-n. In a second cycle of operation, all the materials are encoded by the encoders 361-1~361-n using the motion vector data read from the external memories 358-1~358-n and the quantization step size data stored in an internal memory.

Operation for Producing Motion Vector Data:

A switch 352 has a movable contact "c" which is connected to a fixed contact "a" thereof by a switching control signal from the system controller 355. Then, the reproducer 351 is brought into a playback mode by a control signal from the system controller 355. A plurality of materials are recorded on a recording medium which is loaded in the reproducer 351. Therefore, the materials are successively reproduced by the reproducer 351, and supplied through the switch 352 to the encoder 353 and a motion detector 354. The motion detector 354 effects a motion detecting process on the reproduced materials to produce motion vector data which re supplied to the encoder 353 and a controller 356. The controller 356 supplies the motion vector data from the motion detector 354 to the external memories 358-1~358-n, which store the supplied motion vector data.

The encoder 353 encodes the materials supplied through the switch 352, using the motion vector data from the motion detector 354. Encoded data outputted from the encoder 353 are supplied to the controller 356. The controller 356 detects the number of bits of the encoded data for each GOP thereby to produce quantization step size data, and registers the quantization step size data in a recording table (see FIG. 19) stored in an internal memory. The system controller 355 stops the playback mode of the reproducer 351 when it recognizes that the above process is finished with respect to all the materials.

Operation in Encoding Process for Recording Materials:

In the encoding process for recording the materials, the movable contact "c" of the switch 352 is connected to another fixed contact "b" by a switching control signal from the system controller 355. Therefore, the materials reproduced by the reproducer 351 are supplied through the switch 352 and the selector 360 to the encoders 361-1~361n which correspond to the materials to be processed.

The encoders 361-1~361-n are supplied with the motion vector data read from the external memories 358-1~358-n corresponding to the materials to be processed and also with the quantization step size data through the input terminals I1~In under the control of the system controller 355. The reproduced materials from the reproducer 351 are now encoded by the encoders 361-1~361-n using the motion vector data read from the external memories 358-1~358-n and the quantization step size data. Encoded data are outputted from the output terminals O1~On, supplied through the interface 57 shown in FIG. 6 to the master generator 58, and recorded on the recording medium set in the master generator 58.

O. Table Data in the Digital Video Data Recording System Shown in FIG. 18

FIG. 19 shows the recording table used in the digital video data recording system shown in FIG. 18.

As shown in FIG. 19, the recording table is stored in the internal memory of the system controller 355 of the digital video data recording system shown in FIG. 18, and is updated from time to time during operation thereof. The recording table contains material ID data, material information, external memory ID data, external memory information, encoding selection information, and status.

The material ID data are data for identifying the materials described above. The material information is the same as the information that is contained in the time code table shown in FIG. 7A and the GOP table shown in FIG. 7B. The external memory ID data comprise data for identifying the external memories 358-1~358-n shown in FIG. 18. The external memory information is the same as the information contained in the hard disk table shown in FIG. 7C, and kept in association with the respective external memory ID data. The encoding selection information comprises information representing association between the external memories 358-1~358-n and the encoders 361-1~361-n. In this embodiment, the external memory 358-1 and the encoder 361-1, the external memory 358-2 and the encoder 361-2, . . . , and the external memory 358-n and the encoder 361-n are associated with each other. The status comprises information indicating either an unprocessed status, a motion detected status, or a recorded status. For example, the unprocessed status is represented by "00", the motion detected status by "01", and the recorded status by "10".

P. Operation of the Digital Video Data Recording System Shown in FIG. 18

Figure 20:
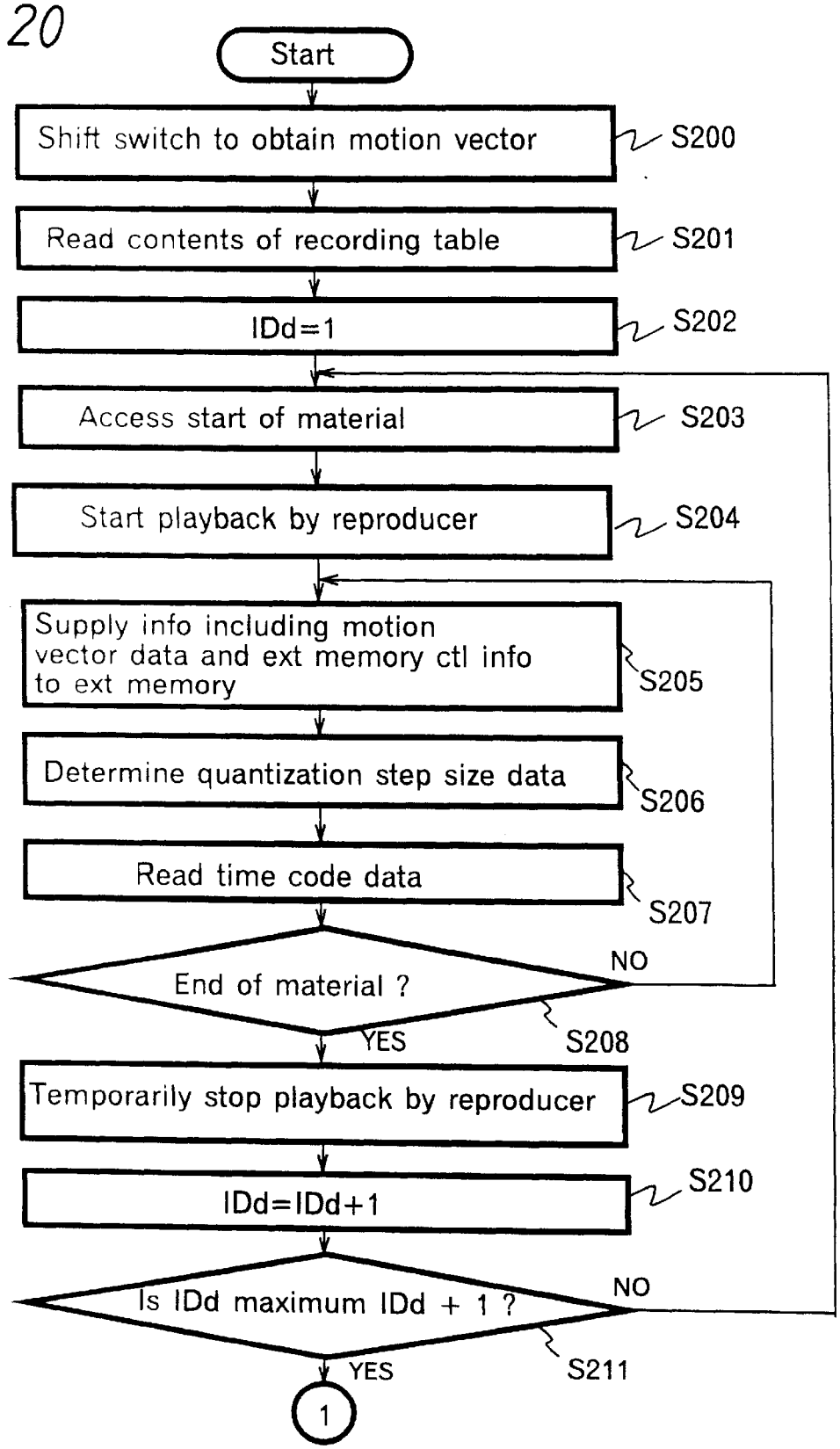
FIGS. 20 and 21 are flowcharts of an operation sequence of the digital video data recording system shown in FIG. 18.
Figure 21:
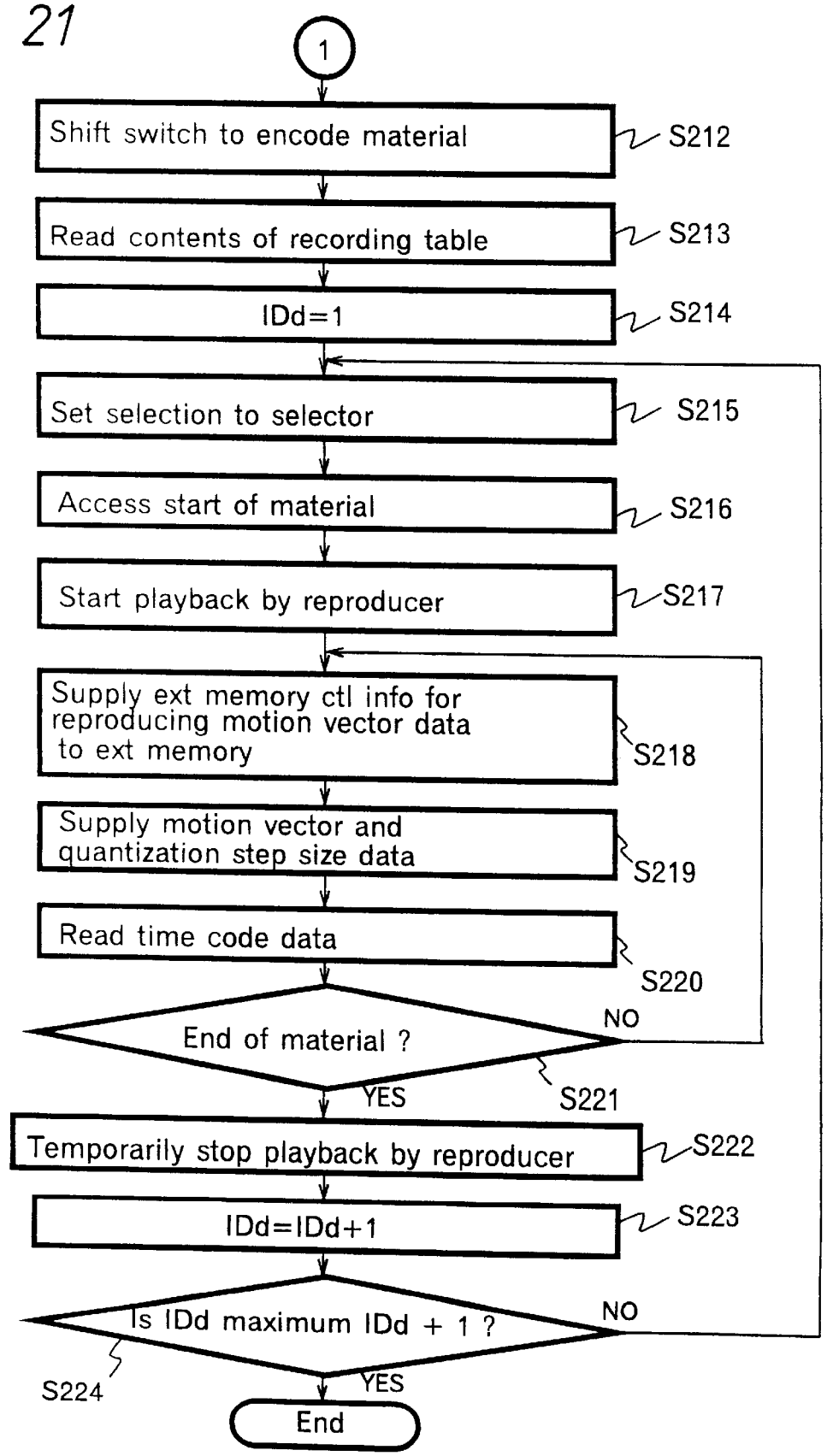

FIGS. 20 and 21 show an operation sequence of the digital video data recording system shown in FIG. 18. Details of some steps are the same as those of the flowcharts shown in FIGS. 9 through 12.

In a step S200 shown in FIG. 20, the system controller 355 supplies a switching control signal to the switch 352, connecting the movable contact "c" to the fixed contact "a" thereof. Then, control proceeds to a step S201.

In the step S201, the system controller 355 reads the data stored in the recording table. Then, control proceeds to a step S202.

In the step S202, the system controller 355 writes "1" in a storage area for material number data IDd representing the number of processed materials, in the storage space of the internal memory thereof. Thereafter, control proceeds to a step S203.

In the step S203, the system controller 355 effects various control processes on the reproducer 351 to access the start of a material, and the reproducer 351 accesses the start of the material. Then, control proceeds to a step S204. The processing operation of the step S203 is the same as that of the steps S102, S103 shown in FIG. 11.

In the step S204, the system controller 355 supplies a control signal representing a playback mode to the reproducer 351 for thereby causing the reproducer 351 to start the playback mode. Then, control proceeds to a step S205. The processing operation of the step S204 is the same as that of the step S104 shown in FIG. 11.

In the step S205, the system controller 355 supplies the external memory ID, the external memory information, and the motion vector data from the motion detector 354 to the external memory 351-1, 351-2, . . . , or 351-n which corresponds the material being processed. The motion vector data are stored in the external memory 351-1, 351-2, . . . , or 351-n. Then, control proceeds to a step S206.

In the step S206, the system controller 355 detects the number of bits of encoded data supplied from the encoder 353 for each GOP, producing quantization step size data. Thereafter, control proceeds to a step S207.

In the step S207, the system controller 355 reads time code data from the reproducer 351. Then, control proceeds to a step S208.

In the step S208, the system controller 355 decides whether the end of the material is reached or not. If the end of the material is reached (YES), then control proceeds to a step S209. If the end of the material is not reached (NO), then control goes back to the step S205. The processing operation of the step S208 is the same as that of the step S109 shown in FIG. 11.

In the step S209, the system controller 355 supplies a control signal indicative of a pause mode to the reproducer 351 to bring the reproducer 351 into a pause mode. Then, control proceeds to a step S210.

In the step S210, the system controller 355 increments, by "1", the numerical data stored in the storage area for material number data IDd, and writes new incremented numerical data in the same storage area. Then, control proceeds to a step S211.

In the step S211, the system controller 355 detects the number of materials registered in the recording table, and increments the numerical value representing the detected number of materials by "1". The system controller 355 reads the material number data IDd from the internal memory thereof, and decides whether the material number data IDd are equal to the incremented numerical value or not. If the material number data IDd are equal to the incremented numerical value (YES), then control goes to a step S212 shown in FIG. 21. If the material number data IDd are not equal to the incremented numerical value (NO), then control goes back to the step S203. The processing operation of the step S211 serves to decide whether all the materials to be recorded, which are registered in the recording table, have been processed or not.

In the step S212, the system controller 355 supplies a switching control signal to the switch 352, connecting the movable contact "c" to the fixed contact "b" thereof. Then, control proceeds to a step S213.

In the step S213, the system controller 355 reads the data stored in the recording table. Then, control proceeds to a step S214.

In the step S214, the system controller 355 writes "1" in the storage area for material number data IDd representing the number of processed materials, in the storage space of the internal memory thereof. Thereafter, control proceeds to a step S215.

In the step S215, the system controller 355 supplies the selector 360 with a control signal for selecting the encoder 361-1, 361-2, . . . , or 361-n which corresponds to a material to be processed. Then, control proceeds to a step S216.

In the step S216, the system controller 355 effects various control processes on the reproducer 351 to access the start of the material, and the reproducer 351 accesses the start of the material. Then, control proceeds to a step S217. The processing operation of the step S216 is the same as that of the steps S102, S103 shown in FIG. 11.

In the step S217, the system controller 355 supplies a control signal representing a playback mode to the reproducer 351 for thereby causing the reproducer 351 to start the playback mode. Then, control proceeds to a step S218. The processing operation of the step S217 is the same as that of the step S104 shown in FIG. 11.

In the step S218, the system controller 355 supplies the external memory ID and the external memory information to the external memory 351-1, 351-2, . . . , or 351-n which corresponds the material being processed. The motion vector data are now retrieved from the external memory 351-1, 351-2, . . . , or 351-n which corresponds the material to be processed. The retrieved motion vector data are supplied to the system controller 355. Then, control proceeds to a step S219.

In the step S219, the system controller 355 supplies the retrieved motion vector data and the quantization step size data registered in the recording table to the corresponding encoders 361-1, 361-2, . . . , or 361-n. Thereafter, control proceeds to a step S220.

In the step S220, the system controller 355 reads time code data from the reproducer 351. Then, control proceeds to a step S221.

In the step S221, the system controller 355 decides whether the end of the material is reached or not. If the end of the material is reached (YES), then control proceeds to a step S222. If the end of the material is not reached (NO), then control goes back to the step S218. The processing operation of the step S221 is the same as that of the step S109 shown in FIG. 11.

In the step S222, the system controller 355 supplies a control signal indicative of a pause mode to the reproducer 351 to bring the reproducer 351 into a pause mode. Then, control proceeds to a step S223.

In the step S223, the system controller 355 increments, by "1", the numerical data stored in the storage area for material number data IDd, and writes new incremented numerical data in the same storage area. Then, control proceeds to a step S224.

In the step S224, the system controller 355 detects the number of materials registered in the recording table, and increments the numerical value representing the detected number of materials by "1". The system controller 355 reads the material number data IDd from the internal memory thereof, and decides whether the material number data IDd are equal to the incremented numerical value or not. If the material number data IDd are equal to the incremented numerical value (YES), then control comes to an end. If the material number data IDd are not equal to the incremented numerical value (NO), then control goes back to the step S215. The processing operation of the step S224 serves to decide whether all the materials to be recorded, which are registered in the recording table, have been recorded or not.

Advantages of Third Embodiment:

In the third embodiment, the recording medium with plural materials recorded thereon is played back by the reproducer 351. In the first cycle of operation, motion vector data and quantization step size data are produced with respect to all the materials that are reproduced, and the produced motion vector data are stored in the external memories 358-1~358-n corresponding to the respective materials. In the second cycle of operation, all the reproduced materials are encoded by the corresponding encoders 361-1~361-n using the motion vector data read from the external memories 358-1~358-n and the quantization step size data stored in the internal memory of the system controller. Therefore, the third embodiment offers an advantage in that the plural materials can successively be processed and only one motion detector is required, in addition of the advantages offered by the first embodiment.

4th Embodiment:

Q. Another Structure of the Digital Video Data Recording System Shown in FIG. 6

Figure 22:
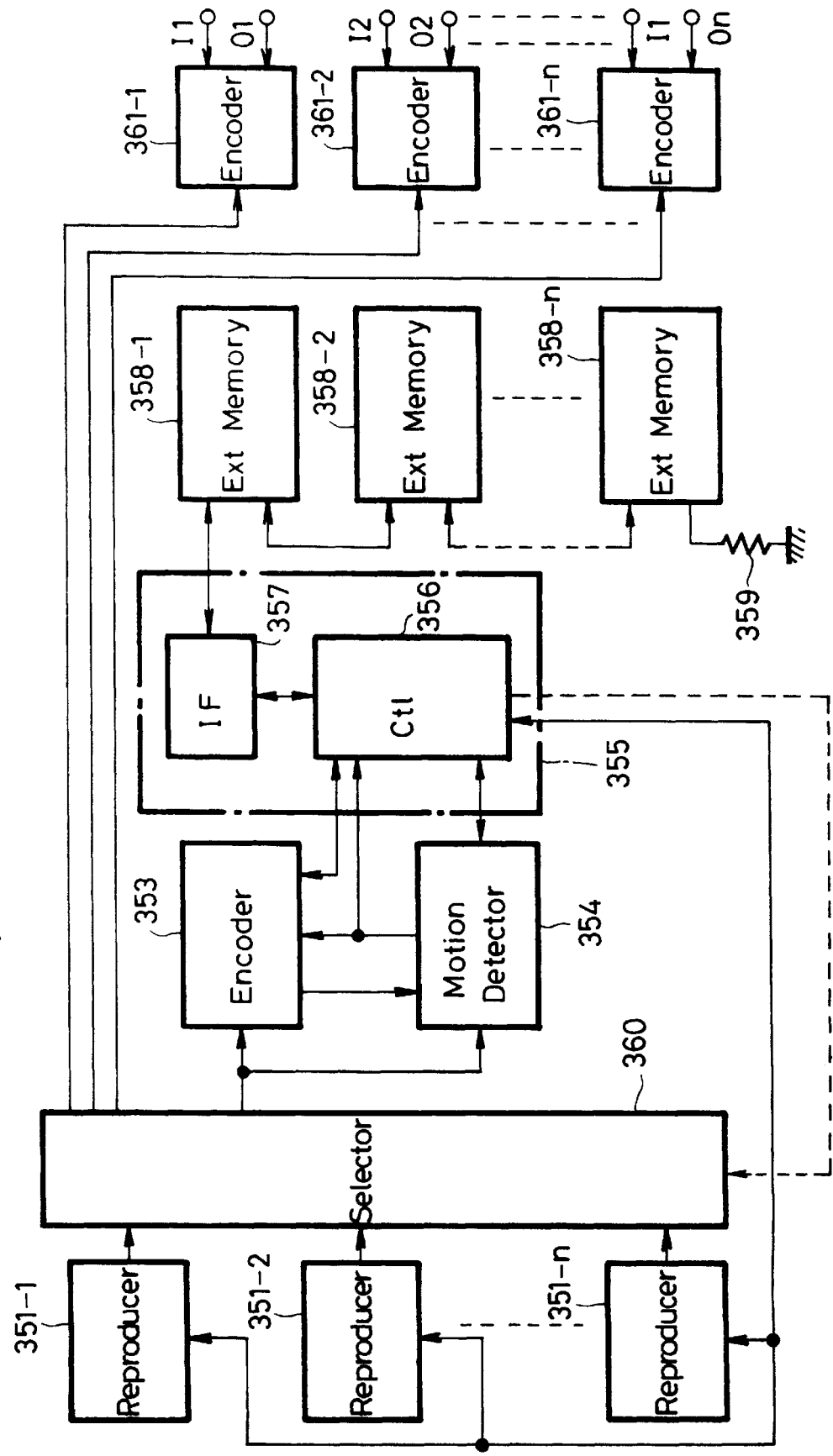
FIG. 22 is a block diagram of a digital video data recording system according to a fourth embodiment of the present invention.

FIG. 22 shows a digital video data recording system according to a fourth embodiment of the present invention.

Structure:

In FIG. 22, a plurality of reproducers 351-1~351-n correspond to the reproducer 52 shown in FIG. 6, an encoder 353 includes the DCT circuit 110, the quantizer 111, the VLC encoder 112, and the output encoder 113 shown in FIGS. 13 and 17, a system controller 355 corresponds to the system controller 59 shown in FIG. 6, external memories 358-1~358-n correspond to the external memory 51 shown in FIG. 6, and encoders 361-1~361-n are structurally identical to the encoder 353.

The system controller 355 has an interface 357 which may comprise an SCSI2 interface, for example.

The external memories 358-1~358-n correspond to respective materials which are recorded on recording mediums loaded in the reproducers 351-1~351-n, and store motion vector data which are determined with respect to the materials. A resistor connected to the external memory 358-n serves as a terminator.

The encoders 361-1~361-n correspond to the materials, and serve to encode the materials assigned by a selector 360 based on motion vector data read from the external memories 358-1~358-n. The encoders 361-1~361-n have respective input terminals I1~In for entering motion vector data and quantization step size data supplied from the system controller 355. The encoders 361-1~361-n also have respective output terminals O1~On for supplying encoded data to the interface 57 shown in FIG. 6. All the output terminals O1~On may be connected to the input terminal of the interface 57.

In the digital video data recording system shown in FIG. 22, the reproducers 351-1~351-n play back respective recording mediums. In a first cycle of operation, motion vector data and quantization step size data are produced with respect to all the materials, and the produced motion vector data are stored in the external memories 358-1~358-n. In a second cycle of operation, all the materials are encoded by the encoders 361-1~361-n using the motion vector data read from the external memories 358-1~358-n and the quantization step size data stored in an internal memory.

Operation for Producing Motion Vector Data:

One of the reproducers 351-1~351-n is brought into a playback mode by a control signal from the system controller 355, and reproduced data from the reproducer in the playback mode are supplied through a selector 360 to the encoder 353 and a motion detector 354. The motion detector 354 effects a motion detecting process on the reproduced materials to produce motion vector data which re supplied to the encoder 353 and a controller 356. The controller 356 supplies the motion vector data from the motion detector 354 to the external memories 358-1~358-n, which store the supplied motion vector data.

The encoder 353 encodes the materials supplied through the selector 360, using the motion vector data from the motion detector 354. Encoded data outputted from the encoder 353 are supplied to the controller 356. The controller 356 detects the number of bits of the encoded data for each GOP thereby to produce quantization step size data, and registers the quantization step size data in a recording table stored in an internal memory.

Operation in Encoding Process for Recording Materials:

In the encoding process for recording the materials, the reproduced material from either one of the reproducers 351-1~351-n is supplied through the selector 360 to the encoders 361-1~361-n which correspond to the materials to be processed, according to a control signal from the system controller 355.

The encoders 361-1~361-n are supplied with the motion vector data read from the external memories 358-1~358-n corresponding to the materials to be processed and also with the quantization step size data through the input terminals I1~In under the control of the system controller 355. The reproduced materials from the reproducer 351 are now encoded by the encoders 361-1~361-n using the motion vector data read from the external memories 358-1~358-n and the quantization step size data. Encoded data are outputted from the output terminals O1~On, supplied through the interface 57 shown in FIG. 6 to the master generator 58, and recorded on the recording medium set in the master generator 58.

R. Table Data in the Digital Video Data Recording System Shown in FIG. 22

The recording table is stored in the internal memory of the system controller 355 of the digital video data recording system shown in FIG. 22, and is updated from time to time during operation thereof. The recording table contains material ID data, material information, external memory ID data, external memory information, encoding selection information, and status.

The material ID data are data for identifying the materials described above. The material information is the same as the information that is contained in the time code table shown in FIG. 7A and the GOP table shown in FIG. 7B, and serves to identify the reproducers 351-1~351-n. The external memory ID data comprise data for identifying the external memories 358-1~358-n shown in FIG. 22. The external memory information is the same as the information contained in the hard disk table shown in FIG. 7C, and kept in association with the respective external memory ID data. The encoding selection information comprises information representing association between the external memories 358-1~358-n and the encoders 361-1~361-n. In this embodiment, the external memory 358-1 and the encoder 361-1, the external memory 358-2 and the encoder 361-2, . . . , and the external memory 358-n and the encoder 361-n are associated with each other. The status comprises information indicating either an unprocessed status, a motion detected status, or a recorded status. For example, the unprocessed status is represented by "00", the motion detected status by "01", and the recorded status by "10".

Modifications:

In the first through fourth embodiments, a quantization step size is determined with respect to each GOP. However, a quantization step size may determined with respect to each macroblock, each field, each optional number of frames, or each group of N GOPs. In any case, if the amount of data with respect to which a quantization step size is to be determined is larger (e.g., each group of N GOPs), then greater merits result from the fixed-rate encoding process, and if the amount of data with respect to which a quantization step size is to be determined is smaller (e.g., each macroblock), then greater merits result from the variable-rate encoding process.

In the first through fourth embodiments, the inter-frame encoding process and the intra-frame encoding process have been described. However, inter-field and intra-field encoding processes offer substantially the same advantages as with the inter-frame and intra-frame encoding processes in the first through fourth embodiments, except that the variable-rate encoding process is more advantageous because of the processing with respect to each field.

In the first through fourth embodiments, the data after they are encoded for outputting purpose are counted for each GOP. However, the data after they are VLC-encoded or quantized may be counted for each GOP. In such a modification, it is necessary to subtract the decoded information and the parity data from the amount of all data recordable on the recording medium, and establish quantization step size data for each GOP such that the amount of data after they are quantized or VLC-encoded fall within the differential amount of data recordable on the recording medium. The present invention has been described above as being embodied in a method of and a system for recording image information and also a method of and a system for encoding image information. However, the principles of the present invention are also applicable to a system for transmitting encoded image information to a transmission path, rather than recording the encoded image information on a recording medium. In this case, the amount of information may be assigned such that an amount of information in the amount of information usable in the transmission path is assigned based on the amount of encoded image information in each given unit (e.g., each GOP).

According to the present invention, as described above, before image information from the signal source is recorded on the recording medium by the recorder, motion vector information produced by the motion detector is stored in the memory, and the amount of information with respect to an encoding unit of encoded information from the encoder is determined. Based on the determined amount of information and the amount of information recordable on the recording medium, compression ration information indicative of a compression ratio at the encoder in the recording process is determined in the encoding unit. When the image information from the signal source is recorded on the recording medium by the recorder, the motion vector information stored in the memory is read, and the read motion vector information and the compression ratio information are supplied to the encoder. Therefore, in a preprocessing procedure prior to the recording process, it is possible to obtain the motion vector information and the compression ratio information in the encoding unit of all the image information for recording all the image information from the signal source on the recording medium. In the recording process, the image information is encoded using the motion vector information and the compression ratio information, and recorded on the recording medium. Therefore, it is not necessary for the motion detector to effect a motion detecting process in the recording process, and hence an undue consumption of electric energy is reduced. Furthermore, the image information from the signal source can be encoded in an optimum amount of information, and can all be recorded on the recording medium, and images reproduced from the recorded image information have a high quality.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of recording image information on a recording medium, comprising the steps of:

storing motion vector information produced by detecting a motion of image information outputted from a signal source;

detecting an amount of encoded image information, in each of a plurality of predetermined units, produced by encoding the image information outputted from the signal source using said motion vector information;

assigning an amount of information in the amount of information recordable on the recording medium to image information in each of said plurality of predetermined units based on the amount of encoded image information in said predetermined unit;

obtaining compression ratio information representing a compression ratio used for each of said plurality of predetermined units when the image information is encoded, based on the assigned amount of information;

encoding the image information of each of said plurality of predetermined units outputted from the signal source using said motion vector information and said compression ratio information for each of said plurality of predetermined units; and recording the image information thus encoded on the recording medium.

2. The method according to claim 1, wherein said compression ratio information represents a quantization step size.

3. The system for recording image information on a recording medium, comprising:

motion detecting means for detecting a motion of image information outputted from a signal source to produce motion vector information;

memory means for storing the motion vector information produced by said motion detecting means;

encoding means for encoding the image information outputted from the signal source based on the motion vector information produced by said motion detecting means or the motion vector information stored in said memory means;

recording means for recording the image information encoded by said encoding means on the recording medium; and control means for controlling said motion detecting means, said memory means, said encoding means, and said recording means;

said control means comprising:

means for storing the motion vector information produced by said motion detecting means in said memory means, for determining an amount of information in each of a plurality of predetermined units of the encoded image information from said encoding means, and for determining compression ratio information representing a compression ratio in said encoding means for recording the image information for each of said plurality of predetermined units with respect to all image information to be recorded, based on the determined amount of information for each of said plurality of predetermined units and a total amount of information recordable on the recording medium, before the image information outputted from the signal source is recorded on the recording medium by said recording means; and means for reading the motion vector information from said memory means and supplying the read motion vector information and said compression ratio information for each of said plurality of predetermined units to said encoding means when the image information outputted from the signal source is recorded on the recording medium by said recording means.

4. The system according to claim 3, wherein said compression ratio information represents a quantization step size.

5. The system for recording image information on a recording medium, comprising:

first memory means for storing image information outputted from a signal source;

motion detecting means for effecting a motion detecting process on main image information from the signal source and auxiliary image information from said first memory means to produce motion vector information;

vector information memory means for storing the motion vector information produced by said motion detecting means;

encoding means for encoding the image information outputted from the signal source;

recording means for recording the image information encoded by said encoding means on the recording medium;

decoding means for decoding the image information encoded by said encoding means;

second memory means for storing the image information decoded by said decoding means;

motion compensating means for reading image information represented by the motion vector information produced by said motion detecting means, from said second memory means;

first adding means for subtracting the auxiliary image information read by said motion compensating means from the main image information from the signal source;

second adding means for adding the image information decoded by said decoding means and the auxiliary image information read by said motion compensating means; and control means for detecting the amount of the image information encoded by said encoding means, for obtaining compression ratio information representative of a compression ratio in said encoding means based on the detected amount of the image information for each of a plurality of predetermined portions of said image information, for supplying the compression ratio information to said encoding means to control the compression ratio in said encoding means for each of said plurality of predetermined portions of said image information, and for controlling said first memory means, said motion detecting means, said vector information memory means, said encoding means, said recording means, said decoding means, said second memory means, said motion compensating means, said first adding means, and said second adding means;

said control means comprising:

means for controlling said motion detecting means to produce the motion vector information, for detecting the amount of the image information encoded by said encoding means, and for calculating compression ratios of all the image information to be recorded for each of said Plurality of predetermined portions of said image information based at least on the total detected amount of the image information and an amount of information recordable on the recording medium, in a preprocessing procedure for producing the motion vector information and calculating the compression ratio in the encoding means for each of said plurality of predetermined portions of said image information; and means for supplying the motion vector information read from said vector information memory means to said motion compensating means to use the motion vector information in said motion compensating means, and for controlling the compression ratio in said encoding means for each of said plurality of predetermined portions of said image information, when the image information outputted from the signal source is recorded on the recording medium by said recording means.

6. The system according to claim 5, said control means further comprising:

amount-of-information detecting means for detecting an amount of information in each of said predetermined portions of the image information;

compression ratio calculating means for obtaining compression ratio information representative of a compression ratio for each of said Plurality of predetermined portions of said image information with respect to the image information from the signal source, based on the encoded image information for each of said plurality of predetermined portions of said image information and the amount of information recordable on the recording medium;

memory control means for storing the motion vector information in said vector information memory means and reading the motion vector information stored in said vector information memory means; and table information memory means for storing a table of the information produced in said preprocessing procedure and the information required when the image information outputted from the signal source is recorded on the recording medium by said recording means.

7. The system according to claim 5, wherein said signal source comprises a reproducer for playing back a recording medium, and said recording medium recordable by said recording means comprises a master for manufacturing a stamper.

8. The system according to claim 7, wherein said table contains at least identification information for identifying materials recorded on the recording medium played back by said reproducer, positional information indicative of positions of the materials on the recording medium, amount-of-information information detected by said amount-of-information detecting means, compression ratio information produced by said compression ratio calculating means, and positional information of the motion vector information in said vector information memory means.

9. The system according to claim 5, wherein said compression ratio information represents a quantization step size.

10. The system for recording image information on a recording medium, comprising:

memory means for storing image information outputted from a signal source;

motion detecting means for effecting a motion detecting process on main image information from the signal source and auxiliary image information from said first memory means to produce motion vector information;

vector information memory means for storing the motion vector information produced by said motion detecting means;

encoding means for encoding the image information outputted from the signal source;

recording means for recording the image information encoded by said encoding means on the recording medium;

decoding means for decoding the image information encoded by said encoding means, supplying the decoded information to said memory means, and storing the decoded information in said memory means;

motion compensating means for reading image information represented by the motion vector information produced by said motion detecting means, from said memory means;

first adding means for subtracting the auxiliary image information read by said motion compensating means from the main image information from the signal source;

second adding means for adding the image information decoded by said decoding means and the auxiliary image information read by said motion compensating means; and control means for detecting the total amount of the image information encoded by said encoding means and the amount of the image information encoded by said encoding means for each of a plurality of predetermined units of image information, for obtaining compression ratio information representative of a compression ratio in said encoding means for each of said plurality of predetermined units of image information based on the detected amount of the image information, for supplying the compression ratio information for each of said plurality of predetermined units of image information to said encoding means to control the compression ratio in said encoding means, and for controlling said memory means, said motion detecting means, said vector information memory means, said encoding means, said recording means, said decoding means, said motion compensating means, said first adding means, and said second adding means;

said control means comprising:

means for controlling said motion detecting means to produce the motion vector information, for detecting the amount of the image information encoded by said encoding means for each of said plurality of predetermined units of image information, and for calculating compression ratios of all the image information to be recorded, for each of said plurality of predetermined units of image information based on the detected amount of the image information and an amount of information recordable on the recording medium, in a preprocessing procedure for producing the motion vector information and calculating the compression ratio in the encoding means; and means for supplying the motion vector information read from said vector information memory means to said motion compensating means to use the motion vector information in said motion compensating means, and for controlling the compression ratio in said encoding means for each of said plurality of predetermined units of image information, when the image information outputted from the signal source is recorded on the recording medium by said recording means.

11. The system according to claim 10, said control means further comprising:

amount-of-information detecting means for detecting an amount of information in each of said plurality of predetermined units of the encoded image information;

compression ratio calculating means for obtaining compression ratio information representative of a compression ratio for each of said plurality of predetermined units of image information with respect to the image information from the signal source, based on the encoded image information in each of said plurality of predetermined units and the amount of information recordable on the recording medium;

memory control means for storing the motion vector information in said vector information memory means and reading the motion vector information stored in said vector information memory means; and table information memory means for storing a table of the information produced in said preprocessing procedure and the information required when the image information outputted from the signal source is recorded on the recording medium by said recording means.

12. The system according to claim 10, wherein said signal source comprises a reproducer for playing back a recording medium, and said recording medium recordable by said recording means comprises a master for manufacturing a stamper.

13. The system according to claim 12, wherein said table contains at least identification information for identifying materials recorded on the recording medium played back by said reproducer, positional information indicative of positions of the materials on the recording medium, amount-of-information information detected by said amount-of-information detecting means, compression ratio information produced by said compression ratio calculating means, and positional information of the motion vector information in said vector information memory means.

14. The system according to claim 10, wherein said compression ratio information represents a quantization step size.

15. A method of encoding image information, comprising the steps of:

storing motion vector information produced by detecting a motion of image information outputted from a signal source;

detecting an amount of encoded image information, in each of a plurality of predetermined units, produced by encoding the image information outputted from the signal source using said motion vector information;

assigning an amount of information in the amount of information usable on a recording medium to image information in each of said plurality of predetermined units based on the amount of encoded image information in each of said plurality of predetermined units;

obtaining compression ratio information for each of said plurality of predetermined units representing a compression ratio used when the image information is encoded, based on the assigned amount of information; and encoding the image information outputted from the signal source using said motion vector information and said compression ratio information.

16. A method according to claim 15, wherein said compression ratio information represents a quantization step size.

17. The system for encoding image information, comprising:

motion detecting means for detecting a motion of image information outputted from a signal source to produce motion vector information;

memory means for storing the motion vector information produced by said motion detecting means;

encoding means for encoding the image information outputted from the signal source based on the motion vector information produced by said motion detecting means or the motion vector information stored in said memory means; and control means for controlling said motion detecting means, said memory means, and said encoding means; said control means comprising:

means for storing the motion vector information produced by said motion detecting means in said memory means, for determining an amount of information in each of a plurality of predetermined units of the encoded image information from said encoding means, and for determining compression ratio information representing a compression ratio in said encoding means for each of said predetermined units with respect to the total image information to be recorded, based on the total amount of information to be recorded and a usable amount of information; and means for reading the motion vector information from said memory means and supplying the read motion vector information and said compression ratio information to said encoding means.

18. A system according to claim 17, wherein said compression ratio information represents a quantization step size.

* * * * *